United States Patent
Duruöz et al.

(10) Patent No.: US 6,654,539 B1
(45) Date of Patent: Nov. 25, 2003

(54) TRICK PLAYBACK OF DIGITAL VIDEO DATA

(75) Inventors: Cem I. Duruöz, San Francisco, CA (US); Taner Ozcelik, San Francisco, CA (US); Pattabiraman Subramanian, Santa Clara, CA (US); Yoshinori Shimizu, Shinagawa-ku (JP); Takayuki Ishida, Kamakura (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/281,152

(22) Filed: Mar. 30, 1999

Related U.S. Application Data

(63) Continuation-in-part of application No. 09/178,803, filed on Oct. 26, 1998.

(51) Int. Cl.[7] .............................. H04N 5/91; H04N 7/26
(52) U.S. Cl. ............................... 386/68; 386/112
(58) Field of Search .................... 386/6–8, 33, 68, 386/81–82, 111–112

(56) References Cited

U.S. PATENT DOCUMENTS

| | | | | |
|---|---|---|---|---|
| 4,342,454 A | * | 8/1982 | Baer et al. ................... 463/31 |
| 5,280,462 A | * | 1/1994 | Yokogawa ................... 369/30 |
| 5,649,029 A | * | 7/1997 | Galbi .......................... 382/233 |
| 5,684,917 A | | 11/1997 | Yanagihara et al. .......... 386/80 |
| 5,712,946 A | | 1/1998 | Yanagihara et al. .......... 386/80 |
| 5,727,113 A | | 3/1998 | Shimoda ....................... 386/68 |
| 5,729,516 A | * | 3/1998 | Tozaki et al. ................. 369/58 |
| 5,768,466 A | * | 6/1998 | Kawamura et al. ........... 386/69 |
| 5,862,295 A | | 1/1999 | Shimoda et al. .............. 386/68 |
| 5,903,312 A | * | 5/1999 | Malladi et al. ............... 348/405 |
| 5,928,321 A | * | 7/1999 | Ozcelik et al. ............... 709/1 |
| 5,931,934 A | * | 8/1999 | Li et al. ....................... 710/260 |
| 5,946,352 A | * | 8/1999 | Rowlands et al. ............ 375/242 |
| 5,946,447 A | * | 8/1999 | Nakagawa et al. ........... 386/95 |
| 5,949,948 A | * | 9/1999 | Krause et al. ................ 386/6 |
| 5,977,997 A | * | 11/1999 | Vainsencher ................ 345/519 |
| 5,995,707 A | | 11/1999 | Lee ............................... 386/81 |
| 6,012,137 A | * | 1/2000 | Bublil et al. .................. 712/36 |
| 6,064,794 A | * | 5/2000 | McLaren et al. ............. 386/68 |
| 6,108,633 A | * | 8/2000 | Kolluru ........................ 704/500 |
| 6,272,615 B1 | * | 8/2001 | Li et al. ....................... 711/220 |
| 6,310,652 B1 | * | 10/2001 | Li et al. ....................... 348/515 |

OTHER PUBLICATIONS

SGS–Thomason MicroElectronics, *MPEG–2/CCIR 601 Video Decoder*, STi3500A Preliminary Data, Jul. 1994, pp. 1–84.

Legg, Gary, "Single chip performs DVD decoding", EDN Magazine, Jun. 6, 1996.*

\* cited by examiner

*Primary Examiner*—Thai Tran
*Assistant Examiner*—Polin Chieu
(74) *Attorney, Agent, or Firm*—Wood, Herron & Evans, LLP

(57) ABSTRACT

A single-chip application specific integrated circuit provides autonomous management of playback of digital video and audio. The chip includes a digital video decoder and output system, and a central processing unit controlling said digital video decoder and output system. The central processing unit receives commands to establish a current playback state for management of playback of digital video and audio by said digital video decoder and output system, and responds to a video field synchronization signal and a current playback state, without external instruction, to determine whether to display digital video, whether to decode digital video for display, whether to repeat display of previously decoded digital video, and whether to skip over digital video prior to decoding digital video for output. By delivering commands to the central processing unit, the application specific integrated circuit can be caused to transition between playback states to provide desired playback of said digital video and audio.

40 Claims, 27 Drawing Sheets

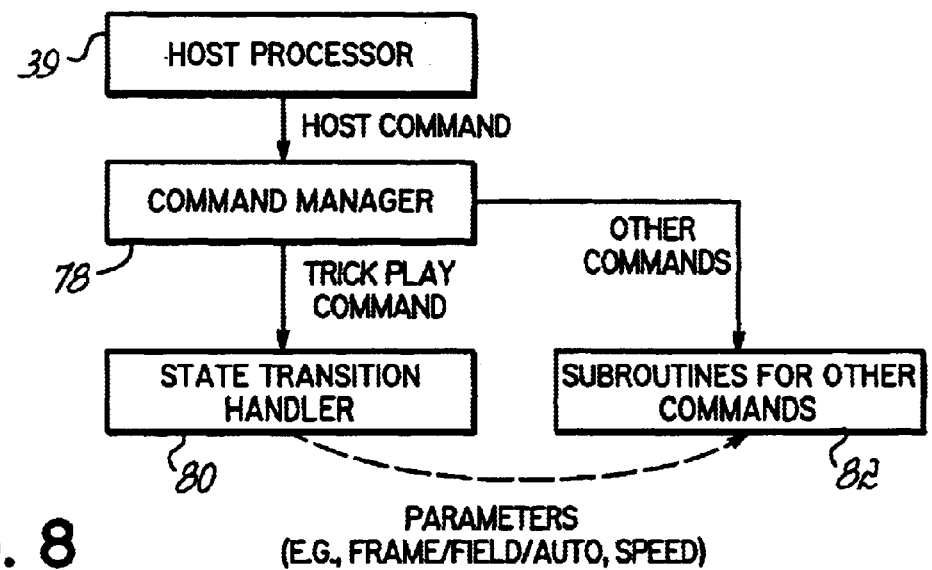
FIG. 8
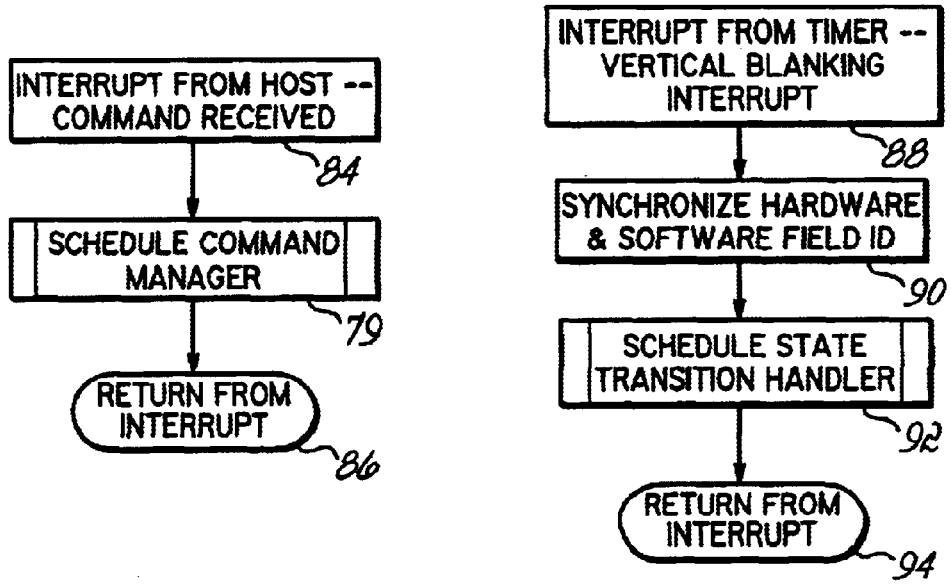
FIG. 9A
FIG. 9B

TRICK PLAYBACK OF DIGITAL VIDEO DATA

CROSS-REFERENCE TO RELATED APPLICATIONS

This application is related to the following co-pending and commonly owned applications: U.S. Ser. No. 09/281,599, filed concurrently herewith entitled ON SCREEN DISPLAY, naming Fang-Chuan Wu; U.S. Ser. No. 09/281,3783, filed concurrently herewith entitled DISPLAY MASTER CONTROL, naming Fang-Chuan Wu; U.S. Ser. No. 09/177,261, filed Oct. 22, 1998, entitled "METHOD AND APPARATUS FOR A VIRTUAL SYSTEM TIME CLOCK FOR DIGITAL/AUDIO/VIDEO PROCESSOR", naming. Cem Duruoz, Taner Ozelik and Gong-san Yu, and U.S. Ser. No. 09/177,214, filed Oct. 22, 1998 entitled "COMMAND MANAGER", naming Cem I. Duruoz, Taner Ozcelik and Pattabiraman Subramanian, and is a continuation-in-part of U.S. Ser. No. 09/178,803, filed Oct. 26, 1998 entitled "MANAGEMENT OF TRICK PLAYBACK OF DIGITAL VIDEO DATA", naming Cem I. Duruoz, Taner Ozcelik and Pattabiraman Subramanian. These applications are hereby incorporated by reference herein.

FIELD OF THE INVENTION

The present invention relates to management of trick playback of digital video.

BACKGROUND OF THE INVENTION

Techniques for digital transmission of video promise increased flexibility, higher resolution, and better fidelity. Recent industry collaborations have brought digital video closer to reality; digital video transmission and storage standards have been generated, and consumer digital video products have begun to appear. The move toward digital video has been encouraged by the commercialization of digital technologies in general, such as personal computers and compact discs, both of which have increased consumer awareness of the possibilities of digital technology.

Personal computers, which have recently become common and inexpensive, contain much of the computing hardware needed to produce digital video, including a microprocessor/coprocessor for performing numeric calculations, input and output connections, and a large digital memory for storing and manipulating image data. Unfortunately, personal computers are not suitable for consumer digital video reception, because the microprocessor in a personal computer is a general purpose processor, and typically cannot perform the calculations needed for digital video fast enough to produce full-motion, high definition video output.

Accordingly, special purpose processors, particularly suited for performing digital video-related calculations, have been developed for use in digital video receivers for consumer applications. A specific processor of this kind is disclosed in commonly-assigned, copending U.S. patent application Ser. No. 08/865,749, entitled SPECIAL PURPOSE PROCESSOR FOR DIGITAL AUDIO/VIDEO DECODING, filed by Moshe Bublil et al. on May 30, 1997, which is hereby incorporated by reference herein in its entirety, and a memory controller for use therewith is disclosed in commonly-assigned, copending U.S. patent application Ser. No. 08/846,590, entitled "MEMORY ADDRESS GENERATION FOR DIGITAL VIDEO", filed by Edward J. Paluch on Apr. 30, 1997, which is hereby incorporated herein in its entirety.

The above-referenced U.S. patent applications describe an application specific integrated circuit (ASIC) for performing digital video processing, which is controlled by a reduced instruction set CPU (RISC CPU). The RISC CPU controls computations and operations of other parts of the ASIC to provide digital video reception. As is typical of CPU's of many varieties, the CPU described in the above-referenced U.S. patent applications supports flow control instructions such as BRANCH, CALL and RETURN, as well as providing hardware interrupt services.

Due to the limitations of the RISC CPU, a task and stack manager procedure is required to monitor task flags, prioritize task flags, manage subroutine calls (the hardware does not support nesting of subroutine calls), and provide virtual instruction memory management. A specific procedure of this kind is disclosed in commonly-assigned, copending U.S. patent application Ser. No. 08/866,419, entitled TASK AND STACK MANAGER FOR DIGITAL VIDEO DECODING, filed by Taner Ozcelik et al. on May 30, 1997, which is hereby incorporated by reference herein in its entirety.

However, even with task and stack management, the host processor would have to be intimately integrated with the ASIC in order to command it. For example, in order for the host to command the ASIC to perform complex operations, the host would have to generate a number of specific commands and also would have to prioritize and schedule each specific command and monitor its completion before submitting the next specific command. The host would also have to become involved in synchronizing some commands with events such as during vertical blanking or over a number of video frames.

In a typical early generation video decoding system, such as a DVD player, the manner in which video is decoded is relatively limited. Specifically, the host requests that one or more frames of video be decoded, into specific video buffers. The video buffer that will receive a decoded frame can be predetermined from.the playback mode and the kind of video frame that is being decoded (I or P reference frame or B frame). The host then supplies the corresponding encoded video, and when the decoding is done, the host causes display of the decoded video frames from predetermined video buffers.

If the decoding operation takes longer than the duration of display of a frame, then a frame must be repeatedly displayed until the decoding is complete. During normal forward playback, or slow forward playback, or slow reverse playback, one frame is decoded and displayed at a time following this process. Typically, during normal or slow forward playback, the decode of a frame is performed in a shorter time than the display of the prior frame, so the display can advance at the normal playback speed. For reverse playback, a frame prior to the current frame is decoded, and then the decoded frame is displayed repeatedly while the next prior frame is decoded. Since MPEG encoded data is intended to be forward rather than reverse decoded, the decoding of a prior frame can take a substantial period of time; therefore, reverse playback of all frames is of necessity substantially slower than normal forward playback. During fast forward or fast reverse playback, to enable fast playback, only certain frames (typically, the MPEG reference frames) are decoded and displayed using this process. For example, an MPEG group of pictures or video object unit is supplied to the decoder, and, e.g., three reference frames are decoded and buffered. Then, the decoded reference frames are displayed in forward order (for fast forward playback) or reverse order (for fast reverse playback), until the last reference frame is being displayed, at which time a next or previous MPEG GOP or VOBU, as appropriate, is supplied to the decoder and, again, the appropriate number of reference frames is decoded.

A difficulty with this approach is that, other than in the normal forward playback mode, the playback speed is uneven and can be unacceptably slow. For example, during reverse playback, the number of frames that must be decoded, to decode the prior frame, can be different based upon the relative position of the prior frame to the reference frames of the MPEG structure. Thus, the time taken to decode the prior frame can vary substantially, resulting in an uneven reverse display speed. Moreover, since multiple frames must be parsed and at least two reference frames must be decoded before each change of the display to a prior frame can be decoded, the speed of reverse playback is slow, often unacceptably so. Also, in the fast forward or reverse playback modes, it will be noted that the last frame of a set of reference frames may need to be displayed longer than the other reference frames from the same set, while the decoding of the next set of reference frames is being performed. This may lead to an uneven display speed as some frames remain on the screen longer than others. Also, the fastest forward or reverse playback speed may not be fast enough for some users.

SUMMARY OF THE INVENTION

In accordance with principles of the present invention, the foregoing difficulties are overcome by a single-chip application specific integrated circuit (ASIC) having its own central processing unit (CPU), which provides autonomous management of playback of digital video and audio within the ASIC. The CPU is programmed with instructions implementing a playback state machine. Commands received by the CPU from a host establish a current playback state for management of playback of digital video and audio by the ASIC. The CPU then responds to a video field synchronization signal and the current playback state, without external instruction, to determine whether to display digital video, whether to decode digital video for display, whether to repeat display of previously decoded digital video, and/or whether to skip over digital video prior to decoding digital video for output. In this manner, the host may deliver commands to the CPU and cause the ASIC to transition between playback states to provide desired playback of the digital video and audio, without low-level involvement in the details of playback of individual fields or frames.

The ASIC software includes routines performing management of the decode and display processes, and of the buffers utilized in each process. This permits the ASIC to perform decoding and display operations in an optimal manner for smooth and rapid playback in trick modes including fast forward, fast and slow reverse. By managing the buffers within the ASIC software, the use of the buffers and the scheduling of the decoding and display can be made substantially more sophisticated.

In the detailed embodiment of the invention described below, there is a STOP state in which the ASIC responds to the video field synchronization signal by not decoding or displaying any digital video. In a PLAY state, the ASIC responds to the video field synchronization signal by decoding and displaying a new video field. In a SLOW FORWARD state the ASIC responds to the video field synchronization signal by repeatedly displaying previously decoded digital video for a number of repetitions, then decoding and displaying new video fields. The number of repetitions to be performed in the SLOW FORWARD state are delivered as part of the command to enter the SLOW FORWARD state, thus providing an adjustable SLOW FORWARD playback speed. In a FAST FORWARD state, the ASIC responds to the video field synchronization signal by repeatedly displaying previously decoded digital video reference frames for a number of repetitions, then skipping over non-reference frames and decoding and displaying a new reference frame. The number of repetitions of a reference frame to be performed in the FAST FORWARD state, is identified in the FAST FORWARD command, as is a limit on the number of reference frames to be decoded from each video object unit. In a PAUSE state the ASIC responds to the video field synchronization signal by repeatedly displaying a previously decoded video frame. In a FAST REVERSE state the ASIC responds to the video field synchronization signal by repeatedly displaying previously decoded digital video reference frames for a number of repetitions, then skipping backwards over non-reference frames and decoding and displaying a new reference frame. The number of repetitions of a reference frame to be performed in the FAST REVERSE state, is identified in the FAST REVERSE command, as is a limit on the number of reference frames to be decoded from each video object unit. In a REVERSE DECODE state the ASIC responds by buffering decoded video prior to a currently displayed video frame, so that this decoded video can be output in a step reverse or slow reverse manner under command and control of the host. In this state, the ASIC is responsible for requesting encoded video data from a host, so that the ASIC can accurately and efficiently manage both the decoding and display processes.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 8 is block diagram showing the functional relationship and command flow from the host, through the RISC command manager, state transition handler, and their subroutines.

FIGS. 9A and 9B are flow diagrams of relevant portions of the digital audio/visual processor main routine that initiates the command manager and the state transition handler routines.

DETAILED DESCRIPTION OF SPECIFIC EMBODIMENTS

ASIC Architecture

Figure 1:
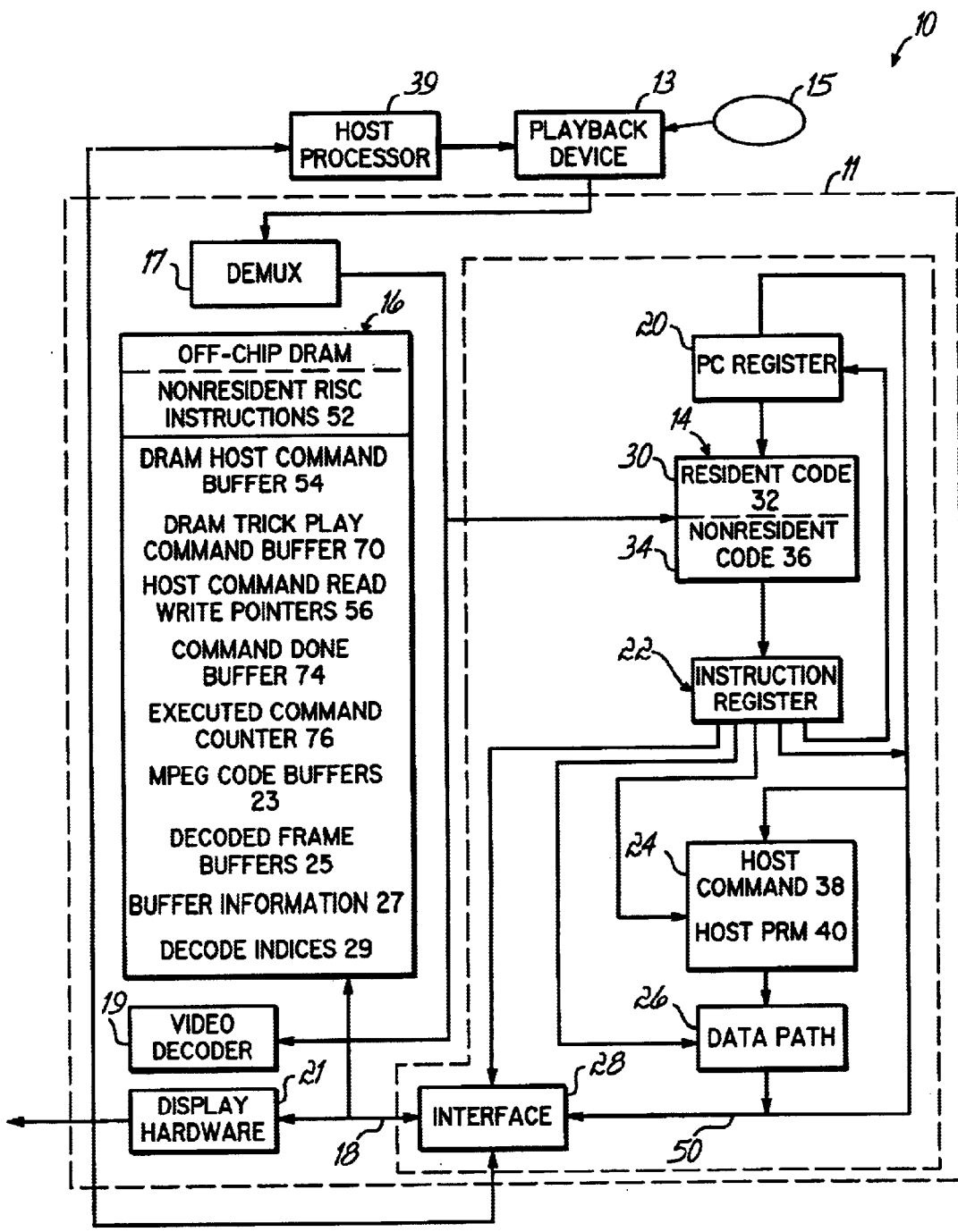
FIG. 1 is a block diagram of specific components of the application specific integrated circuit (ASIC) described in the above referenced U.S. patent applications, showing in particular the off-chip dynamic random access memory (DRAM) and the data stored therein, the reduced instruction set central processing unit (RISC CPU) for controlling the ASIC, and components of the RISC CPU and the data stored therein.

Referring to FIG. 1, a digital audio/visual control system 10 is provided. The general structure of an Application Specific Integrated Circuit (ASIC) 11, including a Reduced Instruction Set (RISC) Central Processing Unit (CPU) 12 for a controlling digital audio/video decode by the ASIC, can be discussed. The detailed structure of the RISC CPU 12 and of elements of the ASIC 11 is described in the above referenced U.S. patent applications. For present purposes, only a few specifically relevant components of the RISC CPU 12 of the ASIC 11 will be discussed.

Specifically, the RISC CPU 12 includes an instruction memory 14 for storing instructions to be executed by the RISC CPU 12 in order to control digital audio/video processing performed by the ASIC 11. These instructions are initially loaded into instruction memory 14 from an off-chip dynamic random access memory (DRAM) 16, via a first data bus 18 connected between DRAM 16 and the RISC CPU 12. (For the purpose of clarity, DRAM is drawn as part of the ASIC 11 although it is physically located off-chip)

The address of an instruction in instruction memory 14 to be executed by the RISC CPU 12 is identified by a program counter (PC) register 20. The instruction read from instruction memory 14 is delivered to an instruction register 22, and used to control operations of the RISC CPU 12. As described in the above-referenced U.S. patent applications, instructions are 16-bits wide, and control a wide variety of operations of the RISC CPU 12, including operations of a register file 24, a data path 26, a memory interface (I/F) 28, and other elements described in the above-referenced U.S. patent applications.

Instruction memory 14 further includes several interrupt service routines, including one that activates the command manager. These interrupt routines are activated by hardware of the RISC CPU 12 upon receipt of an interrupt. Instruction memory 14 also includes other resident code 32 including routines for carrying out tasks of the command manager.

All of the foregoing routines are permanently resident in instruction memory 14, that is, these routines are transferred into a resident code area 30 of the instruction memory 14 when the ASIC 11 is initially booted, and are thereafter left unchanged. There is, however, a nonresident code area 34 of instruction memory 14 which may contain non-resident code 36, which are swapped into instruction memory 14 as needed during execution of a program by the RISC CPU 12. Portions of the command manager are non-resident routines stored as nonresident code 36. Specifically, at any given time, one of several non-resident (NR) code segments 36 is stored in the allocated non-resident code area of instruction memory 14. Instructions are loaded into the "non-resident" area 34 of instruction memory 14 when those instructions are required for execution of a task or interrupt service routine, on an as-needed basis. The swapping is controlled through execution of the task and stack manager, described in an above-referenced U.S. patent application.

Among the elements of the RISC CPU 12 which are controlled by instructions is the register file 24. The register file 24 includes a number, e.g., sixty-four, 32-bit registers which are used by the RISC CPU 12 in performing calculations for audio/video digital signal decoding and processing. A few specific registers used by the RISC CPU 12 as part of command manager are illustrated in FIG. 1 and will be discussed below.

A first register in register file 24 is the host command register 38 which contains the command for the ASIC 11 from a host processor 39.

A second register in register file 24 is the host parameter (PRM) register 40 which contains the operand, if any, for the host command. Upon being activated when a host command is received, the command manager first reads the operand, if any, in the host PRM register 40 because reading the host command register 38 results in a hardware interrupt to the host processor 39. The host processor 39 may then send another command, over-writing the host command in the host command register 38 before it is read by the command manager. Moreover, as described below, the command manager may defer reading these registers for the same reason if the non-exclusive buffer is full.

Figure 2:
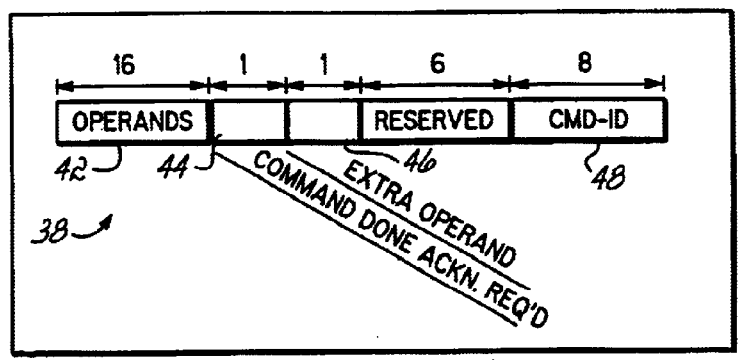
FIG. 2 is a data structure diagram of a command from the host stored in the rbus RISC host command register.

The host command register 38 is 32 bits in length, as shown in FIG. 2, and includes the 16-bit operand 42, a flag bit 44 that is set high if the host processor 39 requires acknowledgment upon completion of the command, a flag bit 46 if the host command has an extra operand stored in Host PRM register 40, and an 8-bit command identifier (CMD-ID) 48.

Referring again to FIG. 1, data path 26 in RISC CPU 12 responds to instructions generated from an instruction in instruction register 22, by performing arithmetic or logical operations on the contents of registers delivered from register file 24, and delivering the results of these computations to a second data bus 50. The specific arithmetic or logical operation performed by data path 26 is determined by the opcode portion of the instruction in instruction register 22, as is described in substantially greater detail in the above-referenced U.S. patent applications.

The output of data path 26, which is schematically identified in FIG. 1 as the second data bus 50, is connected to an input of register file 24, allowing the results of arithmetic or logical computations performed by data path 26 to be stored into registers of register file 24. Furthermore, the second data bus 50 is connected to the memory interface 28, permitting the results of logical operations performed by the data path 26 to be stored into DRAM memory 16, and further permitting data stored in DRAM memory 16 to be retrieved to the second data bus 50 and stored, for example, into a register of register file 24.

The data structures stored in off-chip DRAM 16 include nonresident RISC instructions 52 that can be swapped into the NR code area 34 of instruction memory 14.

Figure 3:
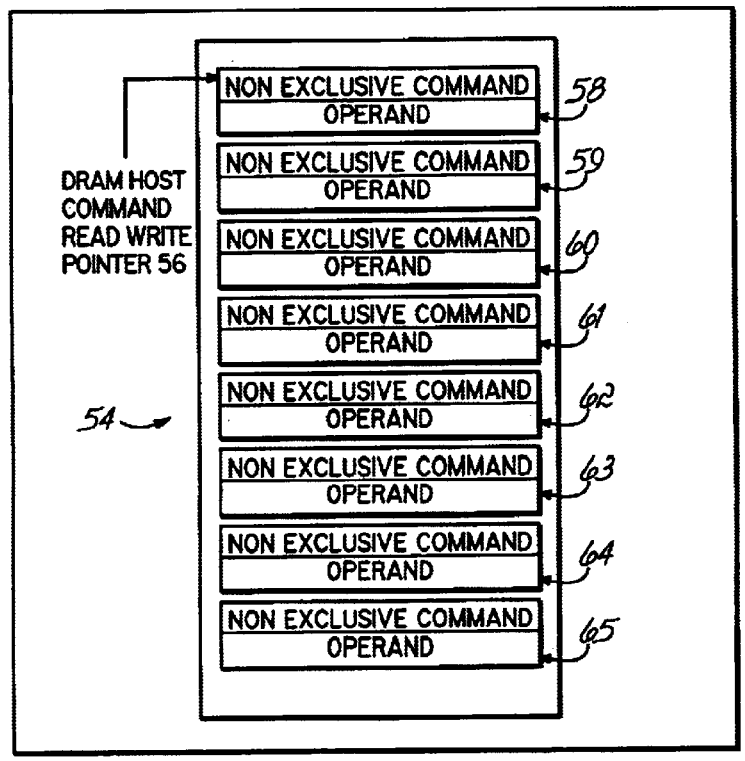
FIG. 3 is a data structure diagram of the non-exclusive commands stored in the DRAM host command buffer.
Figure 4:
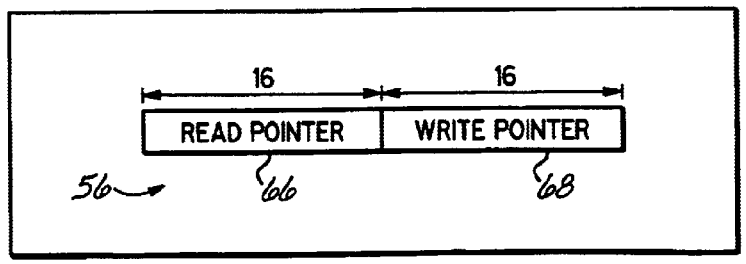
FIG. 4 is a data structure diagram of the DRAM host command read-write pointer for where the non-exclusive commands are buffered in the DRAM.

A DRAM host command buffer 54 in DRAM 16 contains non-exclusive commands. The data structure of DRAM host command buffer 54 is shown in FIG. 3. The DRAM host command buffer 54 contains eight non-exclusive command/operand pairs 58–65 and is referenced by a DRAM Host Command Read Write Pointer 56 whose data structure is shown in FIG. 4 having a 16-bit read pointer 66 and a 16-bit write pointer 68.

Figure 5:
FIG. 5 is a data structure diagram of the exclusive command stored in the DRAM Trick Play Command Buffer.

Referring back to FIG. 1, the DRAM 16 also contains a DRAM trick play command buffer 70 whose data structure, shown in FIG. 5, is a 32-bit exclusive command and 32-bit operand pair 72.

Referring back to FIG. 1, if acknowledgment is required by the host processor 39, the executed command is written back to a DRAM command done buffer 74 which can store the last 16 executed commands. In addition, stored in the DRAM 16 is the executed command counter 76 that counts the number of executed commands since the last interrupt to the host processor 39.

The output of data path 26 can also be delivered to the PC register 20, permitting a CALL or BRANCH instruction to directly load an address of an instruction in instruction memory 14, into PC register 20, thus causing program execution to sequence to the new address. For this purpose, there is also a connection from instruction register 14 to second data bus 50, permitting immediate values in an instruction to be delivered to PC register 20 as part of a CALL or BRANCH instruction, and permitting immediate values in an instruction to be delivered to a register of register file 24.

Under control of software in the RISC CPU 12, digital audio/video data is processed by the ASIC 11. Specifically, the host processor 39 may control a playback device 13 such as a DVD reader, to obtain digital data from a DVD 15 and deliver the data to the ASIC 11, and particularly to a demultiplexer circuit 17 located inside of the ASIC 11. Demultiplexer 17 separates video, audio and subpicture data from the incoming stream and stores the separate forms of data into appropriate buffers in DRAM 16.

Under control of software in the RISC CPU 12, MPEG video code in DRAM 16 is retrieved from buffers in DRAM 16 and decoded by a video decoder 19 and returned to one of one or more decoded frame buffers in DRAM 16. Display hardware 21 then retrieves the decoded data from the frame buffers, and generates the appropriate video signals. The display hardware 21 also blends demultiplexed subpicture data and any on-screen displays requested by host processor 39 with the decoded MPEG video.

DRAM 16 includes various additional buffers for storing the information described above. Specifically, MPEG code buffers 23 hold MPEG code that has been demultiplexed by demultiplexer 17. Decoded frame buffers 25 (there may be 3, 4 or 5 such buffers) hold decoded video frames generated by video decoder 19.

Figure 6:
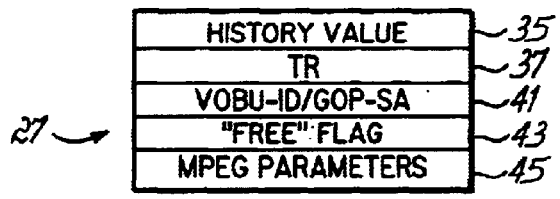
FIG. 6 is a data structure diagram of the buffer information stored in the DRAM.

A buffer information storage area 27 stores attributes of the video stored in the frame buffers. Referring to FIG. 6, this storage area includes, for each buffer, a history value 35 indicating the relative age of the data in the buffer, used in selecting a buffer for use and/or replacement as described above. The buffer history is an integer number maintained for each buffer. When a frame is decoded into a buffer, the buffer history for that buffer is set to zero and the history for all other buffers is incremented. The buffer history is used when decoding, by selecting the free buffer with the highest history value, thus ensuring that all buffers are used during decoding. When there are more than three frame buffers, this approach ensures that the decode operation is never using the same buffer as is currently being displayed. Furthermore, in reverse decoding trick play mode, this approach increases the likelihood that the most potentially useful data in a free buffer will be overwritten after less potentially useful data in a free buffer is overwritten.

The buffer information further includes a temporal reference field 37, and a field 39 for storing a video object unit identifier (VOBU-ID) or group of pictures segment address (GOP-SA). The temporal reference in field 37 uniquely identifies a frame within a VOBU (for MPEG-2 source video such as is used on DVD sources) or GOP (for MPEG-1 source video such as is used on Video CD (VCD) sources). The VOBU-ID or GOP-SA in field 39 uniquely identifies the VOBU or GOP from which the data in the buffer was obtained. Together, the values in the TR and VOBU-ID/GOP-SA fields unique identify a frame as compared to other frames from the same MPEG-1 or MPEG-2 video source.

For MPEG-2 source video, the VOBU-ID is derived from the address of the navigational pack in the MPEG-2 VOBU containing the frame. Since there is only one navigational pack per VOBU, this VOBU-ID uniquely identifies a VOBU. For MPEG-1 source video, such as is used on video CD source disks, the basic video object is the group of pictures (GOP). Accordingly, for MPEG-1 source video, the GOP sector address is used to uniquely identify the GOP from which the frame was derived.

The temporal reference for a frame stored in field 37 is derived from the MPEG temporal reference defined in the MPEG specification. For MPEG-2 source video, the MPEG temporal reference value for a frame will be an integer number, where the first frame of a GOP has a MPEG temporal reference of 0 and succeeding frames in the same GOP have sequentially increasing MPEG temporal reference values. To create a temporal reference that is unique for every frame in a VOBU, the following approach is used to compute a temporal reference for frames. In the first GOP of a VOBU (GOP number 0), the temporal reference for a frame is equal to the MPEG temporal reference value. In GOP's after the first GOP of a VOBU, i.e. GOP number 1, GOP number 2, etc., the temporal reference for a frame is equal to the MPEG temporal reference value, plus the GOP number, plus the sum of the largest temporal reference values in all prior GOP's in the same VOBU.

For MPEG-1 source video, the MPEG temporal reference value for a frame will be a number between 0 and 1023, where the first frame in a GOP has an MPEG temporal reference of 0 and succeeding frames in the same GOP have sequentially increasing MPEG temporal reference values. If a GOP includes more than 1023 frames, the MPEG temporal reference rolls over from 1023 to 0, and restarts counting upward, so that there may be multiple frames in the same GOP with the same MPEG temporal reference number. Accordingly, to uniquely identify a frame within an MPEG-1 GOP, the temporal reference stored in field 37 is equal to 1024*n+TR', where TR' is the MPEG temporal reference for the frame and n is the number of times the MPEG temporal reference has rolled over to zero during prior frames of the same GOP.

Also included in the buffer information is field 43 for storing a "free" flag indicating whether the buffer is available for storing data. A buffer is "free" whenever it is not currently being used by the display process or needed by the decode process as a reference for future frames. The status of a buffer can be changed by either the decoding process or the display process, as elaborated in detail below.

Finally, the buffer information in field 27 includes an MPEG parameters field 45 for storing MPEG parameters relating to the frame in the associated buffer, used in decoding and then displaying the frame. These parameters are taken from the MPEG headers for the data.

A decode indeces storage area 29 stores reference information used in the decoding process. Specifically, field 47 stores the identifier of the buffer holding the last reference frame that was decoded. Field 49 stores the identifier of the buffer holding the intra-coded or "B" frame that was decoded. Field 51 stores the identifier of the buffer holding the backward reference frame for current "B" frames, and field 53 stores the identifier of the buffer holding the forward reference frame for current "B" frames. Field 55 stores the identifier of the buffer being used for the current decoding operation, and field 55 stores the identifier of the buffer holding the second last reference frame that was decoded. As will be appreciated from the MPEG standard, intra-coded or "B" pictures are generated from temporally prior and subsequent reference pictures. When a "B" picture is decoded, the temporally prior reference picture will be in the buffer identified by field 51, and the temporally subsequent reference picture will be in the buffer identified by field 53. The identity of the last reference frame and second last reference frame to be decoded, are useful in determining the reference pictures for current B frames.

The foregoing hardware structure is described in schematic fashion, for the purpose of illustrating the operation of the routines described in the following figures. The above-referenced U.S. patent applications describe these hardware structures in substantially greater detail, and in particular identify the instructions and specific paths of data flow provided by the RISC CPU.

Functional Command Flow

During the discussion below, the commands from the host processor 39 will be categorized in different ways. For example, the ASIC 11 provides an application programming interface (API) to the host processor 39. The host processor can choose to provide very general commands, referred to herein as macro commands, to the ASIC 11 without the burden of supervising the required specific commands within the macro command. These macro commands are grouped as being either a system, trick play, subpicture, on screen display, video or audio command. An example of a video macro command would be "set up the final display size."

By contrast, micro commands very specifically control the digital audio/visual control system 10 and usually require a number of commands in a logical sequence in order to achieve the desired result. Micro commands are grouped as a video decode, video display, or audio command. An example of a video display micro command would be "display a field of video from the video reconstruction of data at buffer pointer."

The command manager also groups commands as to whether the command is performed exclusively or non-exclusively. Functionally, the processing of a host command from the host processor 39 by the command manager 78 is shown in FIG. 8. As will be discussed below, the command manager 78 differentiates between host commands that are in a "trick play" subgroup of macro commands (also known as "exclusive commands") and non-exclusive commands. Trick play commands are processed by buffering the command in the trick play command buffer in DRAM and setting a flag to subsequently invoke the state transition handler 80 that calls upon trick play commands subroutines. For non-exclusive commands, the command manager 78 calls upon non-exclusive command subroutines 82 which rely upon parameters set by the state transition handler 80.

The trick play (exclusive) commands are (1) "Play Ready" which prepares the system to start playback immediately after the next play command is issued; (2) "Play" which commences playing audio, video and sub-picture; (3) "Pause" which pauses video and sub-picture and mutes audio; (4) "Slow Forward" which plays at an adjustable slow speed, which defaults to $\frac{1}{10}$, i.e. each frame is repeatedly displayed ten times; (5) "Fast Forward" which fast forwards by decoding and displaying reference frames only; (6) "Step Forward" which forward decodes next picture and then pauses; (7) "Fast Reverse" which fast reverses by displaying reference frames only; (8) "Reverse Decode" which reverse plays in single frame steps or at an adjustable slow speed; and (9) "Stop" which stops all processes and returns to initial state.

The scheduling of the command manager 78 and state transition handler 80 is shown in FIGS. 9A and 9B. As shown in FIG. 9A, a host command generates a hardware interrupt service routine (step 84) which schedules the command manager 79 (FIG. 14) to store, categorize the host command, and then return (step 86). The handling of the command by the command manager 78 is discussed below. Referring to FIG. 9B, a second hardware interrupt is generated by a clock circuit internal to the ASIC (not shown). A field ID (fID) signal from the clock circuit toggles from 0 to 1 or 1 to 0 to identify the time for display of a top or bottom video field. At this time, the video display must output a new field. Following this interrupt, in an interrupt service routine performed during a vertical blanking interval (step 88) a synchronization of the hardware and software field ID is made (step 90) to ensure that decoding and display are correct. After synchronization, the state transition handler 80 (FIG. 11) is scheduled by the task manager to make sure that the trick play state is updated in accordance with any intervening action by the command manager 78 since the last vertical blanking (step 92). After this processing for the trick play state, the interrupt service routine is complete, as denoted by step 94.

State transition handler

Figure 10:
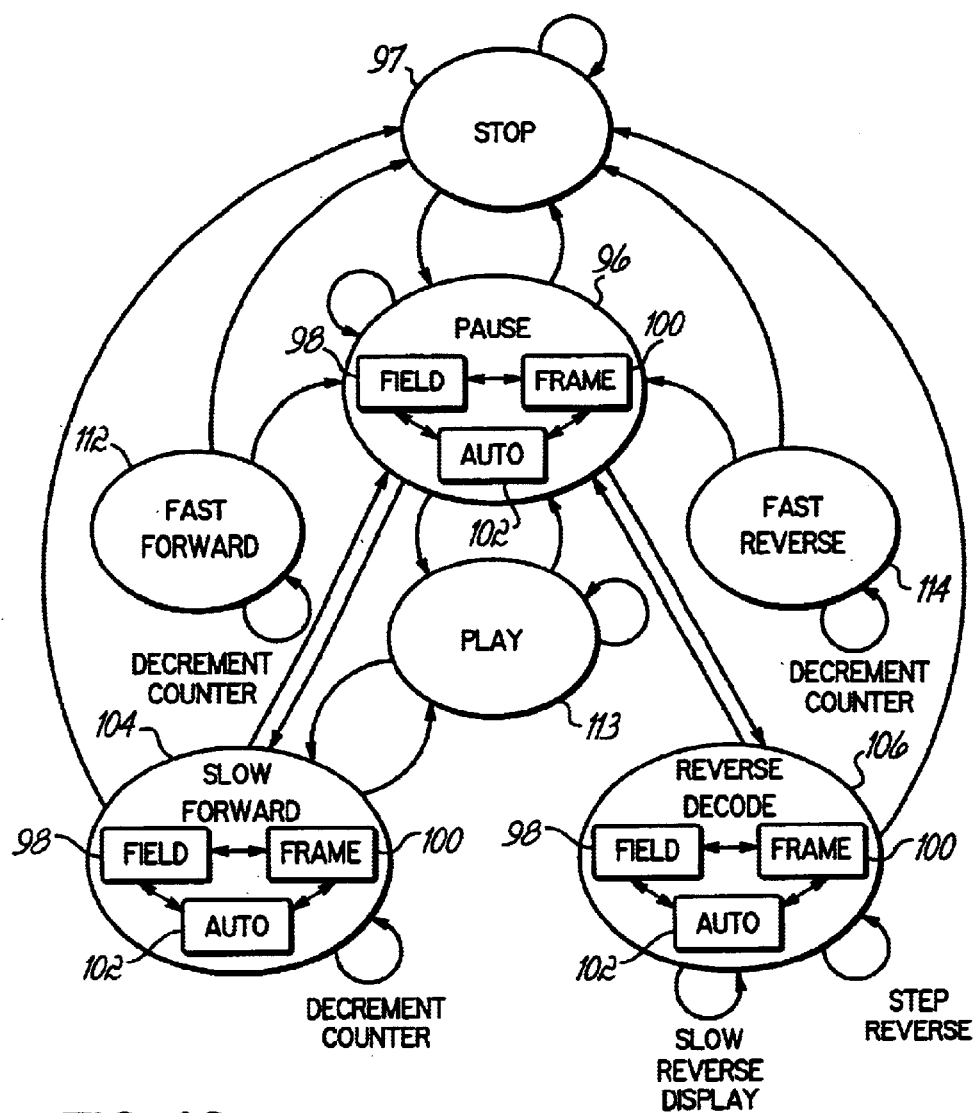
FIG. 10 is a state diagram of the allowable digital video decoding states executed by the state transition handler.

The execution of trick play modes is done by the state transition handler 80 and its subroutines, enforcing the allowable transitions as shown in FIG. 10. Arrows that begin and end at the same state denote actions taken during repetitions of the same state. Note that one mode mentioned above, play ready, is not depicted on FIG. 8.

A stop state 97 is provided as the initial state of the handler and can be a commanded state.

The pause state 96 causes a current frame to be repeatedly displayed. The pause state can be in three modes: field 98, frame 100, or auto 102. This relates to the way in which video images are displayed. Each picture, or frame, is composed of two interleaved fields, a field 0 which raster displays the odd numbered lines and a field 1 which raster displays the even numbered lines. In field mode 98, the fields output to form the paused image are repetitions of only field 1 of the current frame. Some video signals include data wherein field 0 and field 1 represent different times. Outputting only field 1 in this instance prevents jitter due to image motion between these fields, although at the loss of resolution. In frame mode 100, the fields output to form the paused image are repetitions of both field 0 and 1 of the current frame, which may or may not be subject to jitter depending on whether the fields are field synchronized. In auto mode 102, the paused image is in either field or frame repetition depending on whether the state transition handler detects that the video input is field synchronized.

Similarly, slow forward state 104 and reverse decode state 106 can be in these three modes since they output a paused image for a certain length of time. The slow forward state 104 achieves slow forward trick plays by decrementing a counter for the number of repetitions of a frame to display between forward steps. Similarly, the reverse decode state 106 is used in conjunction with non-exclusive commands for slow reverse display and step reverse to achieve reverse trick plays. The reverse decode state 106 makes sure that sufficient frames are reverse decoded and stored in buffers so that the non-exclusive display mode can access the required frames.

Also provided are fast forward state 112, play state 113 and fast reverse play state 114. Details of the state transition handler subroutines which perform the appropriate processing for these states are provided below.

Figure 11:
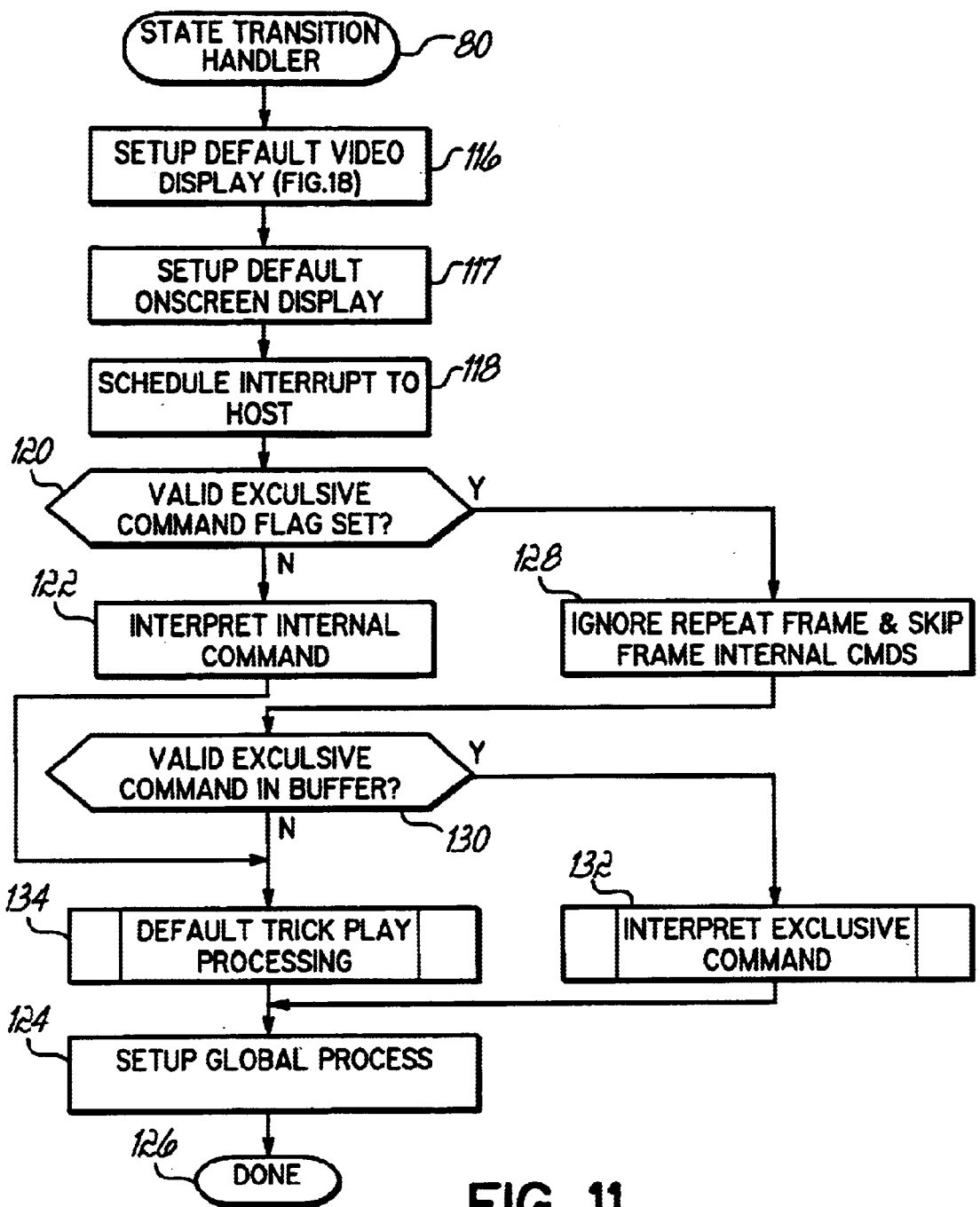
FIG. 11 is a flow diagram of the state transition handler routine.

The operation of the state transition handler 80 is shown in FIG. 11. The default video display is set up (step 116, as detailed below in FIG. 18) and the default on screen display is set up (step 117). Further, an interrupt to the host is scheduled to inform the host that a frame is being processed for output (step 118). Then, processing is undertaken to set up the display of subsequent frames. First, a determination is made as to whether a valid exclusive (trick play) mode has been requested, by checking whether the exclusive command flag has been set (step 120). If not, then internal commands are interpreted; if any (step 122). These internal commands include video skip frame, video repeat frame, initial decode ready, and internal pause. These internal commands are not generated by the host processor 39 and are instead generated by the ASIC 11, e.g., during a synchronizing routine, to accomplish things such as allowing the audio and video decoding to synchronize.

Once any internal commands are interpreted, then default trick play processing (step 134) and global processes setup (step 124) are performed. The global processes include setting an appropriate pause mode for the next frame displayed, based on a non-exclusive host command selecting a field or frame pause mode, or based on the presence of a progressive frame flag in the video data if an auto pause mode is selected by the host. Further, the global processes include adjusting software time clocks as appropriate for audio/video synchronization. Then the state transition handler 80 is done for this field ID (step 126).

If the exclusive command flag is set in step 120, then the handler 80 resets any internal flags to repeat a frame or skip a frame (since trick play modes invalidate any prior synchronization) (step 128) and then the interpretation of the exclusive command is made. If there is a valid exclusive command in the buffer 70 (FIG. 5), then the appropriate subroutine for interpreting a new exclusive command is invoked (step 132). If, however, the buffer 70 is empty or contains an invalid command, then the appropriate default processing subroutine for the current trick play state is invoked (step 134). In either case, after trick play processing, global processes are set up (step 124) and the subroutine is done (step 126).

Figure 12:
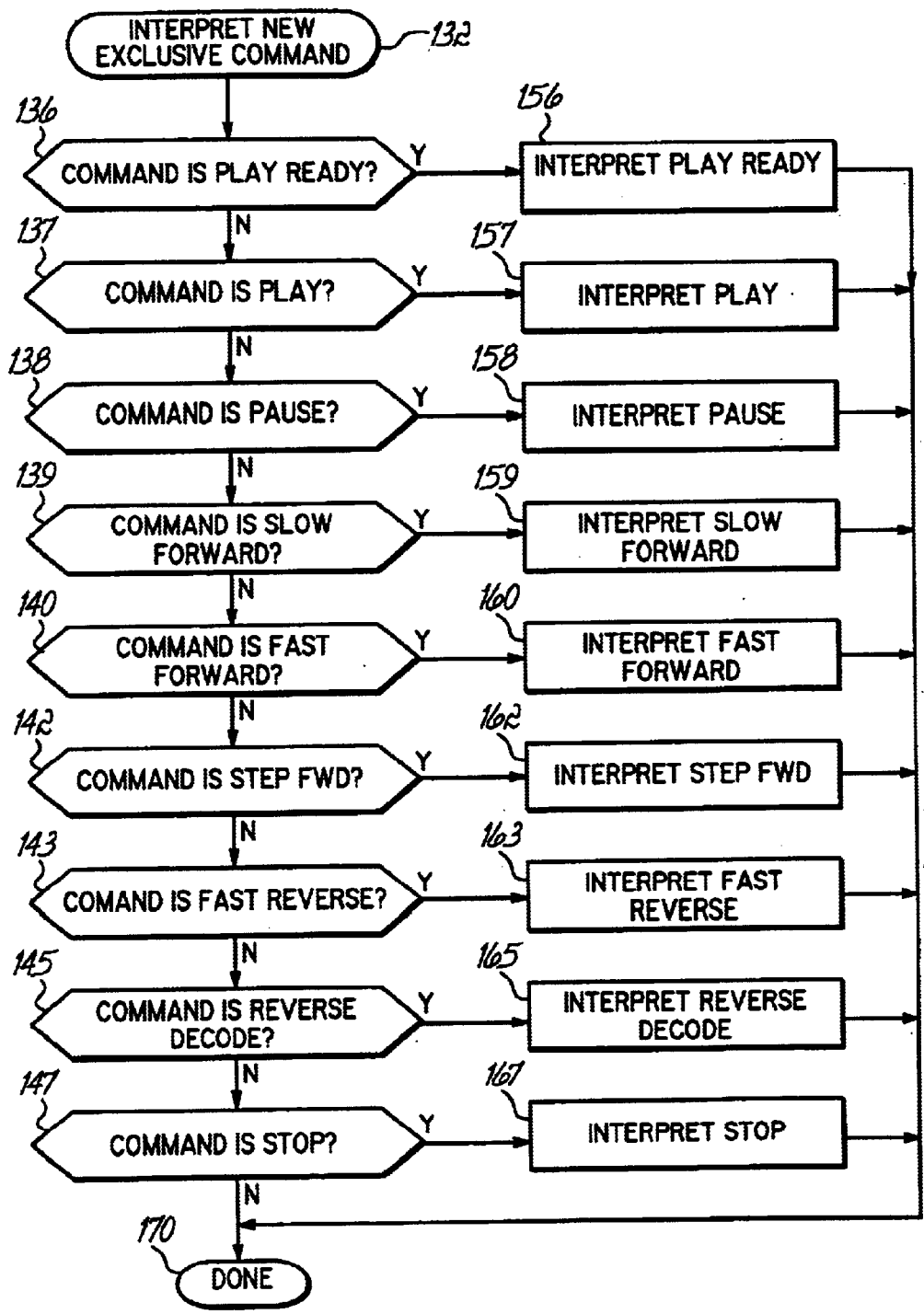
FIG. 12 is a flow diagram of the interpret exclusive command subroutine of FIG. 11.

The interpretation of an exclusive command in step 132 is shown in FIG. 12 as a determination of whether the command is play ready, play, pause, slow forward, fast forward, step forward, fast reverse, slow reverse, or stop (steps 136–147 respectively) with each resulting in the interpretation of the command (steps 156–167 respectively). After which, the subroutine is done in step 170. These command interpretations correspond to the transitions shown on FIG. 10.

Figure 13:
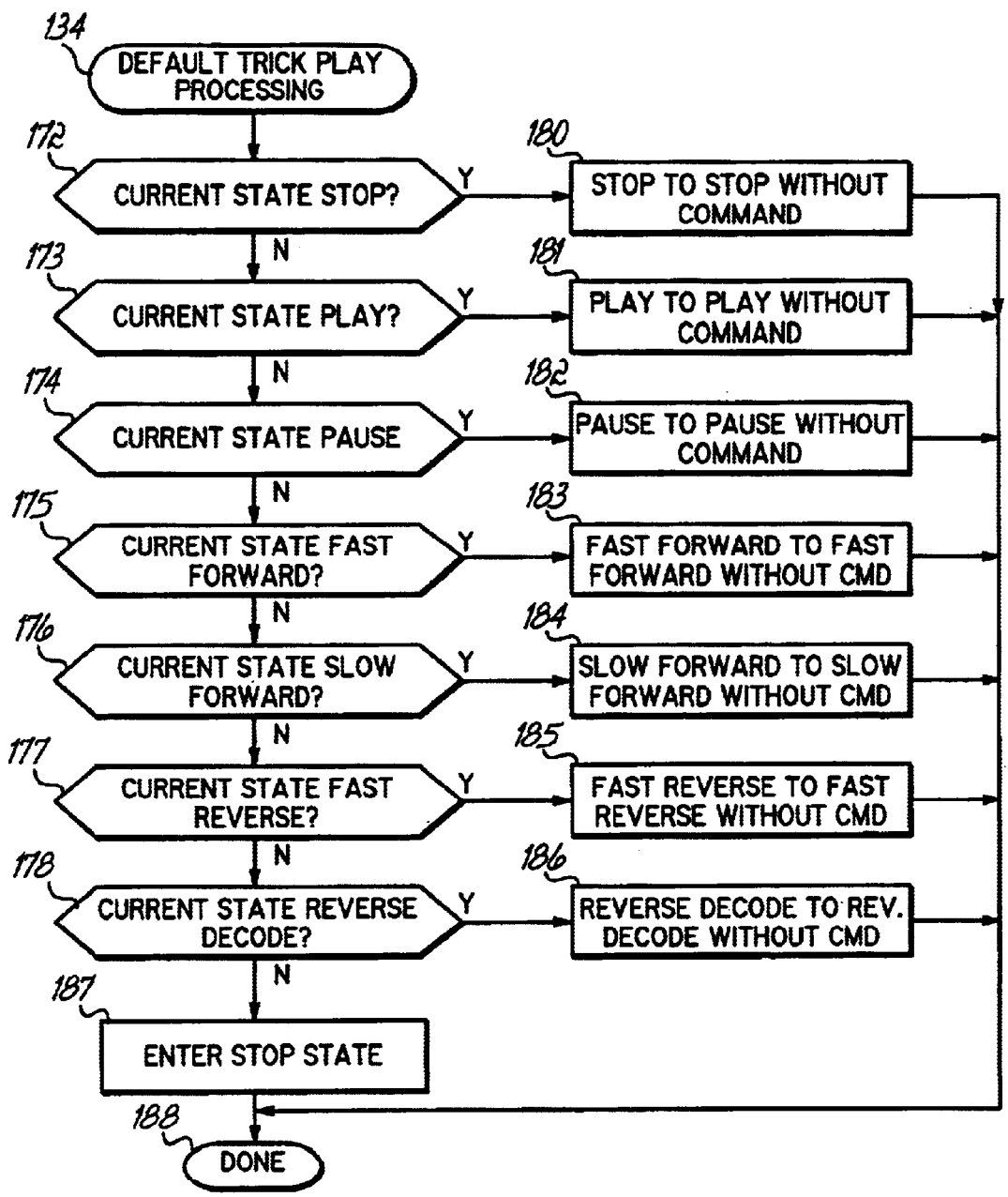
FIG. 13 is a flow chart of the default trick play processing subroutine of FIG. 11.

The default trick processing (step 134) is shown in FIG. 13 as a determination of whether the command is stop, play, pause, fast forward, slow forward, fast reverse, or reverse decode (steps 172–178 respectively) with each resulting in the interpretation of the command (steps 180–186 respectively). If for some reason a valid default state was not found, then the stop state is entered (step 187). Then the subroutine 134 is done (step 188). These interpretations correspond to the arrows beginning and ending on the same state as shown in FIG. 10.

Command Manager

Figure 14:
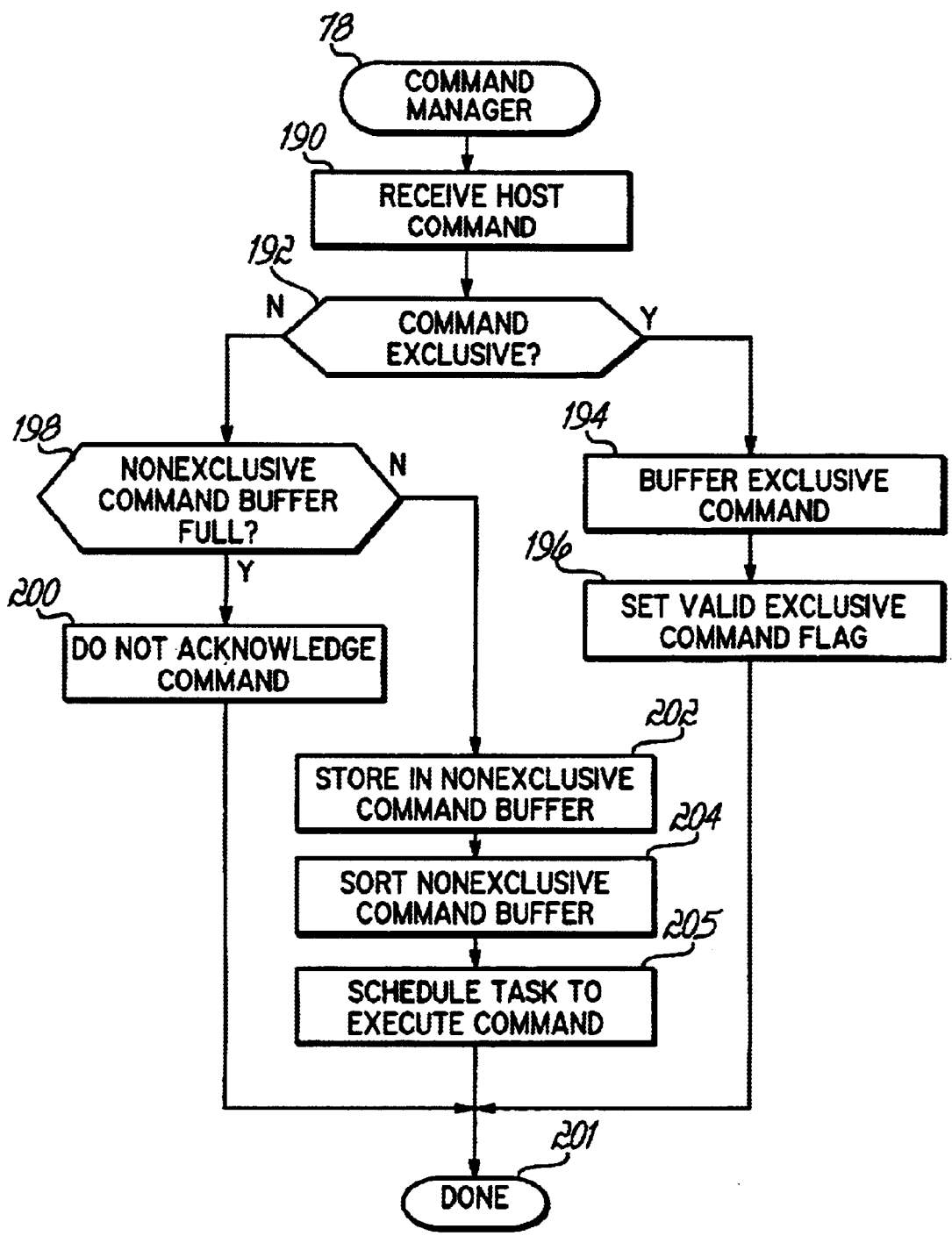
FIGS. 14 and 14A are flow charts of the command manager included in the permanent storage area of the instruction memory of the RISC CPU and virtual instruction memory of the DRAM illustrated in FIG. 1.

Referring to FIG. 14, the flow diagram of the illustrative version of the command manager 78 implements the method of receiving and categorizing host commands. The process begins at step 78 after receipt of a host command in the host command register 38 generates a hardware interrupt in the RISC CPU 12 whereupon the interrupt service routine of FIG. 9A schedules the command manager 78.

The processing step 190 executes code which receives the host command. In the preferred embodiment, this is done by first reading the host interface to get any operand and the command.

Processing then goes to step 192 to determine whether the host command is either exclusive or nonexclusive. In illustrative embodiment, all commands have an integer command identifier (ID). Exclusive commands have ID's in a particular numeric range, and non-exclusive commands have ID's outside this range. Accordingly, in step 192, the ID of a current command is compared to the exclusive range to determine whether the command is exclusive.

If the command is exclusive, the command manager 78 buffers the command and its argument, if any, (step 194) by storing them in the DRAM trick play command buffer 70, replacing, if any, an exclusive command stored in this buffer. This step could also include sorting the exclusive commands by categories to implement a two-tier search. In the illustrative embodiment, the number of exclusive commands is sufficiently small to not warrant further categorization. That is because any new exclusive host command implicitly cancels any previously received exclusive command. Then, in step 196, the valid exclusive command flag is set, and processing is done.

As discussed above, placing an exclusive command in buffer 70 and setting the valid exclusive command flag causes the state transition handler 92 to actually execute the command during the next vertical blanking cycle.

Returning to step 192, in the instance where the host command stored in the host command register 38 is determined to be non-exclusive rather than the previously discussed exclusive, processing proceeds to step 198.

Prior to any processing of the non-exclusive command, the command manager 78 checks to see whether the non-exclusive command buffer (FIG. 3) is full. In the illustrative embodiment, this check is accomplished by reading a host command buffer full flag. As noted below in connection with step 202, when storing a non-exclusive command in the nonexclusive command buffer, the command manager 78 determines whether it is at the bottom of this buffer, and if so, sets this flag. When a non-exclusive command is removed from the buffer, the flag is cleared.

When the non-exclusive command buffer is full, the command manager 78 does not process or acknowledge the host command to avoid loss of a previously received non-exclusive command, as shown in step 200. In the illustrative embodiment, this is accomplished by returning to default processing by going to the end of the subroutine (step 201). Because the command, as a result, is not acknowledged to the host, the host will then retry the command. As non-exclusive commands are executed as scheduled and the buffer emptied, room will be created so that the command can be stored during a subsequent initiation of the command manager 78.

If the non-exclusive command buffer is not full, processing proceeds to step 202 where the non-exclusive command is stored in the non-exclusive command buffer. In the illustrative embodiment, this is a buffer that holds up to eight commands as discussed above. If the buffer becomes full when the command is stored, the host command buffer full flag is set, as noted above.

Processing then optionally proceeds to step 204 where the non-exclusive commands in the non-exclusive command buffer are sorted in accordance with defined priority criteria. The default sorting is first in, first out without sorting.

The command manager then schedules a task to perform further processing of the buffered non-exclusive commands (step 205). Processing of the command manager is then done (step 201).

Figure 14A:
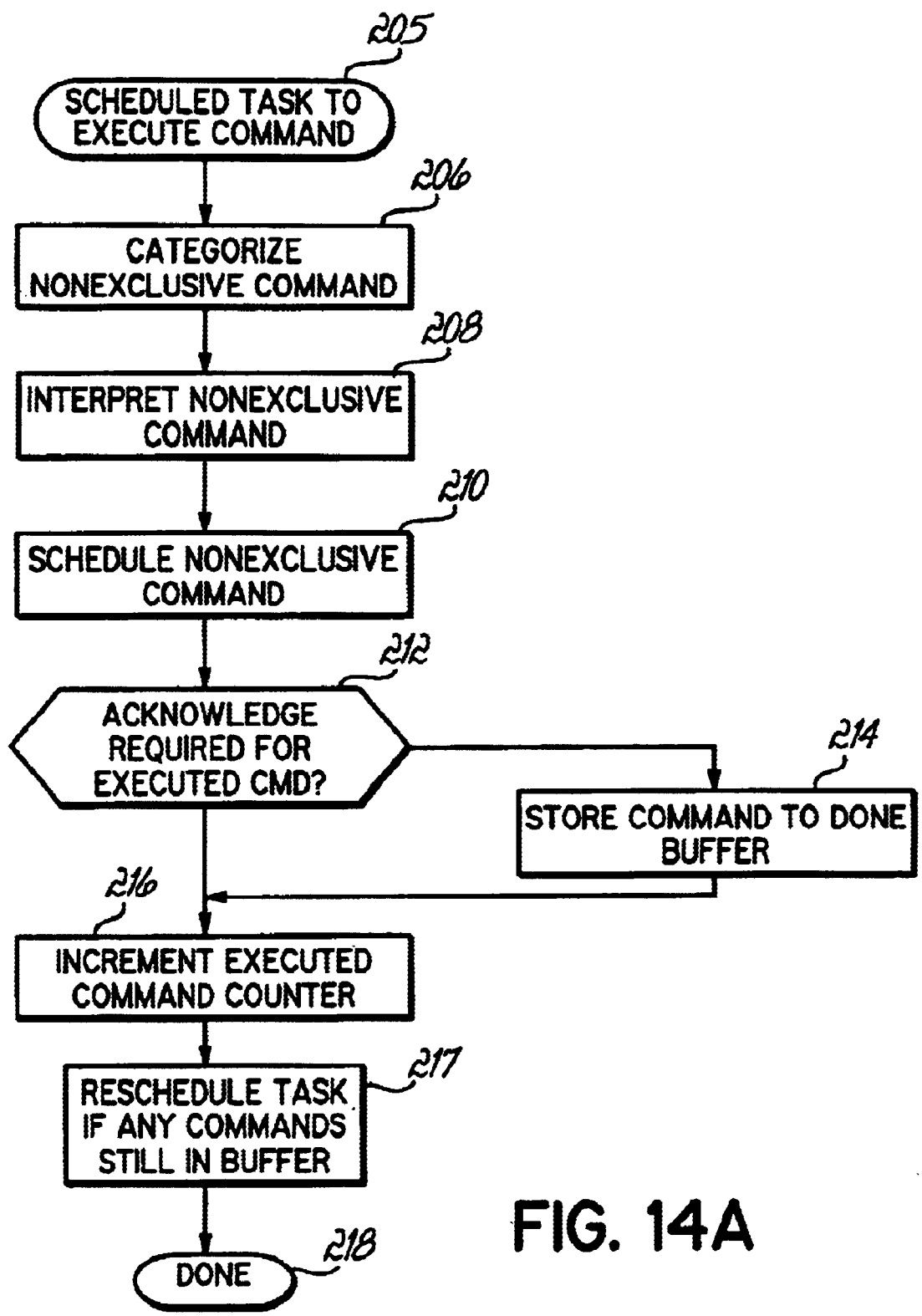

Referring now to FIG. 14A, in the task scheduled in step 205, the nonexclusive command in the first entry of the buffer 54 is then categorized (step 206) into one of the non-exclusive categories: system commands 1, system commands 2, system commands 3, sub-picture commands, on screen display commands, video commands 1, video commands 2, audio commands 1, audio commands 2, video decode commands, video display commands, audio micro commands, jacket picture display commands, and digital video broadcast (DSS) commands. These categories are each associated with a particular numeric range of command 10. Thus, to identify the category of a command, the command ID is compared to a numeric range for each category. When the command ID fits within a numeric range, it is determined that the command is in the associated category.

Once a command has been categorized, the command ID for the non-exclusive command is compared to the command ID of each command within the category, as shown in step 208, and then the command is scheduled for execution, as shown in step 210.

The search tree approach of steps 208 and 210 provide efficiencies in processing time and storage requirements. Grouping allows a smaller file to be swapped from non-resident RISC instructions 52 into the NR code area 34. The CPU 12 need only search through this smaller file to find the specific instructions. Moreover, there is more shared code for specific commands within these categories, providing efficiencies in design and code size.

Once the non-exclusive command is scheduled for execution in step 210, the completion of the host command is acknowledged, if necessary, to the host processor 39 by an interrupt message (step 212).

In the illustrative embodiment, this is accomplished by reading a flag in the host command to determine whether acknowledgment was requested by the host processor 39. If acknowledgment was requested, then processing moves to step 214 where the completed host command is stored in the command done buffer 74, and an interrupt to the host processor 39 is generated. If acknowledgment was or was not requested, processing then goes to step 216 where the executed command counter 20 is incremented.

The non-exclusive command interpreting task then reschedules itself if there are more non-exclusive commands in the buffer 54 (step 217).

Figure 15A:
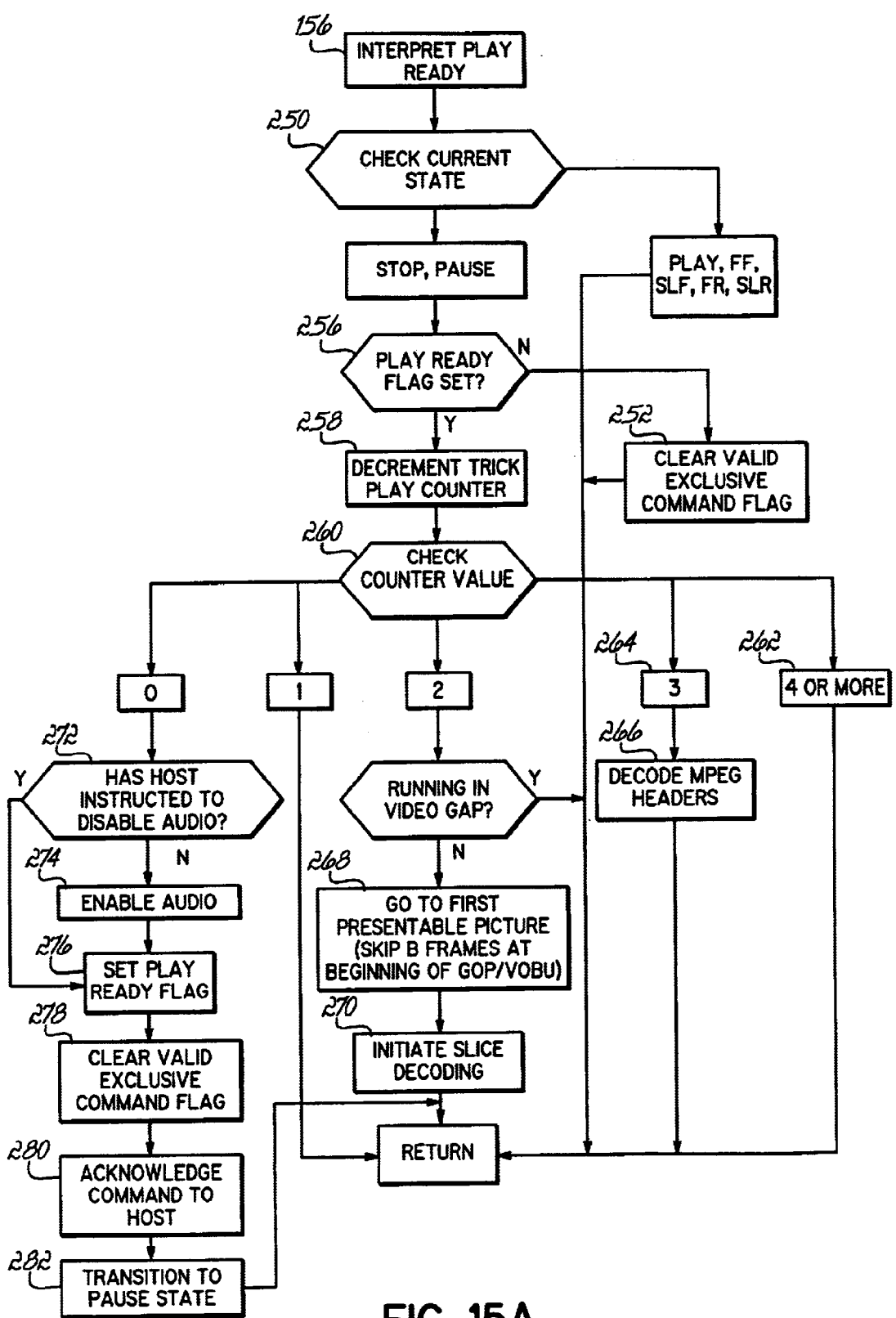
FIGS. 15A, 15B, 15C, 15D, 15E, 15F, 15G, 15H and 15I are flow charts of the detailed operations of the trick play processing state machine provided by the programming of the RISC CPU, for play, pause, slow, fast and step forward, and fast reverse processing.

Referring now to FIGS. 15A–15I and 16A–16D, the detailed operations of the trick play processing state machine can be explained. Beginning with FIG. 15A, the operations performed as part of interpreting the "play ready" exclusive command (step 156) can be discussed in detail. The "play ready" command instructs the ASIC to prepare its internal state and DRAM buffers to begin decoding and displaying video data. Ordinarily, the "play ready" command is executed as part of a global reset of the ASIC when, for example, the device incorporating the ASIC is first powered on.

As will be discussed below with reference to FIG. 17A, decoding of video data occurs in two parts: (1) software that parses picture headers and performs initial setup for decoding, including selecting a frame buffer and setting up decode parameters, and (2) software that controls the video decoder hardware 19 to generate decoded data and store the decoded data into the selected frame buffer. As shown below in FIG. 17A, part (1), initial parsing, ends when a frame is ready for decoding. Unless the software is in a special "continuous decoding" mode, used only for reverse decoding, after initial parsing, the generation of decoded pixels (part (2)) does not automatically commence, but rather must be separately initiated at the appropriate time, as determined by the trick play routines described in FIGS. 15A–15I and 16A–16D. Once part (2) has been initiated, an entire frame is decoded. When the decoding of a frame (part (2)) is completed, and a picture start code is encountered in the buffered MPEG video, indicating the start of the next frame, the decode software automatically re-initiates part (1) to parse the headers for the next frame to perform initial setup to decode the next frame, and then (unless in continuous decoding mode), again pauses until re-initiated.

To begin processing the "play ready" command, the current state of the trick play processing state machine is evaluated (step 250). If the current state is other than STOP or PAUSE, then the system is already prepared for video decoding and display. In this situation, the valid exclusive command flag is cleared (step 252), so that default processing for the current state will be performed for subsequent fields. Thereafter, processing of the play ready command is done (step 254).

If the current state of the trick play processing state machine is STOP or PAUSE, then the current state of the "play ready" flag is evaluated (step 256). This flag is set whenever the "play ready" exclusive command has been successfully executed. If this flag is set, then it is not necessary to reexecute the play ready command, and processing proceeds to step 252, and resets the valid exclusive command flag, and processing is done.

If the current state is STOP or PAUSE and the "play ready" flag is not set, then the processing of the play ready command commences. In step 258, a trick play counter is decremented. This counter is initialized upon a global software reset to a predetermined value such as 6, to designate the number of fID transitions that will transpire before the software reset is completed. The counter is used in interpreting the "play ready" exclusive command to delay the completion of this command. Specifically, in step 260, the current value of the counter is used to branch to a number of processes. If the value of the counter is greater than 4 (step 262), then processing completes without further action. As a consequence, during the next fID transition, when processing passes through the state transition handler (FIG. 9), the valid state transition flag will remain set, and processing will proceed to interpret the exclusive command via the routine of FIG. 10. This will cause the "interpret play ready" routine of FIG. 15A to be re-executed, and control will pass again through steps 250, 256 and 258. In this second and each subsequent pass through these steps during subsequent fID transitions, the trick play counter will be decremented in step 258.

Ultimately, in step 260, the trick play counter will reach a value of 3, in which case processing will proceed to step 266, in which the MPEG headers of the first MPEG group of pictures (GOP) in the DRAM buffer of the ASIC will be interpreted. After these headers are interpreted, the processing will be complete.

In the next pass through the "play ready" processing routine, the trick play counter will have a value of 2. In this case, so long as the video is not in a "video gap" (a section of an MPEG-2 stream in which there is audio but no new video, used, e.g., in a slide show), processing will proceed from step 260 to step 268, in which processing will locate the first presentable picture (FPP) of the MPEG GOP in the DRAM buffer of the ASIC. This operation may involve skipping B frames located at the beginning of the first GOP in the buffer, in those cases where the GOP does not have an I reference frame at the beginning of the GOP. After locating the FPP, then the decoding engine of the ASIC is initiated to be ready to perform slice decoding on the slices of the FPP of the MPEG GOP in the DRAM buffer (step 270). Thereafter, processing is complete. If running in a video gap, then steps 268 and 270 are not performed; in this situation, the audio will play back from the starting point, but the video will not begin until the first presentable picture is encountered.

In the next pass through the "play ready" processing routine, the trick play counter will have a value of 1, in which case processing will return without further action.

Finally, in the last pass through the "play ready" processing routine, the trick play counter will have a value of 0, in which case processing proceeds to step 272, in which the ASIC determines whether the host as instructed the ASIC to disable audio output (through a non-exclusive command). If not, then in step 274, the audio output is enabled. After step 272 or 274, processing proceeds to step 276, in which the "play ready" flag is set, and then to step 278, in which the valid exclusive command flag is cleared, so that default processing for the current state will be performed thereafter. Next, in step 280, the "play ready" command is acknowledged to the host, so that the host can determine that the command has been successfully executed and the ASIC is now ready for playback. In step 282, the trick play processing state machine transitions to its PAUSE state, ready for playback. After this processing, the "play ready" command processing is done (step 254).

In general, in all forward play modes, e.g., PLAY as well as SLOW FORWARD, FAST FORWARD and step forward, the involvement of the host is minimal. The host need only deliver the appropriate exclusive command to the ASIC 11, and then control the playback device 13 (FIG. 1) to provide each VOBU or GOP from the source to the ASIC 11 in forward order, as fast as the VOBU's are consumed by the ASIC 11 (the ASIC delivers interrupts to the host as each VOBU/GOP is consumed so that the host knows when more data is needed). (It will be noted that video CD sources are divided into sectors, which do not evenly align with GOP's. It will be appreciated that, in this case, the data from each sector is played to the ASIC 11 in a forward order.)

Figure 15B:
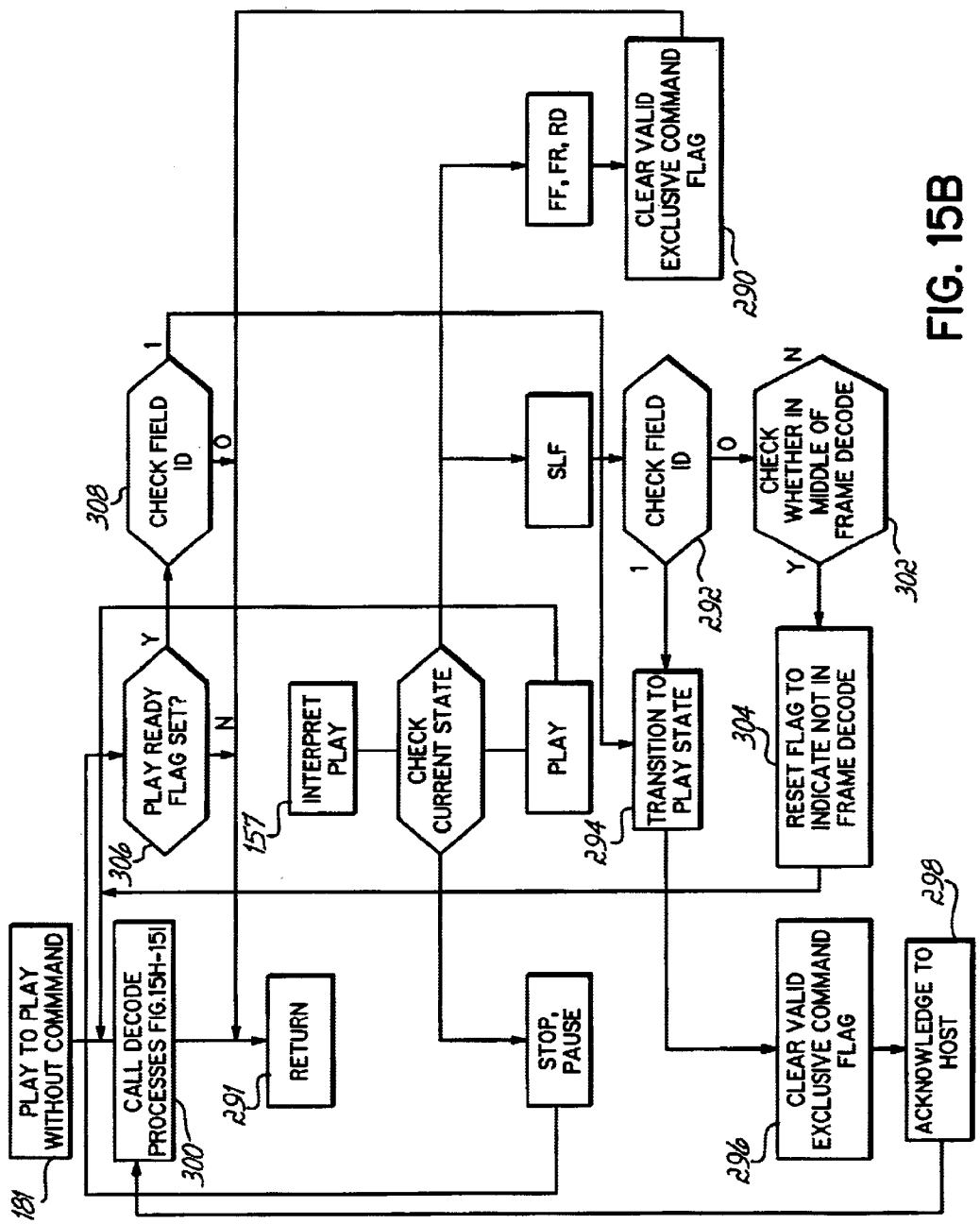

Referring now to FIG. 15B, the processing of the "play" exclusive command and the default processing in the PLAY state of the trick play processing state machine can be described. When a new "play" exclusive command is processed (step 157), the current state of the state machine is evaluated to determine the appropriate action to take. If the current state of the state machine is FF (fast forward), FR (fast reverse) or RD (reverse decode), the transition to PLAY is not permitted. Accordingly, in these cases the valid exclusive command flag is cleared (step 290), so that the trick play processing state machine will ignore the "play" command and will not acknowledge it to the host. Processing is then done (step 291).

If the current state of the trick play processing state machine is SLF (slow forward), then the current field ID (fID) is checked (step 292) to determine whether a transition from the SLF to PLAY states is appropriate at the current time. As will be seen, transitions from one state to another are only permitted when field 1 (the bottom field) is currently being displayed, so that the state transition begins upon display of field 0 (the top field). This restriction ensures that the top field is always appropriately displayed on the even scan lines and the bottom field is displayed on the bottom scan lines. Accordingly, if the fID is 1 in step 292, then processing proceeds to step 294, in which the trick play processing state machine transitions to the PLAY state, and then to step 296 in which the valid exclusive command flag is cleared. Thereafter, in step 298, the execution of the "play" trick play command is acknowledged to the host, so that the host can determine that the command was successfully executed. Finally, in step 300, the decode processes of FIGS. 15H–15I are called to cause the next frame to be decoded and set up its display, if appropriate.

If, in an attempted transition from the SLF state to the PLAY state, it is determined in step 292 that the fID is 0, then the transition to PLAY must be delayed for the duration of one field. In this case, processing proceeds to step 294, in which a flag is checked to determine whether the trick play processing state machine is in the middle of a frame decode as part of processing the SLF state. As will be noted below, in the SLF state, at a periodic interval, a new frame is decoded and displayed, and between these occurrences, the current frame is repeatedly displayed.

Figure 15C:
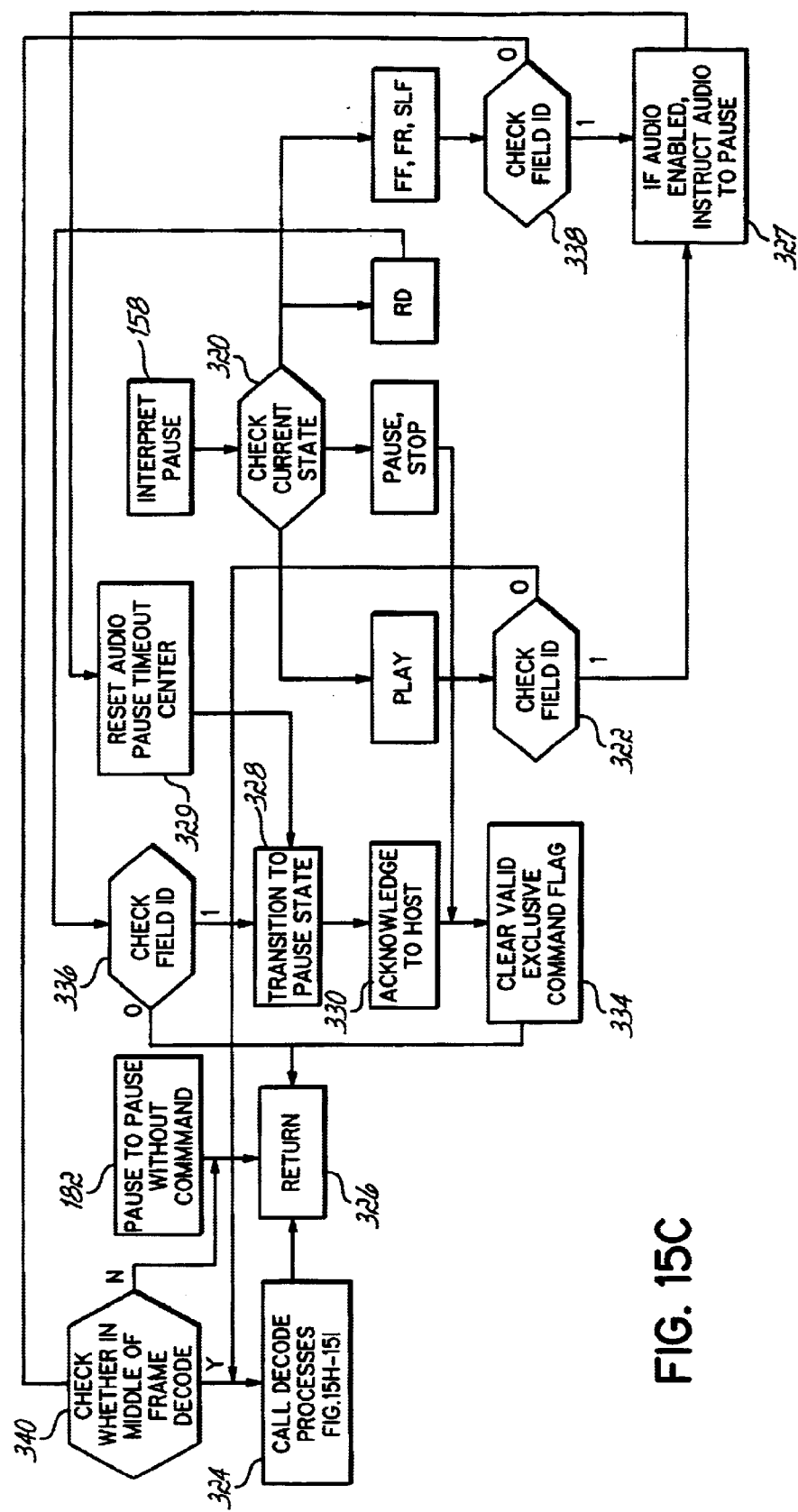
Figure 15D:
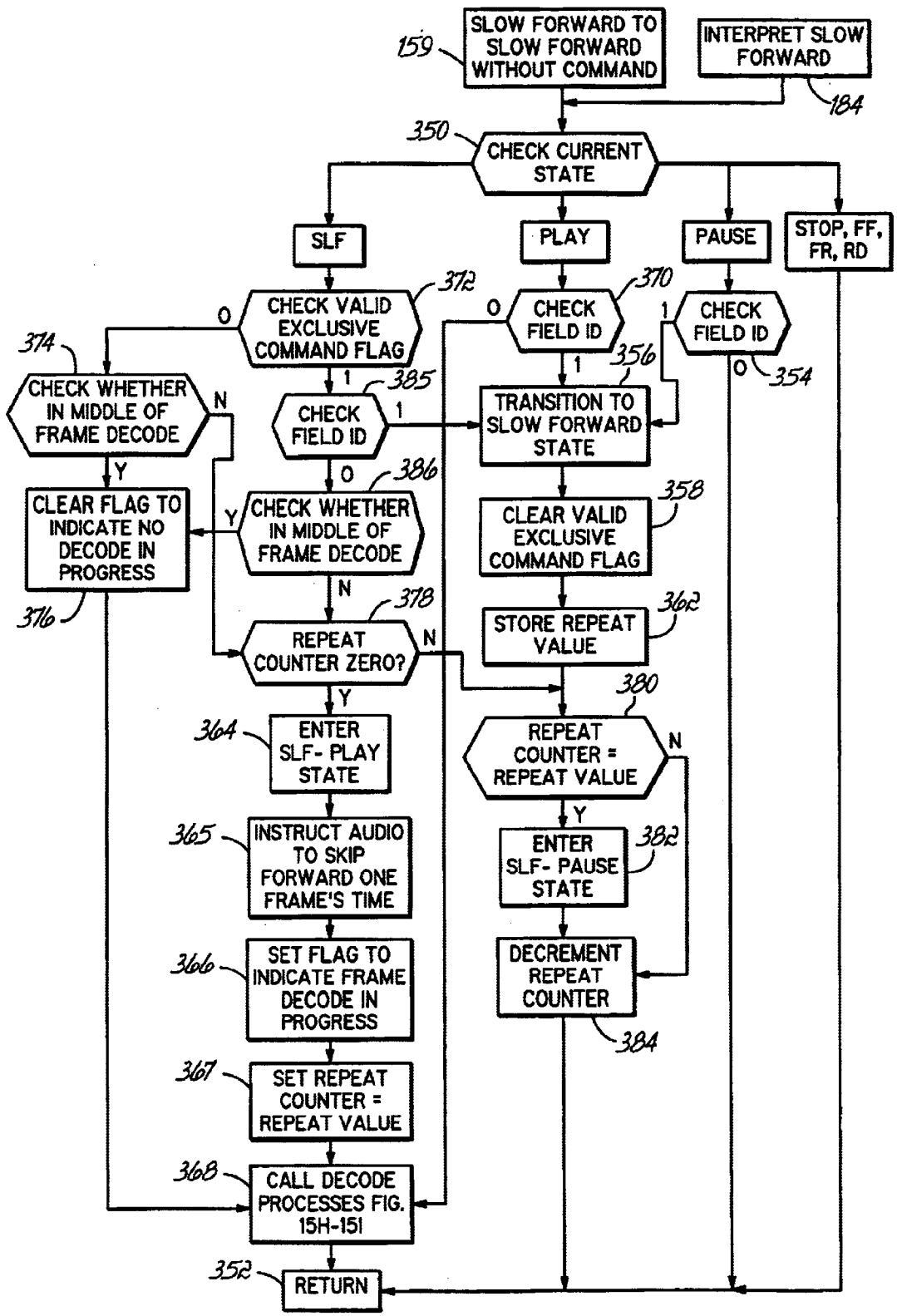
Figure 15E:
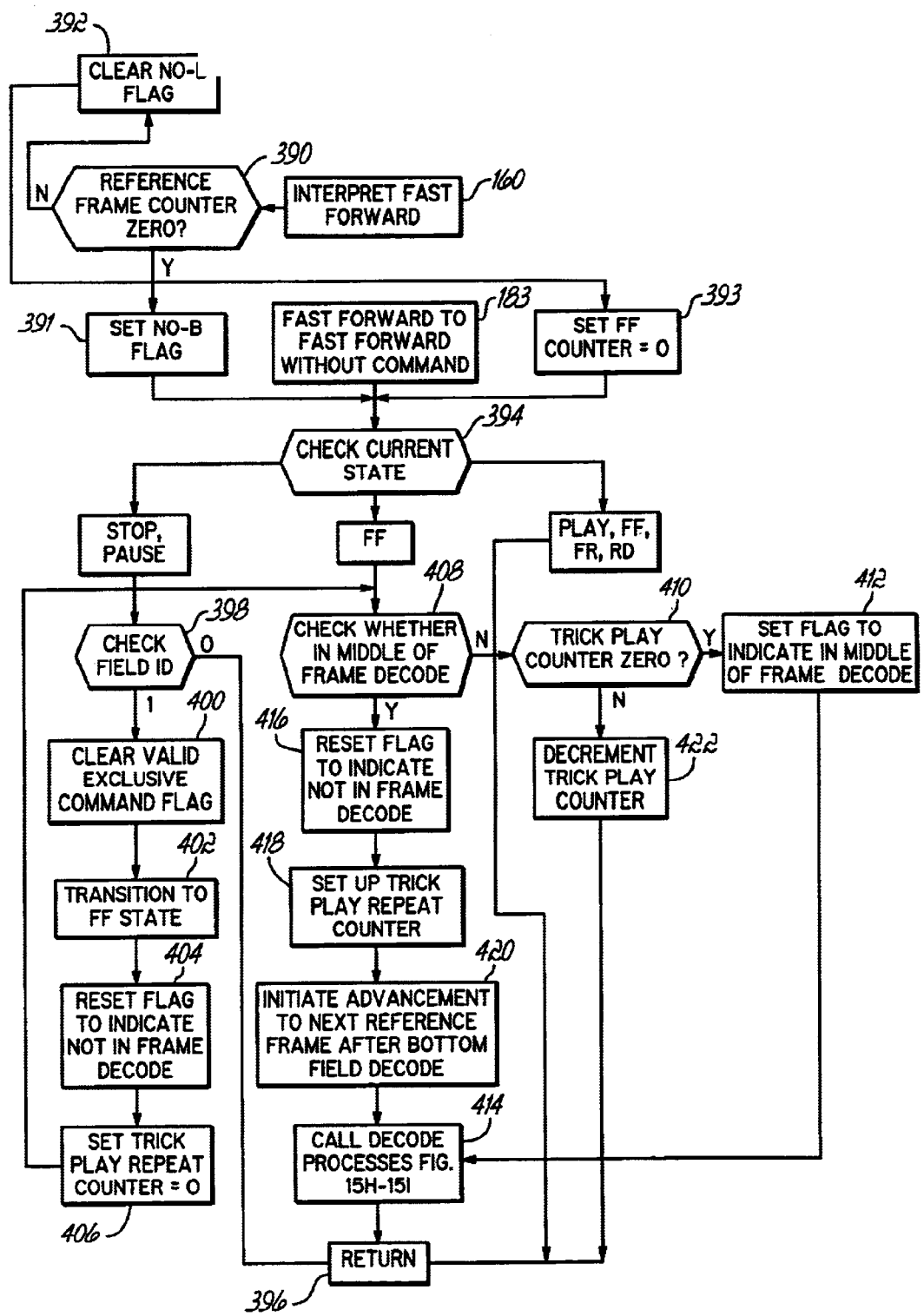
Figure 15F:
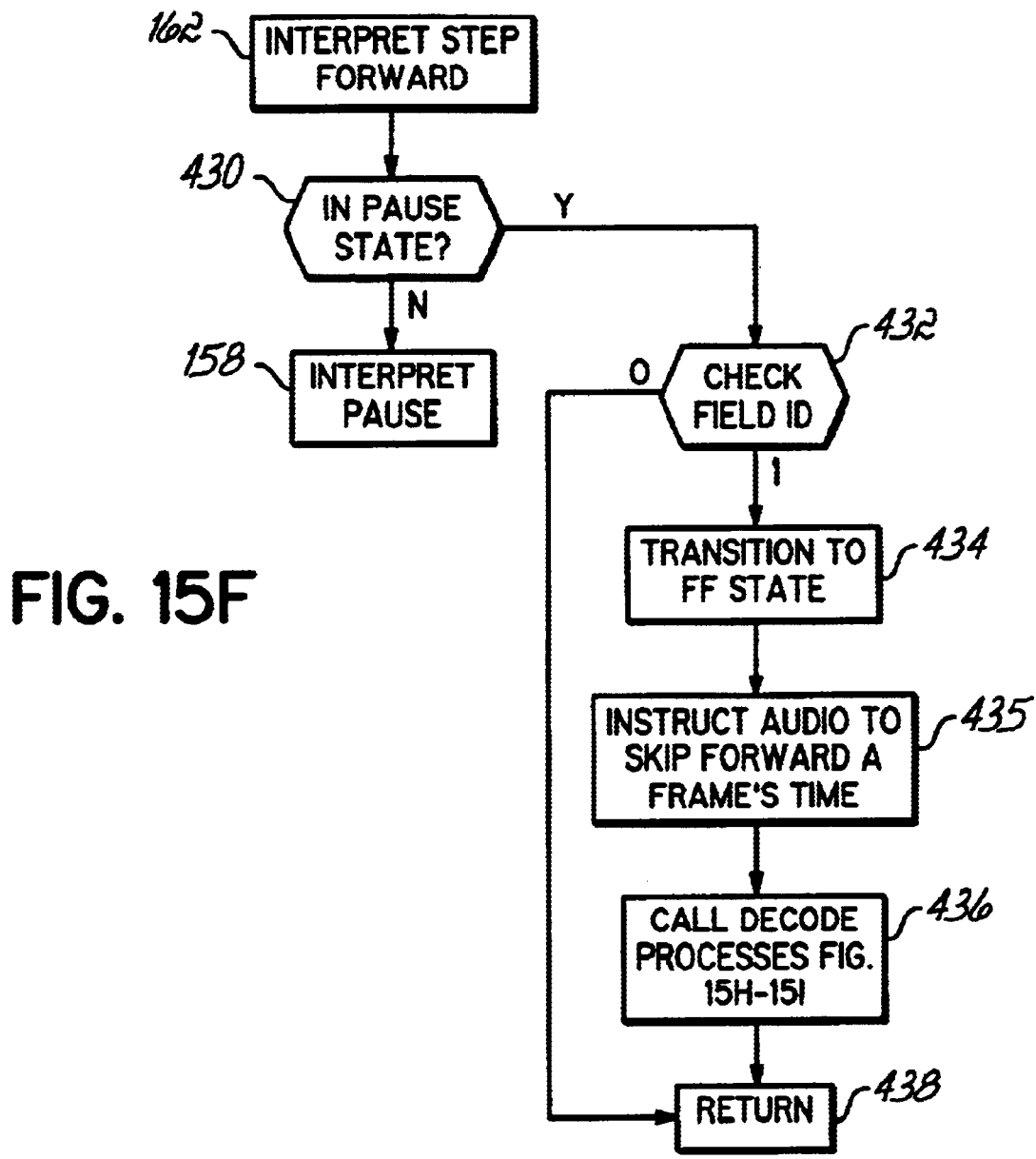
Figure 15G:
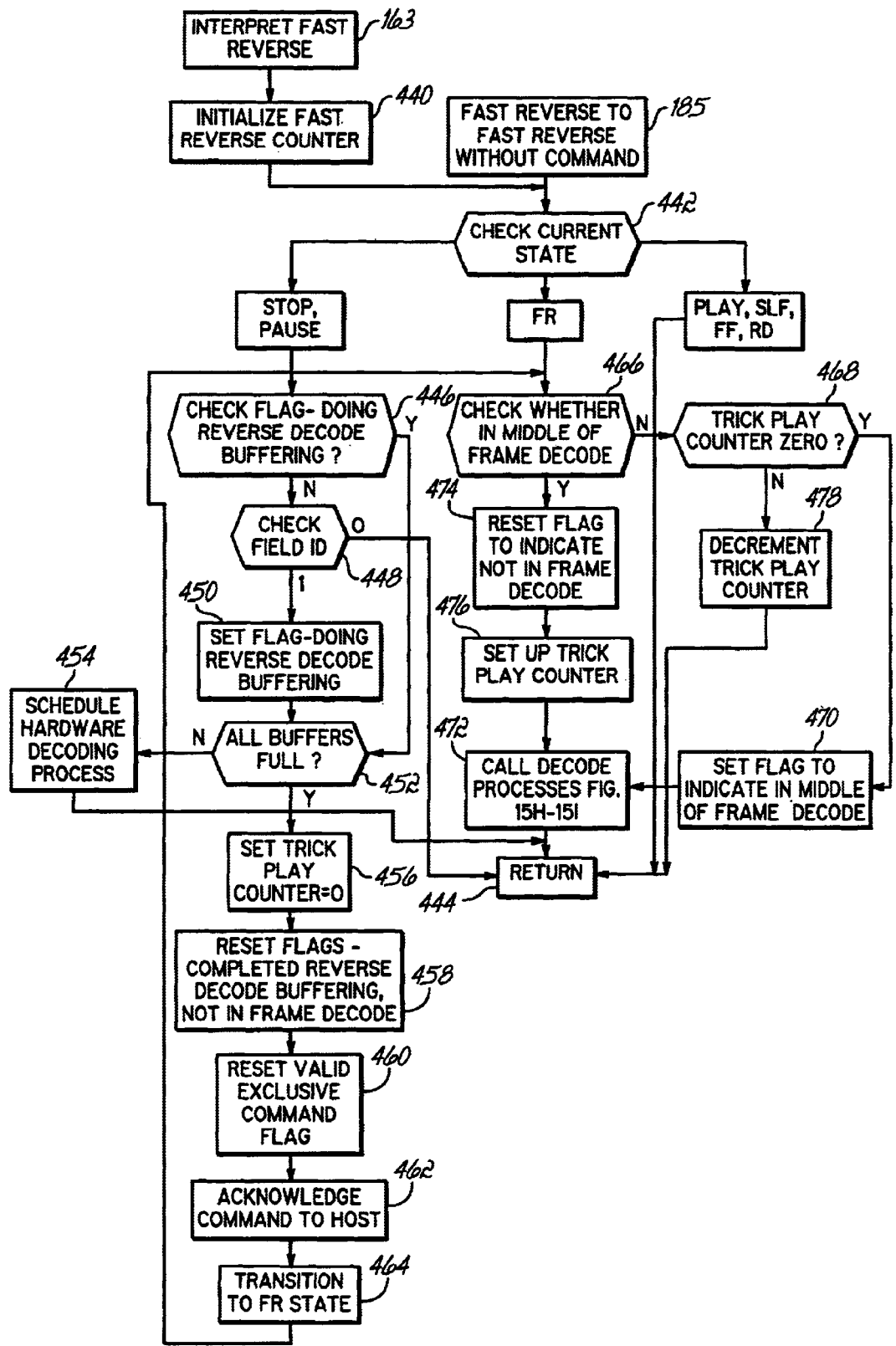
Figures 15H, 15I:
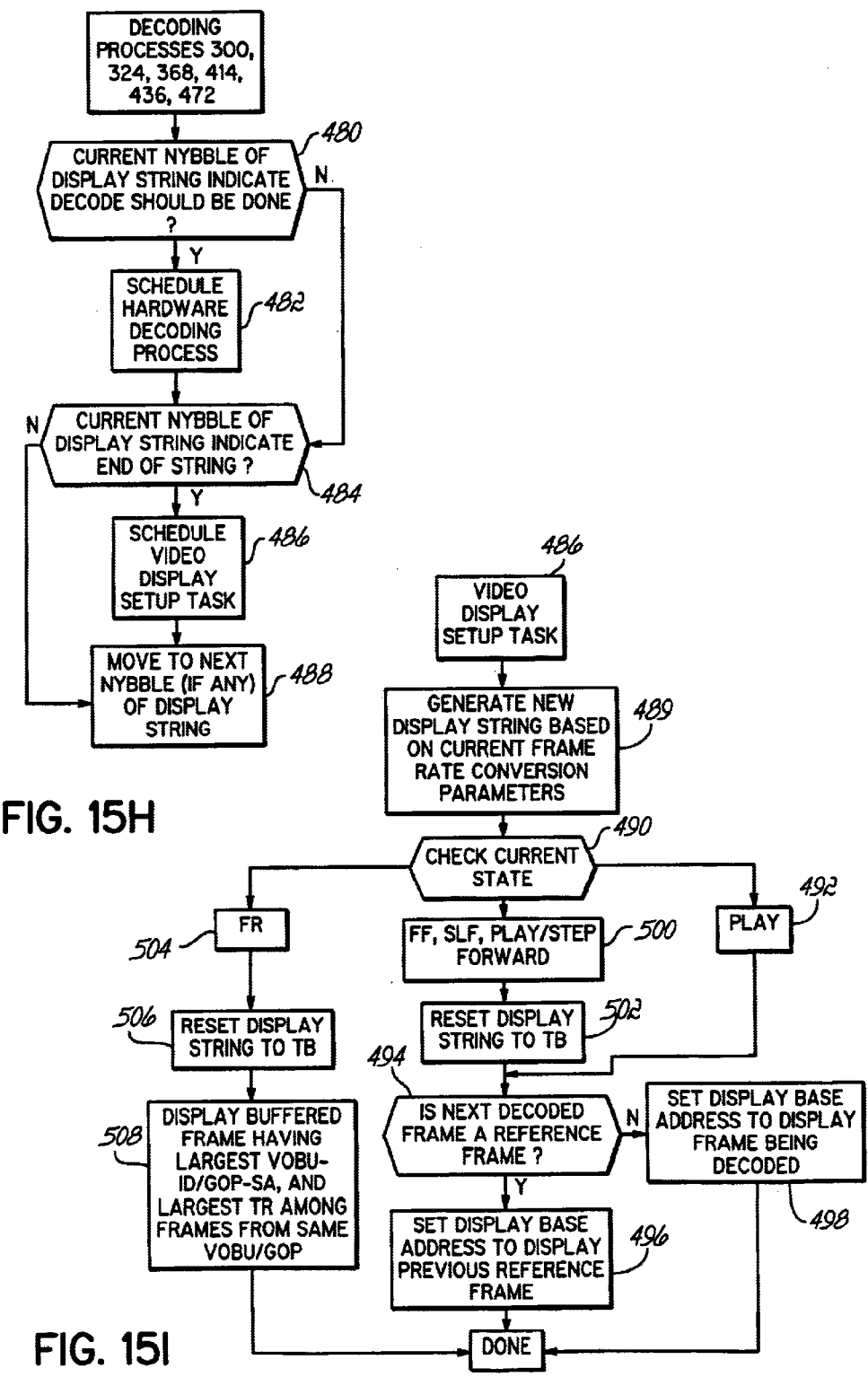

As will be seen in greater detail below, in play modes other than normal playback, to decode a new frame, the decoding process illustrated in FIG. 15H–15I is called twice, during each of two successive vertical blanking intervals. The first call to the decoding process causes the hardware to decode the next frame, but does not set up the relevant display parameters for display of the next frame. The second call to the decoding process sets up parameters to display the next frame when the display sequences to the next frame. A similar process is used during normal playback, however, the display parameters for a frame during normal playback, may require that the decoding process be called three or more times to decode and set up a frame for display; this is done to permit "pull down", i.e., repetition of fields in order to alter the video frame rate.

If a state transition command is received between the first and second calls to the decoding process described above, i.e., while a new frame is being decoded in the SLF state, it is critical that the state transition handler complete the decoding of the new frame before transitioning from the SLF state. To facilitate this, when a new frame is being decoded in the SLF state or other similar states, a flag is set to indicate that the trick play processing state machine is in the midst of decoding a new frame. In step 302, this flag is checked to determine whether a new frame is currently being decoded. If not, then processing is done for the current field (step 291). Note that, in this instance, the valid exclusive command flag is not cleared, so that the "play" trick play command handler of FIG. 15B will be reexecuted during the next field, at which time fID will be 1 and the state transition to the PLAY state can be completed.

If in step 296, there is a set flag, indicating that the trick play processing state machine is in the midst of decoding a new frame for the SLF state, then processing proceeds to steps 304 and 300. In step 304, the flag is cleared, to indicate that the new frame decoding for the SLF state is done. Then, in step 300, the decode subroutine is called, to complete the decoding of the new frame for the SLF state. After step 300, processing is done (step 291).

Here again, note that the valid state transition flag is not cleared, with the consequence that the "play" trick play command handler of FIG. 15B will be reexecuted during the next field, at which time fID will be 1 and the state transition to the PLAY state can be completed.

If, when a "play" trick play command is received, the trick play processing state machine is in the STOP or PAUSE states, then processing proceeds to step 306. In step 306, the condition of the play ready flag is checked. Normally, the play ready flag will be set, but if it is not set then the PLAY command must be ignored, by immediately returning (step 291). If the "play ready" flag is set, however, then processing proceeds to step 308, in which the current fID is checked. If the current fID is 0, then the state transition to the PLAY state must wait for the duration of one field, for reasons identified above. Accordingly, in this situation processing immediately ends (step 291). If, however, the current fID is 1, then processing proceeds to steps 294, 296 and 298, in which, as discussed above, the trick play processing state machine enters the PLAY state, clears the valid exclusive command flag and acknowledges successful execution of the command to the host, and then calls the decode subroutine to begin the decoding and display of frames in the PLAY state.

If the trick play processing state machine is in the PLAY state when a "play" trick play command is received, or if no trick play processing command is received and default processing of the PLAY state is performed (block 181), processing proceeds directly to step 300, in which the decode subroutine is called to decode a new field of video for display. Thus, after a successful transition to the PLAY state, for each fID a call is made to the decode subroutine, and processing of the trick play handler ends, so that new frames are continuously decoded and displayed.

Referring now to FIG. 15C, the trick play processing for the PAUSE trick play state can be described. When a new "pause" trick play command is received, processing proceeds from block 158 to block 320, in which the current trick play state is evaluated. If the current trick play state is PLAY, then in step 322 the fID value is checked to determine whether it is appropriate to transition to the PAUSE state. As noted above, if the fID is zero, then the bottom frame is currently being displayed, and the transition to the PAUSE state should be delayed until after one more field has been decoded and displayed. Thus, in this situation, processing proceeds from step 322 to step 324, where the decode subroutine is called, causing the bottom field to be decoded and displayed. After calling the decode subroutine, processing proceeds to step 326, and the trick play processing is complete. Note under these conditions that the valid exclusive command flag is not cleared, so that upon the next transition of fID, processing will return to the PAUSE trick play handler, and pass through step 320 to step 322 again.

If in step 322, the fID value is 1, then it is appropriate to transition from the current PLAY state into the PAUSE state. Under these conditions, therefore, processing proceeds from step 322 to step 327, in which the audio decoder is instructed to pause if it is enabled, and then to step 329, in which an audio pause timeout counter is initialized. Then processing proceeds to step 328, in which the transition is made to the PAUSE state. Then, in step 330, the "pause" trick play command is acknowledged to the host and in step 334, the valid exclusive command flag is cleared. After this processing, the transition to the PAUSE state has been completed, and the trick play handler is done (step 326). During subsequent passes through the routine of FIG. 15C during default processing of the PAUSE state, the timeout counter initialized in step 329 is evaluated to determine whether the audio has paused. If after a period of time, no confirmation has been received from the audio (this may occur if the audio decoder is not receiving data because data delivery has been discontinued because the video is paused), then the audio decoder is disabled.

Transitions from the STOP state to the PAUSE state are permitted regardless of the value of the fID, for the reason that no frames are displayed in the STOP state. Accordingly, if the current state is STOP when a "pause" exclusive command is received, then the trick play state transition handler of FIG. 15C proceeds directly to steps 328, 330 and 334 described above, in which the transition is made to the PAUSE state and the "pause" trick play command is acknowledged to the host.

Transitions from the RD (reverse decode) state to the PAUSE state are permitted only when fID is zero. Accordingly, if the current state is RD when the "pause" trick play command is received, processing proceeds to step 336. If in step 336, fID is 0, then the state transition cannot occur until one field later. Under these conditions, therefore, processing proceeds to step 326 and the trick play handler of FIG. 15C is done. It will be noted that the transition to PAUSE from the RD state is different than the transition from the PLAY state described above, in that the transition from the RD state does not call the decode subroutine even when fID is 0, whereas in the PLAY state, the decode subroutine is called when fID is 0. In the RD state, it is unnecessary to call the decode subroutine with each fID transition, as the decoding of frames is handled by a separate and independent task from the state transition handler as is described in more detail below. As a consequence, it is not necessary to call the decode handler as part of transitioning from the RD state, even when fID is 0 in step 336 and as a result the transition must be delayed for one field.

If in step 336, fID is 1, then the transition from the RD state to the PAUSE state can be performed immediately. In this circumstance, processing proceeds from step 336 directly to steps 328, 330 and 334, causing the transition to the PAUSE state and acknowledging the "pause" trick play command to the host.

If in step 320, the current state is FR (fast reverse), FF (slow reverse) or SLF (slow forward), then processing of a transition to the PAUSE state proceeds to step 338. In step 338, it is determined whether fID is 1. If fID is 1, then the transition to the PAUSE state can begin immediately, and consequently processing proceeds directly to steps 328, 330 and 334 as described above. However, if fID is 0 in step 338, then the transition to the PAUSE state must be delayed for one field. In this circumstance, processing continues to step 340, in which internal flags are evaluated to determine whether the trick play state machine is in the process of decoding a new frame as part of processing in the FR, FF or SLF states. As noted above and elaborated below, when in the SLF, FF or FR states, periodically a new frame is decoded for output, and between these occurrences, frames that have previously been decoded are repeatedly displayed. Flags are set in each of these states to indicate when a new frame is in the process of being decoded. If processing of any of these states is in the midst of decoding a new frame, then the decode subroutine must be called to ensure this decoding is completed before a transition is made to the PAUSE state. Accordingly, if in step 340 it is determined that the prior SLF, FF or FR state is in the midst of decoding a new frame, processing proceeds to step 324, in which the decode subroutine is called to complete the decoding, and then processing is done (step 326). If the prior SLF, FF or FR state is not in the midst of decoding a new frame, processing proceeds from step 340 directly to step 326.

After the PAUSE state has been entered, until a new exclusive command is received, default processing is performed. Because no new frames are decoded when the state machine remains in the PAUSE state, default processing for the PAUSE state (step 182) proceeds directly to step 326 to complete processing.

Referring now to FIG. 15D, trick play state transitions for a "slow forward" exclusive command can be explained. Upon receipt of a new "slow forward" exclusive command, processing sequences through step 159 to step 350. Default processing in the SLF state proceeds from step 184 to step 350 as well. In step 350, the current state is determined and appropriate further actions are taken.

If the current state is STOP, FF (fast forward), FR (fast reverse) or RD (reverse decode), a transition to the SLF state is not permitted. In this circumstance, therefore, processing proceeds directly to step 352 and the state transition handler of FIG. 15D is completed.

If the current state is PAUSE when a "slow forward" exclusive command is received, processing proceeds to step 354, in which the current fID is checked. As noted above, state transitions are only permitted when fID is 1. Accordingly, if fID is 0 in step 354, processing proceeds to step 352 and is done. If, however, fID is 1 in step 354, then processing continues to step 356, in which the trick play state machine sequences to the SLF state. Next, in step 358, the valid exclusive command flag is cleared, so that default processing will be performed for subsequent video fields. Then, in step 362, a repeat value identified in the "slow forward" exclusive command is stored into the memory of the ASIC, for use in later determinations of the speed at which the slow forward processing should proceed. Specifically, in the SLF state, a frame is decoded, and then display of this frame is repeated for a number of times identified by the repeat value, after which a new frame is decoded. The repeat value identifies a number of times a repeated field will be output before the next frame is decoded, and accordingly typically is an even number in the range of 1 to 10 or more, based upon the slowness of playback that is desired.

When the SLF state is initially entered, a single frame is decoded, and then is repeatedly displayed for the number of times identified by the repeat value. Accordingly, after step 362, in step 364 the trick play state machine enters the sub-state SLF-PLAY, during which a new frame is decoded. Then in step 365, the audio decoder is instructed to skip forward for the duration of one video frame, so that the audio and video remain synchronized. Subsequently, in step 366, a flag is set to indicate that processing of the SLF state is in the midst of decoding a frame. This flag is used in this and other state transition handlers to ensure that frame decoding is completed prior to a state transition. Then, processing proceeds to step 367, in which a repeat counter is initialized with the repeat value from the SLF command that was stored in step 362. The repeat counter is later used to determine the number of times that the current frame should be displayed. Then, in step 368 the decode subroutine is called to begin decoding the new frame. Processing is then done (step 352).

When a "slow forward" exclusive command is received in the PLAY state, processing very similar to that for the PAUSE state is performed. When the command is received in the PLAY state, in step 370, the current value of fID is checked. If fID is 1, the transition to the SLF state can proceed immediately, and processing proceeds to steps 356 through 368 as described above in connection with the transition from PAUSE to SLF. If, however, fID is 0, then the transition from the PLAY state to SLF must wait for one more field. In this situation, processing proceeds to step 368, in which the decode subroutine is called. This ensures that decoding of the current frame in the PLAY state is completed. After step 368, processing is done (step 352).

When a "slow forward" exclusive command is received in the SLF state, or when default processing of the SLF state is performed, processing proceeds to step 372, in which the value of the valid exclusive command flag is checked. Assuming default processing is being performed, and no new SLF command has been received, in step 372, the valid exclusive command flag will be cleared, in which case processing proceeds to step 374. In step 374, a determination is made, based on the flag described above, whether decoding of a new frame in the SLF state is underway. If so, then processing proceeds to step 376, in which the flag is cleared to indicate that decoding is no longer in process, and then to step 368 in which the decode routine is called to complete the decoding of the frame.

If in step 374, it is determined that decoding of a new frame is not underway, then processing proceeds to step 378, in which the repeat counter described above is compared to zero. If the repeat counter reaches a value of zero, then it is time to begin decoding of a new frame.

If in step 378, the repeat counter is not zero, then processing continues to step 380 in which the repeat counter is compared to the initial repeat value obtained with the command. If the counter is equal to the value in step 380, this indicates that the current pass through the subroutine of FIG. 15D, is the first pass through this subroutine after a transition to the SLF state, because the repeat counter has as yet not been decremented. Therefore, when the repeat counter is still equal to its initial value in step 380, processing continues to step 382 in which the ASIC enters the SLF-PAUSE sub-state, indicating that the current frame will be output repeatedly until the repeat counter is decremented to zero. After step 382, or immediately after step 380 if the repeat counter is not equal to its initial value, in step 384 the value of the repeat counter is decremented. Then processing continues to step 352, and is done. Note that no new frames are decoded under these circumstances, and as a consequence the same frame is output repeatedly until the repeat counter is decremented to zero.

Ultimately, barring any other action by the host, the repeat counter is decremented to zero, and when this is done, in the next pass through the subroutine of FIG. 15D, processing will proceed from step 378 to steps 364 through 367, described above, in which the decoding of another frame is initiated.

Returning now to step 372, under certain circumstances a new "slow forward" command may be received while the trick play state machine is already in the SLF state. For example, the host may wish to change the repeat counter value to generate faster or slower playback. Under these circumstances, in step 372 the valid exclusive command flag will be set. In this case, processing proceeds to step 385, in which the current fID is checked. If the current fID is 1, then the new "slow forward" command can be immediately executed, and processing proceeds to steps 356 through 368 as described above, which among other things stores the new repeat value from the new "slow forward" command and begins the decoding of a new frame.

If in step 385, the current fID is 0, then the new "slow forward" command cannot be immediately processed, and the subroutine proceeds to step 386, where the flag described above is checked to determine whether decoding of a frame is in process. If a new frame is currently being decoded, then processing proceeds to steps 376 and 368, described above, to reset the flag and complete the decoding of the frame. If a new frame is not currently being decoded, then processing proceeds to step 378, described above, to determine whether the repeat counter has reached a zero value, and if so to begin decoding a new frame.

Referring now to FIG. 15E, trick play state transitions for a "fast forward" exclusive command can be explained. Upon receipt of a new "fast forward" exclusive command, processing sequences through step 160 to step 390. In step 390, a reference frame counter in the "fast forward" command is evaluated, to determine how the "fast forward" command is to be executed. In the FF state, reference frames from the MPEG video stream are decoded and displayed. A set number of reference frames from each MPEG video object unit (VOBU) are decoded, and then processing skips to reference frames in the next VOBU. The reference frame counter delivered with the "fast forward" command identifies the number of reference frames that are to be decoded from each VOBU. The host then provides each VOBU to the ASIC 11 in forward order, as fast as the VOBU's are consumed by the ASIC 11 (the ASIC delivers interrupts to the host when its buffers become full so that the host knows when to stop supplying data). The FF state also has a special "no-B" mode, in which every reference frame from each VOBU is decoded and displayed. If the reference frame counter with the "fast forward" command has a value of zero, then the FF state enters the "no-B" mode.

Accordingly, in step 390, the reference frame counter in the "fast forward" command is compared to zero, and if the reference frame counter is zero, then in step 391 a "no-B" flag is set to enter the "no-B" FF mode. If the reference frame counter is other than zero, then in step 392 the "no-B" flag is cleared, and subsequently in step 393 a FF counter used to count the number of reference frames output from the current VOBU, is initialized to a value of zero (the FF counter is not used in the "no-B" mode and so is not initialized after step 391).

After step 391 or 393, processing arrives at step 394 in which the current state is determined and appropriate further actions are taken. Default processing in the FF state (step 183) proceeds directly to step 394.

If the current state is PLAY, SLF (slow forward), FR (fast reverse) or RD (reverse decode), a transition to the FF state is not permitted. In this circumstance, therefore, processing proceeds directly to step 396 and the state transition handler of FIG. 15E is completed.

If the current state is STOP or PAUSE when a "fast forward" exclusive command is received, processing proceeds to step 398, in which the current fID is checked. As noted above, state transitions are only permitted when fID is 1. Accordingly, if fID is 0 in step 398, processing proceeds to step 396 and is done. If, however, fID is 1 in step 398, then processing continues to step 400, in which the valid exclusive command flag is cleared, so that default processing will be performed for subsequent video fields. Next, in step 402, the trick play state machine sequences to the FF state. Next, in step 404, the flag discussed earlier is reset to indicate that a frame decode is not currently underway. Then, in step 406, a trick play counter is initialized to a zero value, for use in later determinations of the speed at which the fast forward processing should proceed. Specifically, in the FF state, a reference frame is decoded, and then display of this frame is repeated for a number of times identified by a repeat value received with the "fast forward" command, after which a new reference frame is decoded. The repeat value identifies a number of times a repeated field will be output before the next frame is decoded, and accordingly typically is an even number in the range of 1 to 10 or more, based upon the speed of fast forward playback that is desired. When the FF state is initially entered, a single frame is decoded, and then is repeatedly displayed for the number of times identified by the repeat value; to achieve this functionality, the trick play repeat counter is initialized to a value of zero.

If in step 394, the state machine is in the FF state, processing proceeds to step 408 to perform default processing. Also, after the various setup steps 398–406, processing also proceeds to step 408. In step 408, the flag discussed above is checked to determine whether the state machine is in the middle of decoding a new reference frame. As noted above, this flag will be cleared in step 404 during the first pass through the subroutine of FIG. 15E, and will also be cleared during subsequent passes through the subroutine while a previously-decoded reference frame is being repeatedly output. Under these circumstances, processing continues to step 410.

In step 410, the current value of the trick play repeat counter is evaluated to determine whether it has been decremented to a "0" value. As noted above, during the first pass through the subroutine of FIG. 15E, this counter will be reset to a "0" value in step 406. Furthermore, during subsequent passes, the counter will also reached a "0" value after a previously-decoded reference frame has been output for the requested number of times. Under these circumstances, processing continues to step 412.

In step 412, the decoding of a new reference frame is initiated. Specifically, a flag is set to indicate that processing of the FF state is in the midst of decoding a frame. Then, in step 414, the decode process is called to begin decoding of the frame, and processing is done (step 396).

After decoding of a new reference frame has commenced, for the next field output, processing will return to step 408. At this time, the flag set in step 412 will indicate a frame decode is underway. Accordingly, processing will proceed to step 416, in which this flag is reset so as to indicate that decoding is now done. Processing then proceeds to step 418, in which the trick play repeat counter is initialized to the value provided with the "fast forward" command, thus indicating the number of times that the newly-decoded frame should be repeated. Then, in step 420, a process is initiated to skip forward to the next reference frame.

The process initiated in step 420, will commence after the decoding of the second field for the current frame is completed. In essence, this process will move the appropriate next reference frame, by first determining whether the number of reference frames decoded from the current VOBU is equal to the number of reference frames identified by the reference frame counter obtained from the "fast forward" command in step 390. If not, or if the "no-B" flag is set, then this process will skip over B frames in the VOBU until a reference frame is encountered. If during this process the end of the VOBU is encountered, of if the number of reference frames decoded from the current VOBU is equal to the number identified by the reference frame counter, then the next VOBU is processed and the first reference frame in the next VOBU is located by skipping B frames. Furthermore, if there is a video gap in the MPEG source material, then there may be "missing" video; in this case, the navigation pack of the VOBU not having video is preferably processed as part of moving forward to the next reference frame, so that the time code displayed to the user shows a smooth progress through the program material.

After initiating the above-described process in step 420, the subroutine of FIG. 15E will proceed to step 414, in which the decode routine is called to decode the bottom field of the current frame.

After the processing described above, during default processing in the FF state, control will again pass to step 408, and since a frame decode is not in process and the trick play counter is not zero, control will flow through steps 408 and 410 to step 422. In step 422, the trick play counter is decremented, and processing is done. This flow through steps 408, 410 and 422 will repeat until the trick play counter is decremented to zero, at which time flow will pass from step 408 through steps 410, 412 and 414 as described above, and then for the next field, from step 408 to steps 416, 418, 420 and 414, thus resetting the trick play counter and decoding a new reference frame.

It will be noted that when a "fast forward" exclusive command is received in the FF state, processing proceeds to step 390, in which the reference frame counter from the new "fast forward" command is compared to zero, and stored. At the same time, the initial value for the trick play repeat counter from the "fast forward" command, is stored. Accordingly, the host may use a new "fast forward" command to change the counter values to generate faster or slower playback.

Referring now to FIG. 15F, trick play state transitions for a "step forward" exclusive command can be explained. The "step forward" command is interpreted as a "pause" command whenever the trick play state machine is other than in the PAUSE state. When the trick play state machine is in the PAUSE state, the "step forward" command causes a single frame to be forward decoded.

Accordingly, when the "step forward" command is interpreted (step 162), in step 430 a test is performed to determine whether the current state is PAUSE. If not, then processing proceeds to interpret the "step forward" command as if it is a "pause" command, by proceeding to step 158 (see FIG. 15C).

If the current state is PAUSE when a "step forward" command is received, then processing continues from step 430 to step 432. In step 432, the current fID is evaluated. If the current fID is 0, then state transitions are disallowed, and the subroutine returns (step 438). As a result, no frames are decoded and the state machine remains in PAUSE for the duration of one more field. If this occurs, during the next field, control will return to the subroutine of FIG. 15F, at which time fID will be 1, when state transitions are allowed. Under these circumstances, processing proceeds from step 432 to step 434, in which the state of the state machine in transitioned to the PLAY state. Then, in step 435, the audio decoder is instructed to skip forward for a time corresponding to one video frame, so that audio and video remain synchronized. Then, in step 436, the decode subroutine is called to decode the top field of the next frame, and the subroutine of FIG. 15F returns. Note that the valid exclusive command flag is not changed. As a consequence, during the next field (fID=0), processing will proceed to step 162 and the subroutine of FIG. 15F. At this time, in step 430 the current state will be PLAY, so that control will then pass to step 158 and the subroutine of FIG. 15C. As can be seen from the above description of FIG. 15C, under these conditions control will flow through steps 320, 322, 324 and 326, during which the decode subroutine will be called to decode the bottom field of the new frame. Notably, however, once again the valid exclusive command flag is not changed. As a consequence, during the next field (fID=1), processing will proceed to step 162 and the subroutine of FIG. 15F. At this time, in step 430 the current state will be PLAY, so that control will then pass to step 158 and the subroutine of FIG. 15C. As can be seen from the above description of FIG. 15C, under these conditions control will flow through steps 320, 322, 324 and 326, during which the decode subroutine will be called to decode the bottom field of the new frame. Notably, however, once again the valid exclusive command flag is not changed and the state machine remains in the PLAY state. As a consequence, during the next field (fID=1), processing will proceed to step 162 and the subroutine of FIG. 15F. In step 430, the current state will still be PLAY, so that control will then pass to step 158 and the subroutine of FIG. 15C. As can be seen from the above description of FIG. 15C, under these conditions control will flow through steps 320, 322, 328, 330, 334 and 326, during which the decode subroutine will be called to decode the bottom field of the new frame. Furthermore, the valid exclusive command flag is cleared and the state of the state machine returns to PAUSE. Thus, the overall result is that a single frame is forward decoded and output, and the state transitions from PAUSE, to PLAY, and then back to PAUSE.

Reverse trick play processing can now be discussed. The host processor is somewhat more intimately involved in reverse trick play processing than in forward trick play processing. Specifically, as described above, for forward play modes, the host simply controls the playback device 13 (FIG. 1) to supply VOBU's to the ASIC 11 as quickly as they are consumed. In reverse playback modes, more complex processing is involved. Specifically, after placing the ASIC 11 into its PAUSE state, but prior to entering a reverse playback mode, the host issues a nonexclusive command to the ASIC 11 to cause the ASIC 11 to flush its buffers, i.e., flush all buffered MPEG code in buffers 23 as well as all buffered decoded frames in buffers 25 (other than the currently displayed frame).

The host then controls the playback device 13 in a particular manner required for the reverse playback mode. In FAST REVERSE playback, the host causes playback device 13 to deliver each VOBU or GOP to the ASIC 11, in reverse order, starting, for example, with the VOBU/GOP prior to the VOBU/GOP being currently displayed. That is, VOBU/GOP n is delivered, then VOBU/GOP n−1 is delivered, and so on, as fast as they are consumed by the ASIC (the ASIC delivers interrupts to the host as each VOBU/GOP is consumed so that the host knows when more data is needed). In the REVERSE DECODE state, the host initially determines which VOBU/GOP(s) are needed by the ASIC to successfully decode the immediately previous frame: if the immediately previous frame is prior to the first presentable picture of the current VOBU/GOP, then the current and previous VOBU/GOP is delivered; otherwise, the current VOBU/GOP is delivered. At the same time, the host delivers a nonexclusive command to the ASIC identifying the immediately previous frame as the "target" frame. Subsequently, in the REVERSE DECODE state, the ASIC 11 will autonomously determine when new VOBU/GOP is needed and request the VOBU/GOP from the host, and the ASIC 11 will also autonomously determine the new target frames as reverse playback proceeds (see FIG. 16D, below).

As noted above, video CD sources are divided into sectors, which do not evenly align with GOP's. It will be appreciated that, in this case, the host can only commence playback of data at a sector boundary. Accordingly, to play GOP's in reverse, the host may need to use one of a number of algorithms. Under one algorithm, the host searches backward through each sector until it locates a sector having a GOP start code (making sure that the host is not confused into interpreting data beginning in a middle of a GOP from a GOP start code), and then the host plays back this sector and following sectors. For fast reverse playback, the host may halt playback after sectors including the desired number of reference frames from the GOP have been delivered. For slow reverse playback, the host plays back all sectors until the next GOP start code is encountered, at which point the host stops playback, and initiates a new rearward search for the next prior GOP start code. In these situations, the RISC will receive the ending portion of a prior GOP, followed by all or a part of a GOP of interest, followed by the ending portion of a prior GOP. For VCD reverse playback, the RISC software (particularly, the routine of FIG. 17B) is programmed to skip forward over the ending portions of prior GOP's as appropriate to locate and decode only the GOP's of interest.

After the foregoing, to finalize initialization for entry into a reverse decoding state, the host delivers a nonexclusive command to the ASIC 11 to cause the ASIC 11 to parse picture headers in the MPEG code buffer 23 and performs initial setup for decoding, including selecting a frame buffer and setting up decode parameters, all as described in FIG. 17A, below. This places the ASIC 11 in an initial condition to decode video and display it in reverse order. Finally, the host delivers the "fast reverse" or "reverse decode" exclusive command to the ASIC 11, causing the reverse playback to begin.

Referring now to FIG. 15G, trick play state transitions for a "fast reverse" exclusive command can be explained. Upon receipt of a new "fast reverse" exclusive command, processing sequences through step 163 to step 440. In step 440, a reference frame counter in the "fast reverse" command is obtained, to determine how the "fast reverse" command is to be executed. In the FR state, reference frames from the MPEG video stream are decoded and displayed. A set number of reference frames from each MPEG video object unit (VOBU) are decoded, and then processing skips to reference frames in the next VOBU. The reference frame counter delivered with the "fast reverse" command identifies the number of reference frames that are to be decoded from each VOBU. (The number of reference frames identified by the host cannot be larger than the number of frame buffers that are available.) When the host instructs entry to the FR state, the host then supplies each VOBU or GOP to the ASIC 11, in reverse order, starting, for example, with the VOBU/GOP prior to the VOBU/GOP being currently displayed. That is, VOBU/GOP n is delivered, then VOBU/GOP n−1 is delivered, and so on.

After step 440, processing arrives at step 442 in which the current state is determined and appropriate further actions are taken. Default processing in the FR state (step 185) proceeds directly to step 442.

If the current state is PLAY, SLF (slow forward), FF (fast forward) or RD (reverse decode), a transition to the FR state is not permitted. In this circumstance, therefore, processing proceeds directly to step 444 and the state transition handler of FIG. 15G is completed.

If the current state is STOP or PAUSE when a "fast reverse" exclusive command is received, processing proceeds to step 446, in which a flag is checked to determine whether the initial buffering operation of a reverse decoding task is underway. While in the "fast reverse" state, the ASIC 11 is continuously decoding video data and buffering decoded video data so that it can be subsequently output. The decoding process endeavors to maintain all buffers full of video data so that the proper reverse playback of reference frames can be accomplished. Accordingly, to begin fast reverse playback, the ASIC 11 must perform initial buffering of decoded reference frames prior to beginning fast reverse playback.

If the reverse decode buffering has not been initiated, then control passes from step 446 to step 448, in which the current fID is checked. As noted above, state transitions are only permitted when fID is 1. Accordingly, if fID is 0 in step 448, processing proceeds to step 444 and is done. If, however, fID is 1 in step 448, then processing continues to step 450, in which a flag is set to indicate that the initial reverse decode buffering is underway. After step 450, or immediately after step 446 if reverse decode buffering was already active, in step 452 an analysis is made to determine whether all buffers are full of reference frames. Initially, this will not be the case, and control will pass to step 454, in which the hardware decoding process is initiated, and then the subroutine returns (step 444).

As discussed above, and detailed below with reference to FIG. 17A, the hardware decoding process initiated in step 454, is the second part of the process of decoding a frame; in this second part, data is decoded and stored into a frame buffer. As noted above, prior to the first pass through step 454, the first part of the decoding process, including header parsing and buffer selection, has already been performed in response to nonexclusive commands received from the host to initialize reverse decoding. Furthermore, as is noted above and detailed in FIG. 17A, upon completion of the hardware decoding process and arrival at a picture start code, the first part of the decoding process for the next frame, including header parsing and buffer selection, is automatically performed, so that all preliminary steps to hardware decoding have been taken.

Accordingly, to buffer multiple frames in preparation for reverse decoding, whether during the first or subsequent passes through FIG. 15G, all that is needed is to re-schedule the hardware decoding process in step 454, until all buffers are filled with decoded frames. Note that in the foregoing pass through steps 452 and 444, the state was not changed and the valid exclusive command flag was not cleared. As a consequence, for the next few fields, control will be passed to the subroutine of FIG. 15G, and will flow through steps 442, 446, 452 and 454, repeatedly re-scheduling the hardware decoding process, until, e.g., five reference frames have been decoded and buffered. Ultimately, when five reference frames have been decoded and buffered, control will pass from step 452 to step 456.

In step 456, a trick play counter is initialized to a zero value, for use in later determinations of the speed at which the fast reverse processing should proceed. Specifically, in the FR state, a reference frame is decoded and buffered, and then display of this frame is repeated for a number of times identified by a repeat value received with the "fast reverse" command, after which a new reference frame is displayed and (typically different) new reference frame is decoded. The repeat value identifies a number of times a repeated field will be output before the next frame is decoded, and accordingly typically is an even number in the range of 1 to 10 or more, based upon the speed of fast reverse playback that is desired. When the FR state is initially entered, a single frame is decoded, and then is repeatedly displayed for the number of times identified by the repeat value; to achieve this functionality, the trick play repeat counter is initialized to a value of zero.

After step 456, control passes to step 458, in which the flag checked in step 446 is cleared, to indicate that the initial reverse decode buffering is completed. At the same time, in step 458, a flag (discussed earlier) is reset to indicate that a frame decode is not currently underway. Next, in step 460, the valid exclusive command flag is cleared, so that default processing will be performed for subsequent video fields. Next, in step 462, the "fast reverse" command is acknowledged to the host, to indicate that fast reverse playback is about to begin. Then, in step 464, the trick play state machine sequences to the FR state. Processing then proceeds to step 466 to perform default processing in the FR state. Note that if in step 442, the state machine is in the FR state, processing also proceeds to step 466 to perform default processing. Accordingly, so long as no new exclusive commands are received, from this point on the processing of the state transition subroutine of FIG. 15G will pass to step 466.

In step 466, the flag discussed above is checked to determine whether the state machine is in the middle of decoding a new reference frame. As noted above, this flag will be cleared in step 458 during the initial pass through the subroutine of FIG. 15G. The flag will also be cleared during subsequent passes through the subroutine while a previously-decoded reference frame is being repeatedly output. Under these circumstances, processing continues to step 468.

In step 468, the current value of the trick play repeat counter is evaluated to determine whether it has been decremented to a "0" value. As noted above, during the initial first pass through the subroutine of FIG. 15G, this counter will be reset to a "0" value in step 456. Furthermore, during subsequent passes, the counter will also reached a "0" value after a previously-decoded reference frame has been output for the requested number of times. Under these circumstances, processing continues to step 470.

In step 470, the decoding of a new reference frame is initiated. Specifically, a flag is set to indicate that processing of the FR state is in the midst of decoding a frame. Then, in step 472, the decode processes are called to change the display to the appropriate buffered frame, and begin decoding of a new frame. Then, processing is done (step 444).

After decoding of a new reference frame has commenced, for the next field output, processing will return to step 466. At this time, the flag set in step 470 will indicate a frame decode is underway. Accordingly, processing will proceed to step 474, in which this flag is reset so as to indicate that decoding is now done. Processing then proceeds to step 476, in which the trick play repeat counter is initialized to the value provided with the "fast reverse" command, thus indicating the number of times that the newly-decoded frame should be repeated. Then, in step 472, the decode process is called a second time to proceed with decoding of the frame, and processing is done (step 444).

The process initiated in step 472, is described in greater detail below with reference to FIGS. 15H and 15I. In essence, this process will move the display to the appropriate reference frame, by first determining whether the number of reference frames displayed from the current VOBU/GOP is equal to the number of reference frames identified by the reference frame counter obtained from the "fast reverse" command in step 440. If not, then this process will display the previous reference frame from the current VOBU/GOP. If during this process all reference frames from a VOBU/GOP are displayed, or if the number of reference frames decoded from the current VOBU/GOP is equal to the number identified by the reference frame counter, then the last reference frame of the prior VOBU/GOP is displayed.

After the processing described above, during default processing in the FR state, control will again pass to step 466, and since a frame decode is not in process and the trick play counter is not zero, control will flow through steps 466 and 468 to step 478. In step 478, the trick play counter is decremented, and processing is done. This flow through steps 466, 468 and 478 will repeat until the trick play counter is decremented to zero, at which time flow will pass from step 466 through steps 468, 470 and 472 as described above, and then for the next field, from step 466 to steps 474, 476 and 472, thus resetting the trick play counter and decoding a new reference frame.

It will be noted that when a "fast reverse" exclusive command is received in the FR state, processing proceeds to step 440, in which the reference frame counter from the new "fast reverse" command is compared to zero, and stored. At the same time, the initial value for the trick play repeat counter from the "fast reverse" command, is stored. Accordingly, the host may use a new "fast reverse" command to change the counter values to generate faster or slower reverse playback.

Referring now to FIGS. 15H and 15I, an explanation can be provided of the decoding processes performed in steps 300, 324, 368, 414, 436 and 472 discussed above. As discussed above, the decoding process illustrated in FIGS. 15H–15I is called during playback of a frame in any of the playback modes described above, during successive vertical blanking intervals. During playback modes other than normal play, the decoding process of FIGS. 15H and 15I is called twice to decode and display a new frame: the first call to the decoding process causes the hardware to decode the next frame, but does not set up the relevant display parameters for display of the next frame. The second call to the decoding process sets up parameters to display the next frame when the display sequences to the next frame. A similar process is used during normal playback, however, the display parameters for a frame during normal playback, may require that the decoding process be called three or more times to decode and set up a frame for display; this is done to permit "pull down", i.e., repetition of fields in order to alter the video frame rate. As can be seen from the foregoing, during normal playback, the decode process of FIGS. 15H and 15I is called for every field displayed, whereas during other playback modes, the decode process of FIGS. 15H and 15I is called twice for each new frame, but may not be called again until that frame has been repeatedly displayed a number of times.

The management of decoding and display of successive video fields utilizes a bit string of field display/decode parameters. This string includes a sequence of 4-bit nybbles. Each nybble in the string indicates whether (a.) the next field displayed should be the top or bottom field of the current frame, (b.) whether a new frame should be decoded and (c.) whether the display should advance to another frame. The current nybble of the string is thus utilized during each pass through the decoding process to determine whether to move to a new display buffer, and whether to request a decode of a new frame. Details on the use and format of the display strings discussed herein can be found in copending application Ser. No. 09/281,013, entitled "DIGITAL VIDEO DECODING, BUFFERING AND FRAME-RATE CONVERTING METHOD AND APPARATUS", filed in the name of Cem I. Duruoz concurrently herewith, and assigned to the same assignee, which is hereby incorporated herein in its entirety. For present purposes, these strings will be referred to using strings of the letters T and B, each letter representing one nybble of the string, where T indicates that the top field is to be displayed and B indicates that the bottom nybble is to be displayed. Thus, for normal playback without frame rate conversion, the display string will always be TB. To achieve 3:2 pulldown frame rate conversion, the display strings for three sequential frames may follow the sequence TB, TBT, BT, BTB. Other sequences are also possible for other frame rate conversion cases.

In the first step 480 of the decoding process, the current nybble of the current display string is evaluated to determine whether the decoding of a new frame should be initiated. Normally, the last nybble in a display string indicates that decoding of a new frame should occur, so that the new frame is ready to be displayed upon the next field boundary, and other nybbles in the display string hold off decoding, so that buffer space is not consumed until another frame is needed. If the current nybble indicates that decoding should be initiated, then in step 482, the hardware decoding process is scheduled, causing a frame to be decoded into a previously-selected buffer. (The buffer having been selected after the prior frame was decoded by the process shown in FIGS. 17A–17C.)

After step 482, or immediately after step 480 if another frame is not to be decoded, the current nybble of the display string is evaluated to determine whether the string has reached its end. Each 4-bit nybble of a string includes a bit indicating that the current nybble is the last nybble of the string, so that the end of the string can be quickly detected. When the end of the string is reached, it is necessary to advance the display to the next frame, so that the new frame will be output starting at the next field boundary, and also to compute a new display string governing the display of the frame. This is done in step 486 by scheduling the video display setup task, discussed below in FIG. 15I. After step 486, or immediately after step 484 if no new frame is to be decoded, in step 488 the current display string is advanced one nybble, so that the next nybble in the string will be used to control the display process of FIG. 18 and the decode process of FIG. 15H at the next field boundary.

It will be noted that step 488, moving the display string to the next nybble, occurs prior to the generation of any new string in task of FIG. 15I, which is scheduled in step 486 of FIG. 15H, for the reason that the task of FIG. 15H executes to completion before the scheduled task of FIG. 15I begins.

Figure 18:
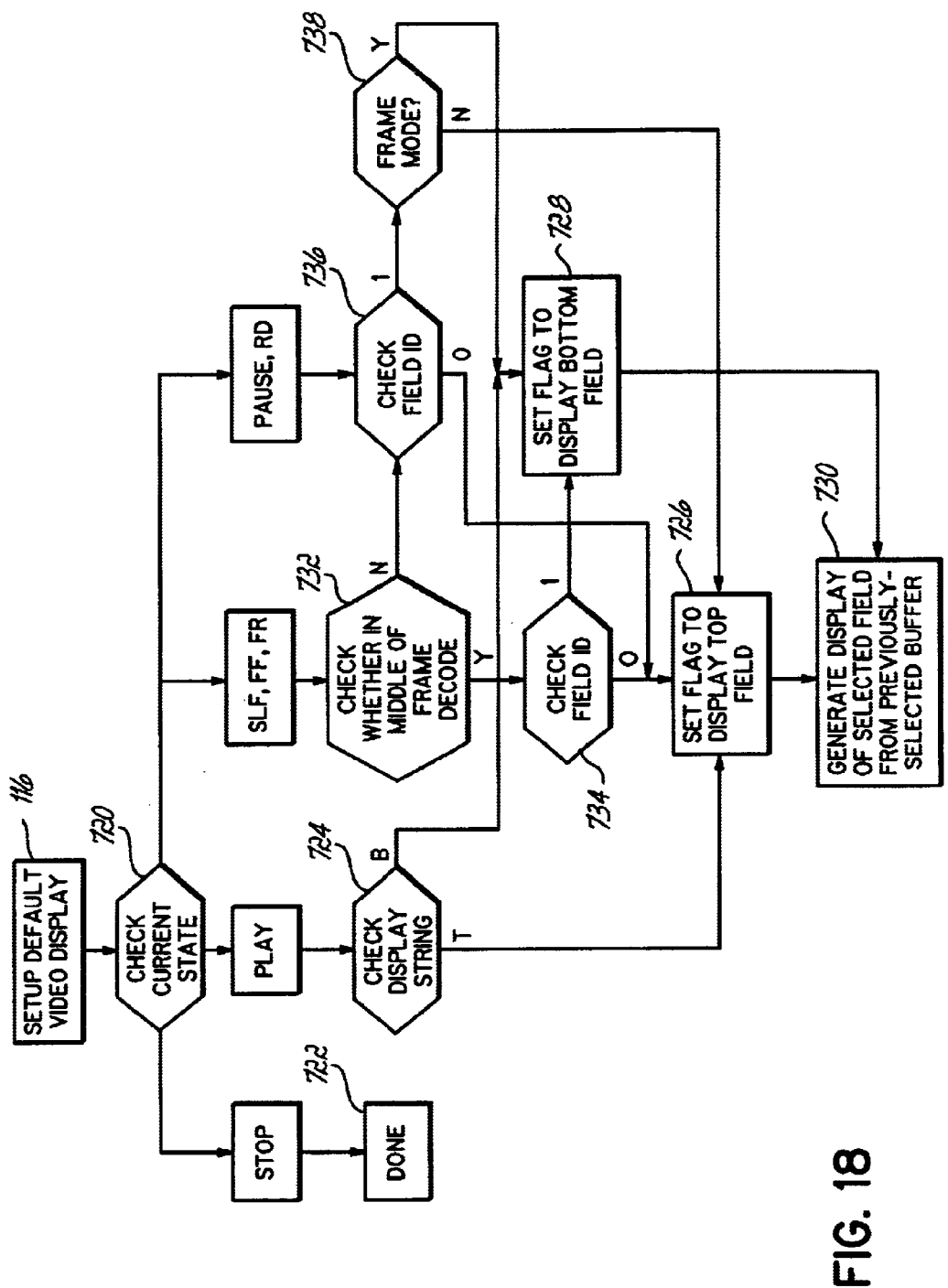
FIG. 18 is a flow chart of the display of top and bottom fields of video data during the global processes of the programming of the RISC CPU.

Furthermore, it will be noted that by the time that the current nybble of the display string is being evaluated in FIG. 15H, and/or a new display string is being generated and new display buffer selected in FIG. 15I, the current nybble of the display string has already been analyzed by the display process of FIG. 18 (which is a higher priority task, and scheduled first at step 116 of FIG. 11—and therefore is performed prior to the processing in any of FIGS. 15A–15H). Thus, a current display is generated from a previously selected buffer using the current nybble of the display string, before the hardware decoding process is initiated to decode a new frame (step 482), and before any new display string or new buffer is selected (step 486) and before the string is advanced to the next nybble (step 488).

Figure 17A:
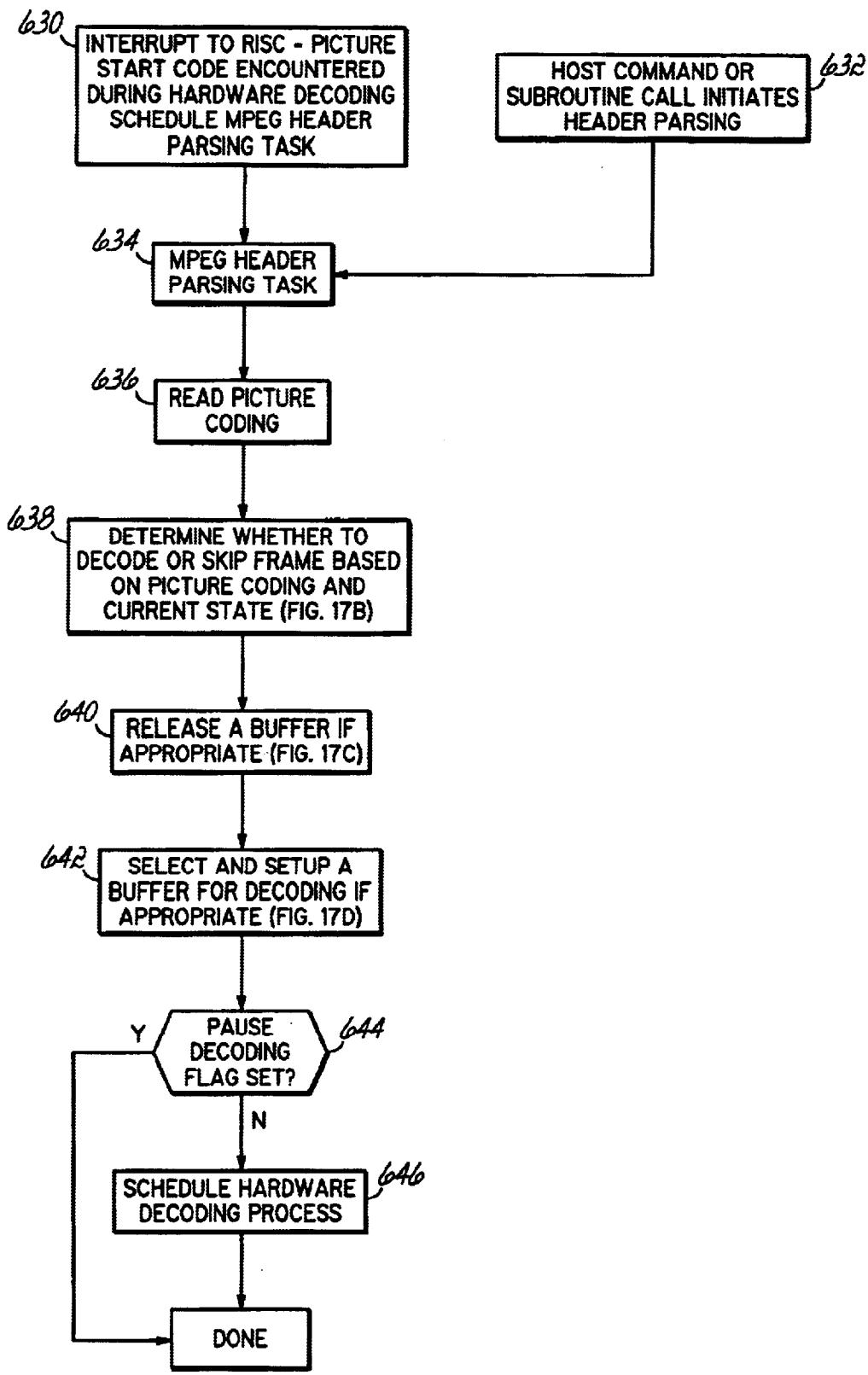
FIGS. 17A, 17B, 17C and 17D are flow charts of the decode setup operations provided by the programming of the RISC CPU.
Figure 17B:
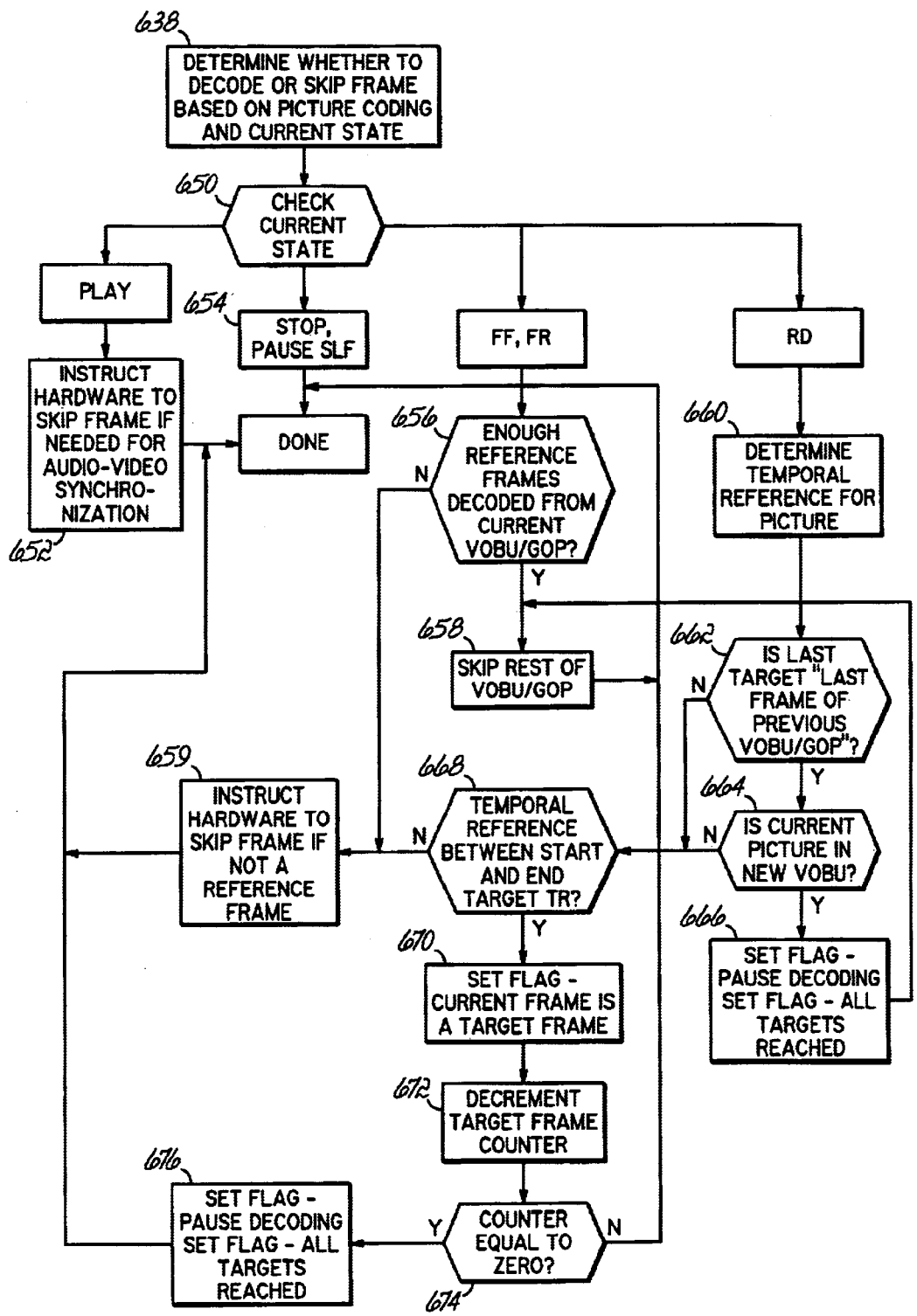
Figure 17C:
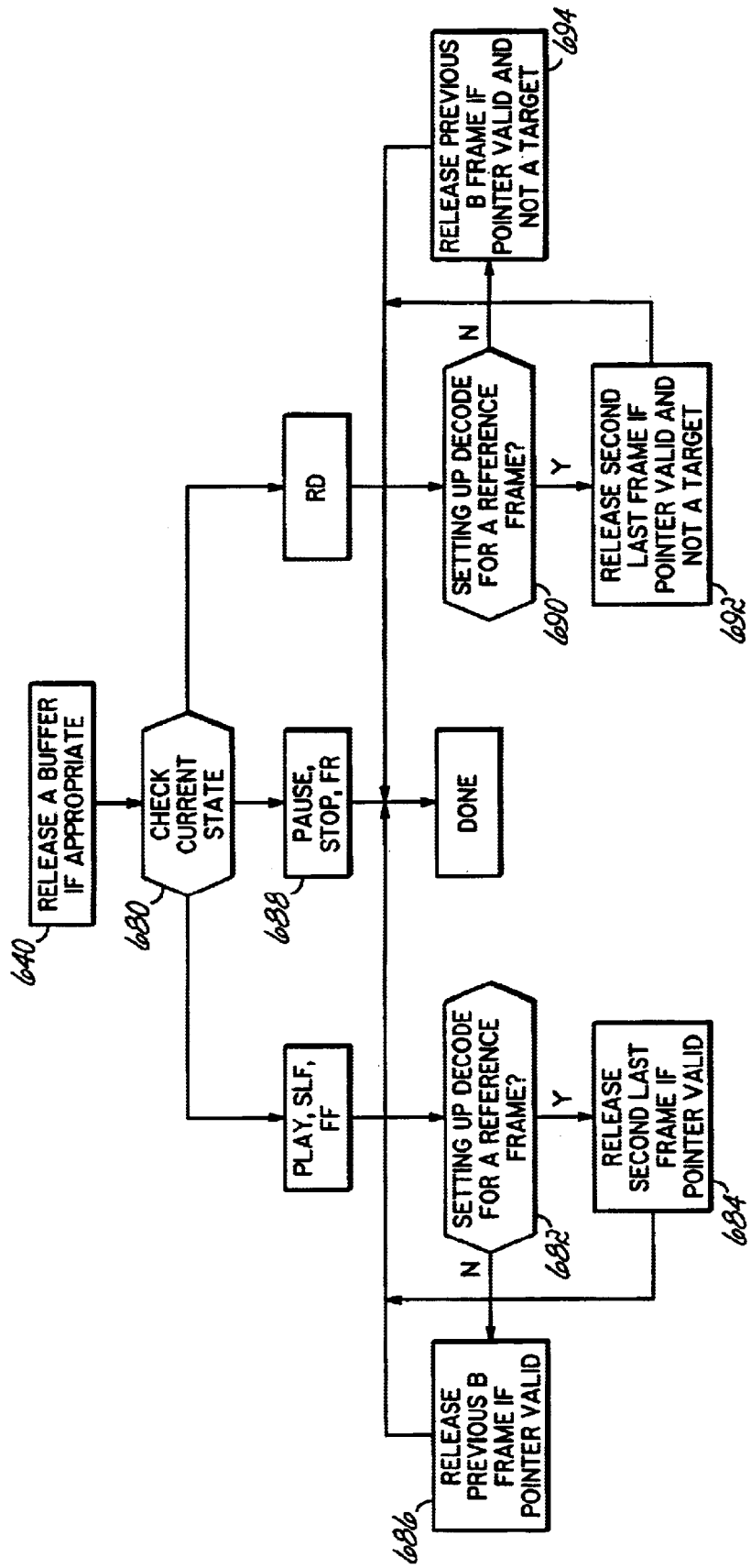

It will be noted that, particularly in the REVERSE DECODE and FAST REVERSE states, the header parsing performed in FIGS. 17A–17C may select the buffer currently being used for display as the buffer into which a new frame should be decoded. Thus, data may be displayed from a buffer while new data is being decoded into the buffer. The hardware decoding process, however, decodes the new frame on a slice-by-slice basis. Furthermore, the low-level buffer management routines include slice-level management of a buffer so that the decode process may only decode into a slice of a buffer after the display process has displayed the data from that slice of the buffer and released the slice for re-use. As noted above, the display process is time critical and is initiated well prior to the decode process, so in most cases there will be slices available when the decode process generates a slice for storage into a buffer, even if that buffer is being used currently for display. However, if there are no buffer slices available in the buffer to store data produced by the hardware decode process, then the hardware decode process temporarily stalls to permit the display process to release additional slices before the hardware decode process restarts. In this way, the display and decode of data into the same buffer proceeds smoothly without error. Further details on the management of slices in a buffer are provided in the above-referenced and incorporated application of Cem I. Duruoz entitled "DIGITAL VIDEO DECODING, BUFFERING AND FRAME-RATE CONVERTING METHOD AND APPARATUS".

Referring now to FIG. 15I, an explanation can be provided of the process for setting up the video display when the end of a display string is reached. In a first step 489, a new display string is generated and stored, based on the current frame rate conversion parameters (i.e., frame rate of input data, frame rate of display, user settings). Then (step 490), different actions are taken based on the display state. In the PLAY state (step 492), it is determined whether the next frame to be decoded is a reference frame (step 494). If so, then in step 496 the display buffer is set to be the buffer containing the last reference frame to be decoded (found in field 47, FIG. 7). If not, then in step 498 the display base address is set to be the frame being decoded.

In all states except normal PLAY, the display string generated in step 481 is overwritten with a simple string of TB, because in all other states no frame rate conversion is needed or performed. In the FF and SLF states, and in the temporary PLAY state due to execution of a step forward nonexclusive command (step 500), the display string is overwritten in step 502, and then processing continues to step 494 to select a display buffer. In the FR state (step 504), the display string is overwritten in step 506, and then in step 508 the display buffer is selected to be the buffered frame having the largest VOBU-ID/GOP-SA value, and the largest temporal reference TR among those buffered frames from this largest VOBU/GOP. This automatically causes the temporally last frame to be displayed.

Figure 16A:
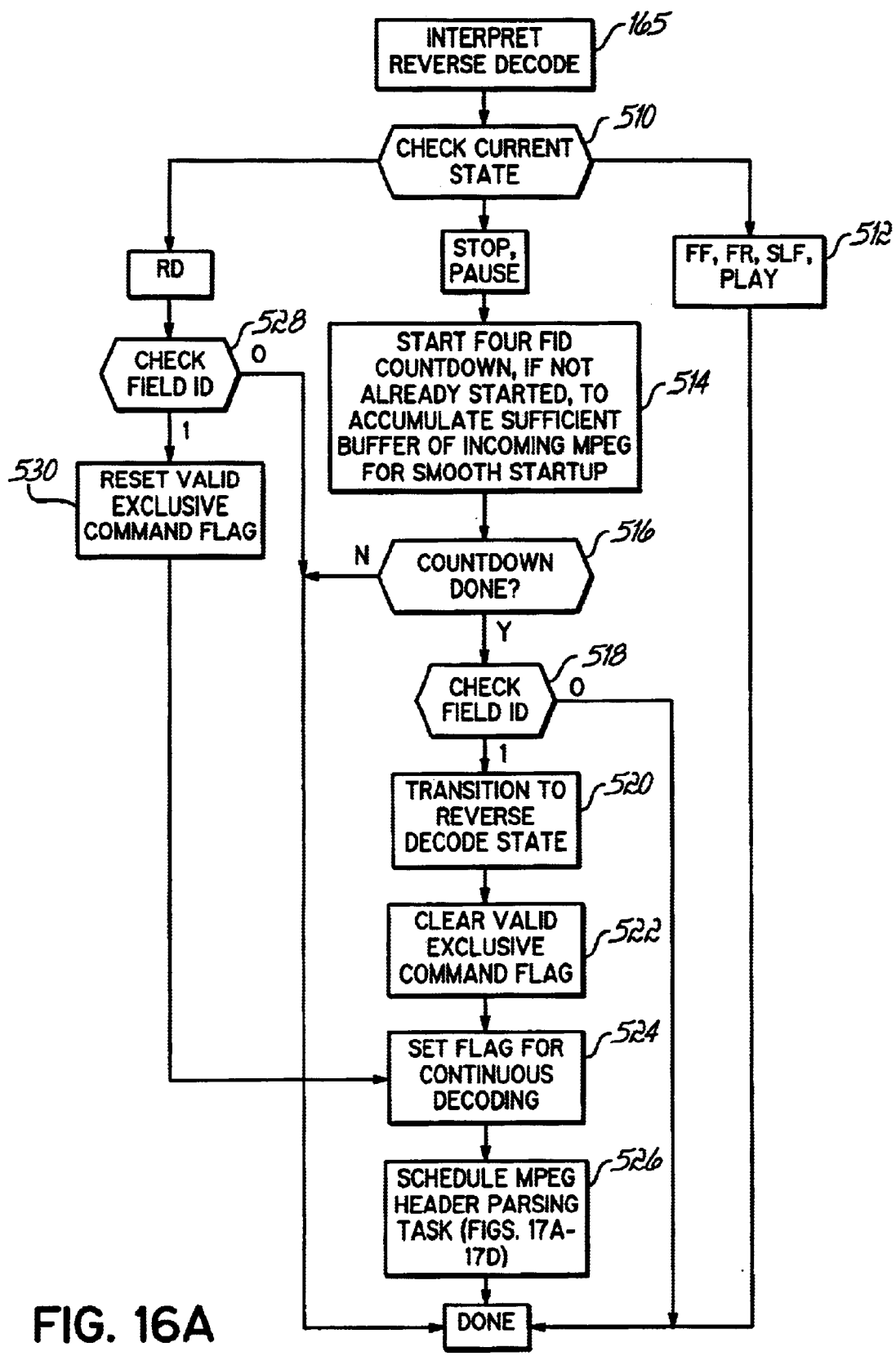
FIGS. 16A, 16B, 16C and 16D are flow charts of the detailed operations of the trick play processing state machine provided by the programming of the RISC CPU, for reverse decode processing.

Referring now to FIG. 16A, the processing of a "reverse decode" exclusive command can be discussed. As an initial matter, it should be noted that once the ASIC software is in the reverse decode state, slow reverse playback and step reverse playback are achieved by nonexclusive commands submitted by the host, after the host as used the "reverse decode" exclusive command to place the state machine into its RD state. Furthermore, as part of initializing the ASIC to place the ASIC in its RD state, and the host instructs the ASIC to flush its MPEG code buffers, so that all prior MPEG code is eliminated. Finally, as part of initializing the ASIC into its RD state, the host supplies the ASIC with a current MPEG VOBU or GOP so that the ASIC can begin reverse decoding from the present position. While in the RD state, the ASIC decodes and buffers frames from the MPEG source, so that the buffered frames can be played back in reverse order, in either a slow reverse or step reverse manner.

As a first step in processing a "reverse decode" exclusive command (step 165), in step 510 the current state of the state machine is evaluated. If the state machine is currently in its FF, FR, SLF or PLAY states, transitions to the RD state are disallowed, and accordingly the subroutine of FIG. 16A immediately returns (step 512).

If the current state is either STOP or PAUSE, a transition to the RD state is permitted, and begins with step 514, in which a four field countdown is started, if not already started. This four-field countdown causes the input FIFO's managed by the ASIC to accumulate a sufficient amount of incoming MPEG code for the current VOBU or GOP, to permit a smooth transition to reverse motion. As long as this countdown is ongoing, control will pass from step 514 to step 516 and then the subroutine of FIG. 16A will immediately terminate. Only after the countdown is complete, will control pass through steps 514 and 516 to step 518, where the current value of fID is checked. As noted above, when fID is 0, state transitions are disallowed, and so under these circumstances the subroutine of FIG. 16A immediately returns. During the next field, or if fID is 1, processing continues from step 518 to step 520, in which the state machine transitions to the RD state, and then to step 522, in which the valid exclusive command flag is cleared. In a subsequent step 524, a "continuous decoding" flag is set, which causes the decoding process to run continuously so long as there is buffer space available for decoded MPEG code. The use of this flag will be discussed below in connection with FIGS. 17A–17C. When the continuous decoding flag is set, the display and decoding processes are completely uncoupled and will run independently, as opposed to when this flag is set, in which case the decoding process will halt after parsing MPEG headers, and wait for the trick play software to separately call the hardware decoding process. After step 524, control passes to step 526, which schedules the MPEG header parsing process of FIG. 17A, to cause the buffering of decoded frames to begin. Processing of the "reverse decode" exclusive command is then done.

Once in the RD state, if a new "reverse decode" exclusive command is received, control passes to step 528, in which the current value of fID is checked. If fID is 1, then the valid exclusive command flag is cleared (step 530), and control passes to step 524 to ensure that the continuous decoding flag is set and that header parsing is scheduled. If fID is 0 in step 528, the subroutine immediately returns, so that the handling of the new "reverse decode" command is delayed until the next field when fID will be 1.

Figure 16B:
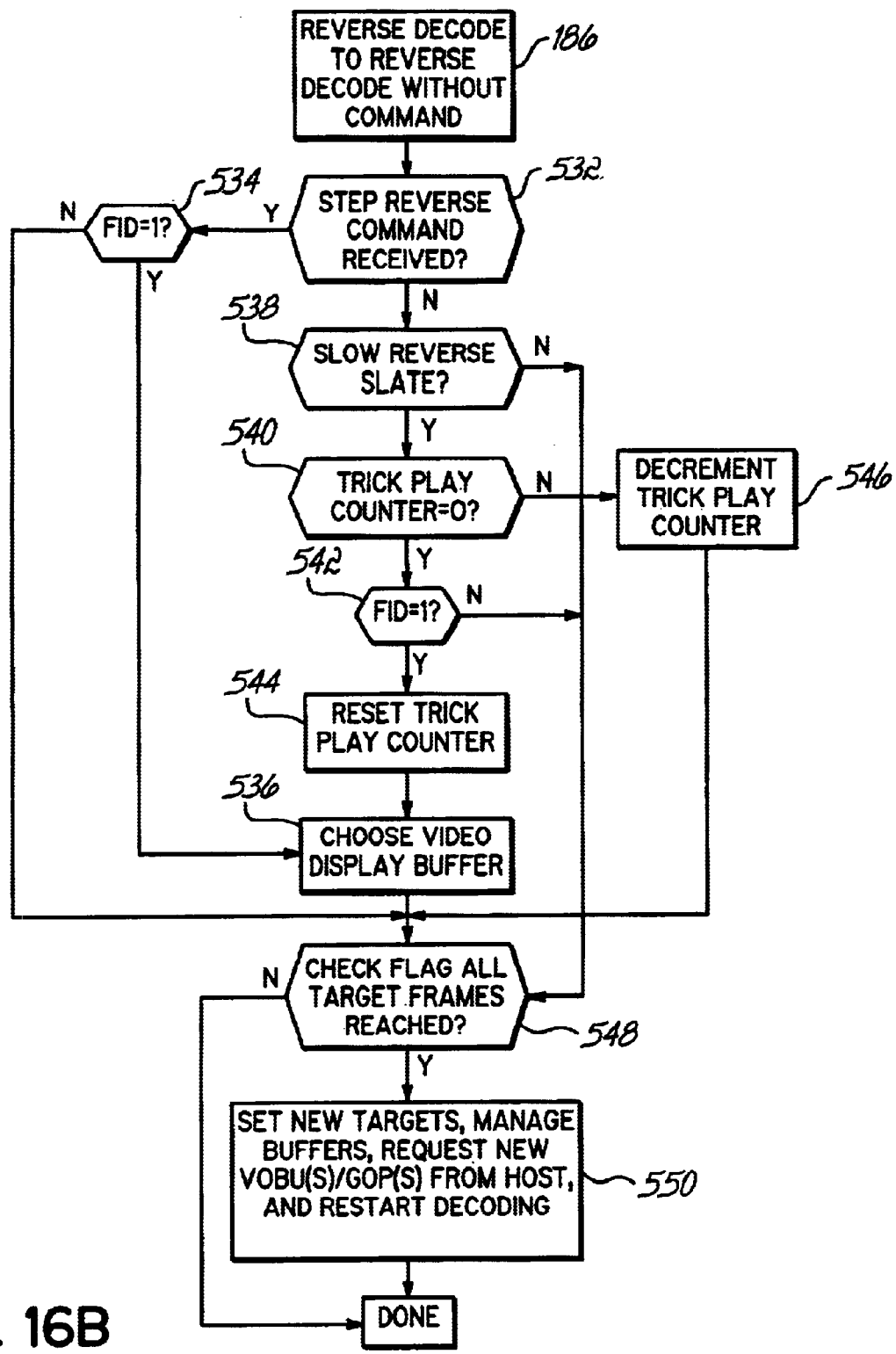

Referring now to FIG. 16B, default processing (step 186) in the reverse decode state can be described. In default processing, frames are displayed in reverse order in either a slow reverse or step reverse manner, as instructed by the host in nonexclusive commands that have been received separately. Specifically, in step 532, it is determined whether a "step reverse" nonexclusive command has been received. If so, the host has requested the ASIC to step one frame backwards from the current frame. In this case, in step 534, the current value of fID is evaluated to determine whether fID is 1 and a new frame can be chosen. If fID is 1, then in step 536, a subroutine is called to choose a new display buffer. The subroutine of step 536, which is discussed in more detail below with reference to FIG. 16C, will either change the display buffer address to move the display to the immediately previous frame, or not change the display buffer address, based on whether the prior frame is available among the buffered frames.

If in step 532 the host has not delivered a "step reverse" command, then processing continues to step 538 in which it is determined whether a "slow reverse" sub-state of the reverse decode state, is currently active. If so, the ASIC has been instructed by a prior nonexclusive commend, to continuously step backward through frames at a rate identified in the command. This rate is identified by identifying a number of fields for which each frame is repeated prior to automatically stepping backward to a prior frame. This value is used as the initial value of a trick play counter. Accordingly, if the ASIC is in a "slow reverse" substate, processing continues to step 540 where the trick play counter is evaluated to determine whether it has reached a value of zero. If so, then in step 542 the current value of fID is evaluated to determine whether a frame change can be made. If fID is 1, then in step 544 the trick play counter is reset to its initial value, and processing continues to step 536 to move the display to the prior frame, if possible. If fID is 0 in step 542, then no action is taken, so that at the next field boundary the display will be moved to the prior frame. If in step 540, the trick play counter is not zero, then in step 546 the trick play counter is decremented, so that eventually the trick play counter will reach zero and a new frame will be selected.

After step 536 or 546, or after step 538 when the ASIC is not in the "slow reverse" substate, or after step 534 or step 542 when fID is 0, processing continues to step 548. In step 548, a flag is checked to determine whether the decoding process, which runs continuously, has reached all of the currently identified "target" frames. As noted below in detail with reference to FIGS. 17A and 17B, the decoding process decodes toward target frames when in the RD state, and the decoding process will cease when these target frames have been reached. Once all target frames have been reached, new VOBU's or GOP's must be requested from the host, and then decoded to reach new, earlier target frames, in order to continuously decode frames in reverse order. Accordingly, if all targets have been reached in step 548, processing continues to step 550 in which new targets are set and the appropriate new VOBU's or GOP's are requested from the host, and restart the decoding process. This process is elaborated below with reference to FIG. 16C. After step 550 is complete, or immediately after step 548 if the targets have not been reached, the default processing in the RD state is done.

Figure 16C:
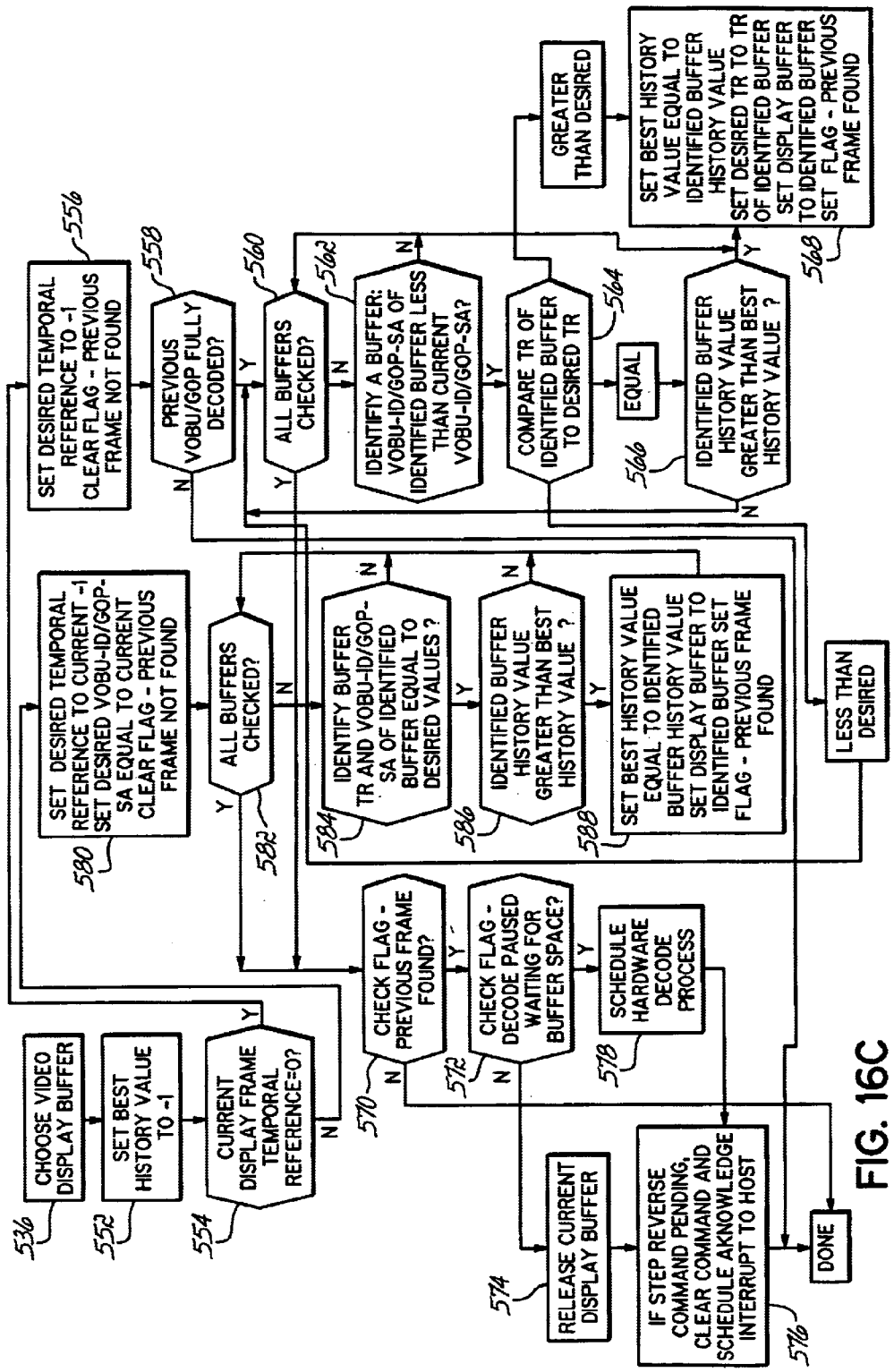

Referring now to FIG. 16C, the above-noted process 536 for choosing a video display buffer can be detailed. This process reviews the contents of the video buffers, using the indeces shown in FIG. 6, to determine whether the previous frame is currently stored in one or more buffers, and if so, select the buffer for use in display. It will be noted that the display base address that is reset by the process of FIG. 16C, is not used until the next transition of the field clock; accordingly, the buffer that is selected is used only in the next field displayed.

As a consequence of the manner in which frames are reverse decoded, it is possible that there may be two copies of the same frame in the buffers. To resolve such a situation, a history value associated with the buffers is used to choose one of the copies of the frame; specifically, the largest history value is chosen. As is detailed below with reference to FIG. 17D, the history value indicates the "age" of the data stored in a buffer, and is maintained as part of the decoding process that places new data into buffers. To initialize the use of the history value to select a buffer, in step 552, a "best history" variable is set to the value of −1; this value is chosen to be negative because history values are always positive or zero; thus, the first buffer encountered will have a larger history value than −1, and will be selected for use until another buffer is encountered storing the same frame with a larger history value.

The manner in which a frame is chosen for display is different if the frame is in the same VOBU/GOP as the frame currently being displayed, or if the frame is in the prior VOBU/GOP. Accordingly, in step 554, it is determined whether the current display frame's temporal reference is 0. If so, then the frame currently being displayed is the first frame of the current VOBU/GOP, and the previous frame is from a prior VOBU or GOP. In this situation, processing continues to step 556.

In step 556, a desired temporal reference value is initialized to a value of −1, and a flag is cleared to indicate that the previous frame has not yet been found. Then, in step 558, a flag (which is set by the decoding process) is checked to determine whether the prior VOBU or GOP has been fully decoded. If not, then the last frame of the prior VOBU or GOP will not be in the buffers, and the process of FIG. 16C ends without changing the display. Only if the prior VOBU or GOP has been completely decoded, will the process continue to step 560. Explaining steps 556 and 558, it will be noted that when looking for a frame at the end of prior VOBU or GOP, the temporal reference of the frame will not be known. However, as long as the prior VOBU or GOP has been fully decoded, the frame will reside in one of the buffers. Accordingly, in such a situation the process of FIG. 16C searches for the frame in the buffers from the prior VOBU/GOP which has the greatest temporal reference; this frame can be assumed to be the last frame of the prior VOBU/GOP. The "best" temporal reference value is initialized to be negative because temporal reference values are always positive or zero; thus, the first buffer encountered having a frame from the prior VOBU/GOP will have a temporal reference value larger than −1, and will be selected for display until another buffer is encountered with a larger temporal reference or the same temporal reference and a larger history value.

Beginning at step 560, a loop of steps is performed to review all of the buffers to locate the desired frame. In step 560, it is determined whether all buffers have been checked. If not, processing continues to step 562 in which a previously unchecked buffer is selected, and the indeces for the buffer are evaluated to determine whether the VOBU-ID/GOP-SA for the buffer are less than the VOBU-ID/GOP-SA of the currently displayed frame, i.e., to determine whether the buffered frame is from the preceding VOBU/GOP. If not, the frame in the buffer is from the current VOBU/GOP and the process returns to step 560 to review other buffers, if any. If the frame is from the prior VOBU/GOP, then the process continues to step 564 in which the temporal reference of the frame in the buffer is compared to the current "best" temporal reference. If the frame in the selected buffer has a temporal reference that is less than the current "best" temporal reference, then the frame precedes another frame from the same VOBU/GOP that is in another buffer, and should not be displayed. Accordingly, in this situation the process returns to step 560 to evaluate frames in other buffers if any. If the temporal reference of the frame in the selected buffer is equal to the current "best" temporal reference, then in step 566, the history value of the selected buffer is compared to the current "best" history value. If the selected buffer has a smaller history value than the best history value, the selected buffer will not be used and processing returns to step 560 to evaluate frames in other buffers, if any. If the selected buffer has a larger history value, then in step 568 the best history value is set equal to the history value of the buffer, and the best temporal reference is set equal to the temporal reference of the frame in the buffer. Also, the display base address is set to point to the selected buffer, and a flag is set to indicate the previous frame was found. After this, the process returns to step 560 to evaluate frames in other buffers, if any. If in step 564 the selected buffer has a larger temporal reference than the current best temporal reference, then the actions of step 568 are taken to select the buffer for use in display, and the process returns to step 560 to evaluate frames in other buffers, if any.

After all frames in all buffers have been evaluated, processing proceeds from step 560 to step 570, in which a flag is checked to determine whether the previous frame was found. If not, then the process of FIG. 16C terminates, leaving the display unchanged. If the previous frame was found, then processing continues to step 572, in which a flag, used by the decoding process discussed below, is checked to determine whether the normally continuous decoding process has paused due to the lack of buffer space. In this situation, the decode process determined that there were no buffers available, and therefore selected the buffer currently being used for display as the next buffer to receive decoded data, and then paused so that the data in this buffer would not be changed until the display moved to another buffer. Thus, if the flag is set in step 572, this indicates that the decode process must be decoded, and accordingly in step 578 the hardware decoding process is scheduled, to thus cause continuous decoding to restart.

It will be noted that, in this case, the decoding is performed into the same buffer that is currently being used for display. The display process has a "head start" and accordingly will release space in the buffer faster than the decoding process requires space to store a new decoded frame. However, in case this is not true, there is a low-level arbitration, performed on a slice-by-slice basis, which stalls the decoding of a slice until the display process has displayed the data in that slice and released the slice for re-use. The details of this process are not provided here but can be understood with reference to the above-reference patent application of Cem I. Duruoz entitled "DIGITAL VIDEO DECODING, BUFFERING AND FRAME-RATE CONVERTING METHOD AND APPARATUS", which is incorporated herein by reference.

If the flag is not set in step 572, then the current display buffer is released (i.e., marked free for use in storing future decoded frames). In either case, the process then continues to step 576, in which it is determined whether there is a step reverse nonexclusive command pending. If there is such a command pending, then the host is awaiting confirmation that the display has moved one frame backward. Accordingly, if there is a step reverse command pending, the command is cleared and an interrupt to the host to acknowledge the command is scheduled.

The foregoing describes processing when the desired prior frame is in a VOBU/GOP prior to the VOBU/GOP of the currently displayed frame. If in step 554, it is determined that the temporal reference of the currently displayed frame is greater than 0, this indicates that the prior frame is in the same VOBU/GOP, and different processing is performed. Specifically, in step 580 and the following steps, all buffers are evaluated to determine if they hold the frame immediately prior to the currently displayed frame. To facilitate this, in step 580 a "desired" temporal reference is computed by subtracting one from the temporal reference of the currently displayed frame. The "desired" VOBU-ID/GOP-SA is set equal to the VOBU-ID/GOP-SA of the currently displayed frame. Also, the flag noted above is cleared to indicate that the prior frame was not yet found. After this initialization, a loop beginning with step 582 is performed, reviewing each of the buffers to determine whether it should be displayed. In step 582, it is determined whether all buffers have been checked, and if so, then in step 584, a buffer that has not been previously checked is identified and its indeces are considered to determine whether the temporal reference and VOBU-ID/GOP-SA match the desired temporal reference and VOBU-ID/GOP-SA identified in step 580. If not, then processing returns to step 582 to evaluate frames in other buffers, if any. If in step 584 the frame in the selected buffer is the desired frame, then in step 586 the history value of the selected buffer is compared to the current "best" history value. If the history value of the selected buffer is less than the current "best" value, then processing returns to step 582 to evaluate frames in other buffers, if any. If in step 586 the selected buffer has a larger history value than the current "best" value, then in step 588 the best history value is set equal to the history value of the selected buffer. Also, the display base address is set to point to the selected buffer, and a flag is set to indicate the previous frame was found. After this, the process returns to step 582 to evaluate frames in other buffers, if any.

After all frames in all buffers have been evaluated, processing proceeds from step 582 to step 570, in which the appropriate actions are taken based on whether a buffer was found with the desired previous frame, as described above.

Figure 16D:
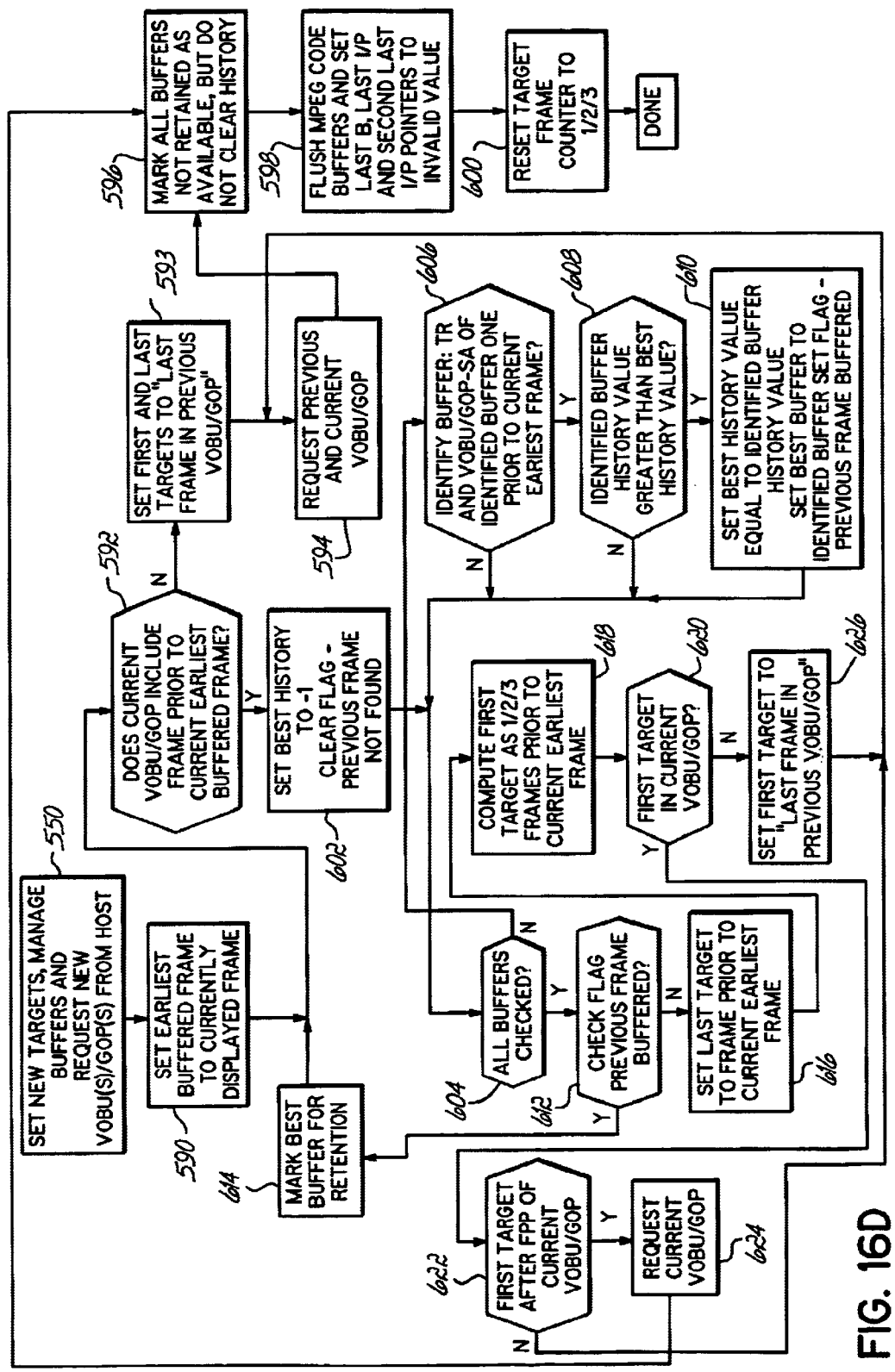

Referring now to FIG. 16D, the process 550 described above for setting targets and requesting new VOBU's or GOP's from the host, can be elaborated. This process is initiated whenever the target frames have been decoded by a previous invocation of the continuous decoding process. This process does not, however, assume any buffer content; rather, the process of FIG. 16D reviews the content of the buffers and determines which buffers should be retained because they are storing frames prior to the current frame; these frames, because they are retained in the buffers, will be displayed as the display moves backward by the process described above. The "target" frames for the next decode operation are set to frame(s) prior to the frames that are currently in the buffers.

In a first step 590 in this process, a variable identifying the earliest buffered frame, is set to point to the currently displayed frame. This initializes the process of searching for earlier frames. Then in step 592, the temporal reference of the currently displayed frame is evaluated to determine whether the current VOBU/GOP includes any frames prior to the current value of the earliest buffered frame. If the earliest buffered frame is the first frame in the current VOBU/GOP, then the search for prior frames terminates. This is done for the reason discussed above: that it is not possible to determine with certainty that a frame is the last frame of the previous VOBU because the temporal reference of the last frame of the previous VOBU is unknown. Accordingly, the process of identifying buffers storing prior frames, halts whenever the first frame of a VOBU is reached. (When the display, following the process described in FIG. 16C above, moves to a frame in the previous VOBU, then the next invocation of the process of FIG. 16D can evaluate the temporal references of other frames in the previous VOBU, to identify frames for retention, and then identify targets that are prior to the retained frames; until that time, however, no frames in the previous VOBU are retained.)

If in step 592 the current earliest buffered frame is the first frame in the current VOBU/GOP, then all frames from the current VOBU/GOP are buffered; accordingly, in step 593 the first and last target frames for the next continuous decode operation are set to the "last frame in previous VOBU/GOP", and then in step 594 a request is sent to the host to deliver both the previous and the current VOBU/GOP. (The current VOBU/GOP is requested so that the end of the previous VOBU/GOP can be detected in the process discussed below with reference to FIG. 17B; no frames will be decoded from the current VOBU/GOP.)

After step 594, in step 596 the buffers that have not been marked for retention are released. However, the history values for these buffers are not changed, since the history values are used in the decoding process to ensure that all buffers are used in storing data. Following step 596, in step 598 the MPEG code buffers of the RISC are flushed, in preparation for receipt of new VOBU/GOP (s) from the host to be decoded. At the same time, the pointers in fields 47, 49, and 57, which identify the buffers storing the last B and reference frames decoded, are set to invalid values; this is done so that none of the buffers that were retained by the process of FIG. 16D, are released during the process of FIG. 17C (the process of FIG. 17C will release buffers based on the pointers in fields 47, 49 and 57—if these pointers have invalid values, no buffers will be released). Finally, after step 598, in step 600 the target frame counter is reset to an appropriate value, e.g., the counter is set to a value of 1 if there are three frame buffers, a value of 2 if there are four frame buffers, a value of 3 if there are five frame buffers, etc. This counter is used by the process of FIG. 17B in determining whether all targets have been reached.

If in step 592, the current earliest buffered frame is not the first frame in its VOBU/GOP, then processing continues to step 602, in which a "best" history value is initialized to a value of −1 and a flag is cleared to indicate that the previous frame was not yet found. This initiates the process of searching for a buffer storing the frame prior to the currently earliest buffered frame. This loop begins with step 604, in which it is determined whether all buffers have been checked. If not, then in step 606 a buffer is selected that has not been previously checked during the current loop. The selected buffer temporal reference and VOBU-ID/GOP-SA are then compared to the current earliest buffered frame, to determine whether the frame in the buffer is immediately prior to the current earliest buffered frame. If not, then processing returns to step 604 to evaluate other buffers, if any. If the frame in the buffer is the immediately prior frame, then in step 608 the history value of the selected buffer is compared to the current "best" history value. If the history value of the selected buffer is less than the current "best" history value, then processing returns to step 604 to evaluate other buffers, if any. If the history value of the selected buffer is larger than the current "best" history value, then in step 610 the current "best" history value is set to the history value of the selected buffer. At the same time, a "best buffer" variable is set to identify the selected buffer. Finally, a flag is set to indicate that the previous frame was found. Processing then returns to step 604 to evaluate other buffers, if any.

After all buffers have been evaluated through the above loop, then the flag discussed above is checked to determine whether the previous frame was found in the buffers. If so, then in step 614 the buffer identified by the "best buffer" variable is marked for retention, and at the same time the current earliest buffered frame is set to be the frame stored by the "best buffer". Processing then returns to step 592 to look for frames earlier than the new current earliest buffered frame.

If in step 612 the previous frame was not found, then all of the buffered frames prior to the currently displayed frame have been identified. In this case, processing continues to step 616, in which the last target is set to be the frame immediately prior to the earliest buffered frame located by the preceding process. Then, in step 618 the first target is computed to be an appropriate number of frames before the last target. For example, if there are three frame buffers, the first and last target are the same frame; if there are four frame buffers, the first target is the frame before the last target; if there are five frame buffers, the first target is the frame two before the last target.

After these steps are completed, in step 620 it is determined whether the first target is in the same VOBU/GOP as the currently displayed frame. (This can be determined by checking whether the temporal reference of the first target computed in step 618 is greater than or equal to zero.) If the first target is in the current VOBU/GOP, then in step 622 it is determined whether the first target is after the first presentable picture FPP of the current VOBU/GOP. If the first target is after the FPP, then the targets can be constructed from the current VOBU/GOP taken alone. Accordingly, in step 624, only the current VOBU/GOP is requested from the host, and then processing continues to step 596 to release buffers, and set up for decoding the targets as described above.

If in step 622, the first target is not after the FPP of the current VOBU/GOP, then at least one of the target frames must be reconstructed from reference frames in the previous VOBU/GOP. In this situation, both the previous and the current VOBU/GOP must be delivered by the host. Accordingly, processing then proceeds to step 594 to request both the previous and current VOBU/GOP.

If in step 620, it is determined that the first target is not in the current VOBU/GOP, then processing continues to step 626, and the first target is set to a special value indicative of "last frame in previous VOBU/GOP", indicating that at least one of the targets is in the prior VOBU/GOP. Since a target is in the prior VOBU/GOP, both the previous and the current VOBU/GOP must be delivered by the host. Accordingly, processing then proceeds to step 594 to request both the previous and current VOBU/GOP.

Figure 17D:
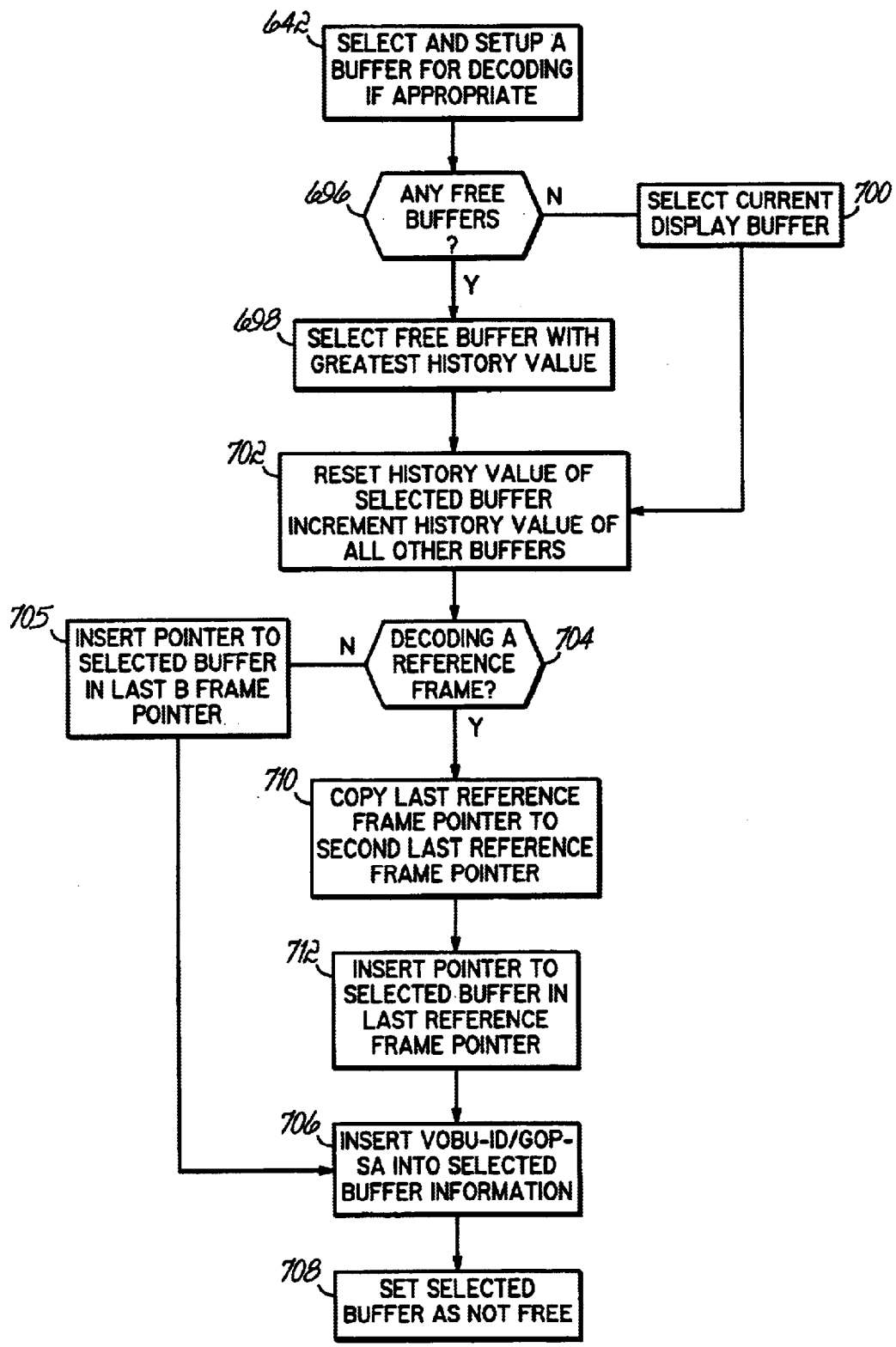

Referring now to FIG. 17A, the decoding process can be elaborated. As noted above, the decoding process will be initiated whenever a picture start code is encountered as part of the hardware decoding of a prior frame (step 630), or when other software in the RISC makes an explicit subroutine call to initiate decoding, or the host initiates decoding with a nonexclusive command (step 632). In any of these cases, in a first step 634, MPEG header parsing will be performed and in step 636 picture coding will be read to determine the type of the frame and various coding needed for display. Then, in step 638, a process, described below with reference to FIG. 17B, is performed to determine whether to decode or skip the frame based on the picture coding and the current state of the RISC software. Next, in step 640, a process, described below with reference to FIG. 17C, is performed to determine whether to release any of the buffers. Then, in step 642, a process, described below with reference to FIG. 17D, is performed to select and set up a buffer for receiving the decoded frame. After these steps, in step 644, a flag is checked to determine whether decoding should pause. If this flag is set, then decoding will pause at the end of header parsing and buffer setup, until the trick play management software described above explicitly schedules the hardware slice decoding process. If this flag is not set, then the decoding process is continuous (hence earlier reference to the "continuous decoding" flag), and the hardware decoding process is immediately scheduled in step 646. As noted above, after the picture has been fully decoded by the hardware decoding process, the next picture start code will be encountered, which will generate a new interrupt to the RISC and a new invocation of the steps of FIG. 17A. Thus, if the pause decoding flag is not set, decoding will continue through frames endlessly until paused for one of the reasons discussed above or in the following description.

Referring now to FIG. 17B, the process 638 for determining whether to decode or skip a frame, can be discussed. In this process, different actions are taken based on the current state (step 650). In the PLAY state, an audio-video synchronization analysis is performed to determine whether a frame must be skipped for the purpose of synchronizing to audio. If so, and if the frame is a B picture, then an instruction is delivered to the hardware decoding process to skip over the frame to the next picture start code, and perform the header and picture code processing on the next frame. If there is no need to skip a frame for synchronization purposes, then no action is taken.

In the STOP, PAUSE, and SLOW FORWARD states, frames are not skipped, so no action is taken.

In the FF and FR states, all B frames will be skipped, and furthermore, only a pre-set number of reference frames from each VOBU/GOP will be decoded. Accordingly, in these states, in step 656 an evaluation is made whether enough reference frames have already been decoded from the current VOBU/GOP. If so, then in step 658 the hardware is instructed to skip the current frame and the rest of the VOBU/GOP, and begin processing with the next VOBU/GOP. If more reference frames should be decoded from the VOBU/GOP, then in step 659 it is determined whether the current frame is a reference frame or a B frame. If the current frame not a reference frame, then the hardware is instructed to skip the current frame. If the current frame is a reference frame, then it should be decoded, and no action is taken.

In the reverse decode RD state, the decision whether to skip a frame is based not only on the type of the frame but also whether the frame is a target frame. Specifically, in step 660, the temporal reference for the frame that is about to be decoded, is determined. Then, in steps 662 and 664, a determination is made whether the last target is the "last frame in the previous VOBU/GOP" and whether the current picture is the first picture in a new VOBU/GOP. If both are true, then the decoding of target frames is completed, since all targets were in the prior VOBU/GOP. In this case, in step 666, the flag discussed above is set to cause the decoding process to pause, and the flag discussed above is set to indicate that all targets have been reached. Then in step 658, the remainder of the VOBU/GOP is skipped, and processing is done.

If the current picture is not the first picture in a new. VOBU/GOP, or if the last target is not the "last frame of previous VOBU/GOP", then processing continues to step 668 in which the temporal reference of the frame about to be decoded is compared to the temporal references of the target. (This comparison is a direct numerical comparison unless either the first or the first and last targets are set to the special value of "last frame of previous VOBU/GOP"; if this is the case, then no frames in the previous VOBU/GOP are assumed to be a target frame. It will be noted that the last frame of a VOBU/GOP is a reference frame and therefore the last frame will be decoded even though it is assumed not to be a target.) If the temporal reference of the frame about to be decoded is not between the temporal references of the first and last target, then processing continues to step 659 and the frame is skipped unless it is a reference frame. If the temporal reference of the frame is between the temporal references of the first and last target, then in step 670 a flag is set to indicate that the current frame is a target, and in step 672 the target frame counter is decremented. In step 674, it is determined whether the target frame counter has reached zero, and if so, in step 676 the flag discussed above is set to pause decoding, and the flag discussed above is set to indicate that all targets have been reached. Processing is then done.

Referring now to FIG. 17C, the process for determining whether and which buffer to release, can be explained. Different actions are taken based on the current state of the RISC software (step 680). In the PAUSE, STOP and FR states, 688, buffers are not released, and so no action is taken. Note that in the FR state, because buffers are never released, under normal circumstances where all buffers are full of references frames waiting for display, the decode process described in FIG. 17D will select the current display buffer for decoding, and the decoding of new data into the buffer will occur when the display advances to a prior reference frame through the process described above with reference to FIG. 16C.

In the PLAY, SLOW FORWARD and FF states, in step 682 it is determined whether the frame about to be decoded is a reference frame. If so, then in step 684 the buffer containing the second last reference frame decoded is released. If the frame about to be decoded is a B frame, then in step 686 the buffer containing the most recently decoded B frame is released. Note that the second last reference frame decoded and the most recently decoded B frame are identified using the pointers described above with reference to FIG. 7. Furthermore, it will be noted that if any of these pointers has an invalid value, no buffer is released, as discussed above.

In the reverse decode RD state, in step 690 it is determined whether the frame about to be decoded is a reference frame. If so, then in step 692 the buffer containing the second last reference frame decoded is released, so long as that frame is not a target. If the frame about to be decoded is a B frame, then in step 694 the buffer containing the most recently decoded B frame is released as long as that frame is not a target. Note that the second last reference frame decoded and the most recently decoded B frame are identified using the pointers described above with reference to FIG. 7. Furthermore, it will be noted that if any of these pointers has an invalid value, no buffer is released, as discussed above.

Referring now to FIG. 17D, the process 642 for selecting a buffer for decoding can be explained. In a first step 696, a determination is made whether there are any free buffers. In other than the reverse decode RD and fast reverse FR states, there will always be at least one free buffer. In this situation, in step 698, the free buffer having the largest history value is selected for use. If there is no free buffer, then in step 700 the current display buffer is selected for use. In either case, in step 702, the history value of the selected buffer is reset to zero and the history value of all other buffers is incremented. Then, in step 704, it is determined whether a reference frame is currently being decoded. If not, then in step 705 a pointer to the selected buffer is inserted in to the "last B frame decoded" field 49 of FIG. 7. Then, in step 706, the VOBU-ID or GOP-SA for the frame is inserted into the buffer information for the selected buffer (see FIG. 6). Finally, in step 708, the selected buffer is set as not free.

Figure 7:
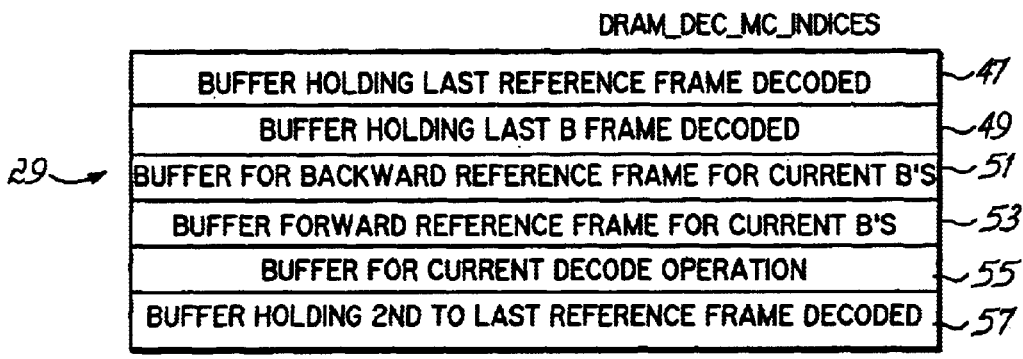
FIG. 7 is a data structure diagram of the decode indeces stored in the DRAM.

If the frame about to be decoded is a reference frame, then in step 710 the "last reference frame decoded" pointer in field 47 of FIG. 7 is copied into the "second last reference frame decoded pointer in field 57 of FIG. 7. Then, in step 712 a pointer to the selected buffer is inserted into the "last reference frame decoded pointer in field 47 of FIG. 7. Then processing continues through steps 706 and 708 to place the VOBU/GOP information into the selected buffer and set the buffer as not free.

Referring now to FIG. 18, details are provided on the display of top and bottom fields of video data during the setup of video display of step 116 (FIG. 11). Initially, in step 720, the current state of the state machine is checked, since the fields may be displayed differently in different states.

In the STOP state, no fields are displayed, and so processing is done (step 722).

In the PLAY state, normal playback is performed, i.e., the current nybble of the display string is evaluated in step 724 to determine which field to display. If the top field is to be displayed, processing continues to step 726, in which a flag is set to display the top field. If the bottom field is to be displayed, processing continues to step 728, in which a flag is set to display the bottom field. After either step 726 or step 728, in step 730 the display of the selected field is generated from the previously-selected display buffer 730.

In the PAUSE or RD states, the display is paused at a single frame, and that frame is repeatedly displayed. Accordingly, in these states, it is relevant whether the field or frame pause mode has been activated as well as whether fID is 0 or 1. First, the fID state is evaluated (step 736). If fID is 1, and the frame pause mode is active, then the bottom field of video data is displayed by proceeding to step 728. If fID is 0 or if fID is 1 but the field pause mode is active, then the top field is displayed by proceeding to step 726. The result when in field pause mode, is a lower resolution output, but without blur or "shimmer" than can be produced when there is motion between the fields. If the frame pause mode is active, then the top field of video data is displayed when fID is 0 and the bottom field is displayed when fID is 1. The result is a higher resolution output, that my have blur or "shimmer" when there is motion between the fields.

In the SLF, FF or FR states, much of the time a singe frame is being repeatedly displayed, and in this situation the fields to be output should be selected in the same manner as in the PAUSE or RD states. However, in the SLF, FF or FR states, there are frequent times when a transition is being made from a frame to a subsequent frame. During these periods, the fields should be output in the same manner as is done in the PLAY state; i.e., the top field should be displayed when fID is 0, and then the bottom field should be displayed when fID is 1. Accordingly, in the SLF, FF or FR states, processing begins with step 732, in which the flag that has been discussed above, is checked to determine whether a frame decode is currently underway. When a frame decode is underway, then the display is in the process of transitioning from one frame to another. Accordingly, if the flag is set to indicate a frame decode is underway, control passes from step 732 to step 734, to check the value of fID and display the top field if fID is 0 and the bottom field if fID is 1. Alternatively, if a frame decode is not underway, control passes from step 732 to step 736, to handle display of fields in the same manner as in the PAUSE or RD states, based on the frame or field pause mode.

It will be noted that in the reverse playback states, i.e., in the FR state or in the RD state, when a transition is being made from one frame to another, it may be beneficial to reverse the playback of the fields; i.e., the bottom field may be played when fID is 0 and the top field played when fID is 1. If there is motion between the fields, playing the fields in this reverse manner will produce appropriate reverse motion in the display as the frame transition is effected. The embodiment shown in FIG. 18, plays the fields during reverse playback in the same manner as is done during forward playback; this may produce a disturbing temporal effect during reverse playback, as motion moves backward, then forward, then backward, etc. However, it will also be noted that reversing the displayed fields during reverse playback, will produce spacial distortion since the position of the scan lines will be incorrect. It is believed that this spacial distortion will be more disturbing than the temporal distortion created when fields are played back in the manner shown in FIG. 18. However, alternative embodiments of the invention could reverse the playback of the fields during reverse video playback modes.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art.

The foregoing describes in substantial detail a method according to the invention for managing the playback of digital video in a number of trick playback modes as well as standard play mode. This example was provided in the context of a memory having three four or five frame buffers. It will be appreciated, however, that the methods described are independent of the number of frame buffers in the memory. Accordingly, these methods may be used with other frame buffer sizes. More specifically, the host may dynamically reallocate memory to change the number of frame buffers on-the-fly. This may be done, for example, during playback mode transitions; e.g., more frame buffers may be made available in reverse playback modes than in other modes to permit faster processing. Furthermore, the foregoing described operations performed for both MPEG-1 input data, such as is used on VCD, as well as MPEG-2 input data, such as is used on DVD. It will be appreciated that MPEG-1 data is often recorded at a lower resolution and accordingly requires less frame buffer space to store. Thus, the number of frame buffers can be larger for VCD playback than DVD playback. Other alternatives are possible. For example, a special minimum memory mode may be provided in which one frame buffer, used only for B frames, is less than a full frame in size. This possibility is explored in the copending patents applications that are incorporated by reference. In this scenario, special processing is used to ensure that only B-frame data is stored into the reduced-size buffer. In such an environment, some trick playback modes may not be available or may be truncated in functionality.

The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of controlling a single-chip application specific integrated circuit comprising a central processing unit, to provide autonomous management of playback of digital video and audio by said application specific integrated circuit, comprising receiving a command into said central processing unit of said application specific integrated circuit to establish a current playback state for management of playback of digital video and audio by said application specific integrated circuit;

responding to a video field synchronization signal and a current playback state of said application specific integrated circuit, without any further external instruction, to determine whether to display digital video, whether to decode digital video for display, whether to repeat display of previously decoded digital video, and whether to skip over digital video prior to decoding digital video for output; and repeating said receiving and responding steps to transition between playback states to provide desired playback of said digital video and audio.

2. The method of claim 1 wherein in a STOP state said application specific integrated circuit responds to said video field synchronization signal by not decoding or displaying any digital video.

3. The method of claim 1 wherein in a PLAY state said application specific integrated circuit responds to said video field synchronization signal by decoding and displaying a new video field.

4. The method of claim 1 wherein in a SLOW FORWARD state said application specific integrated circuit responds to said video field synchronization signal by repeatedly displaying previously decoded digital video for a number of repetitions, then decoding and displaying new video fields.

5. The method of claim 4 wherein said step of receiving a command includes receiving a number of repetitions to be performed in said SLOW FORWARD state.

6. The method of claim 1 wherein in a FAST FORWARD state said application specific integrated circuit responds to said video field synchronization signal by repeatedly displaying previously decoded digital video reference frames for a number of repetitions, then skipping over non-reference frames and decoding and displaying a new reference frame.

7. The method of claim 6 wherein said step of receiving a command includes receiving a number of repetitions of a reference frame to be performed in said FAST FORWARD state.

8. The method of claim 6 wherein in said FAST FORWARD state, after said number of repetitions of display of a reference frame, said application specific integrated circuit determines whether a number of reference frames previously decoded from a current video object unit exceeds a limit, and if so, skips over any further reference frames in the current video object unit and decodes and displays a new reference frame from a subsequent video object unit.

9. The method of claim 8 wherein said step of receiving a command includes receiving an indication of a limit on the number of reference frames to be decoded from each video object unit.

10. The method of claim 1 wherein in a PAUSE state said application specific integrated circuit responds to said video field synchronization signal by repeatedly displaying a previously decoded video frame.

11. The method of claim 1 wherein in a FAST REVERSE state said application specific integrated circuit responds to said video field synchronization signal by repeatedly displaying previously decoded digital video reference frames for a number of repetitions, then skipping backwards over non-reference frames and displaying a new reference frame.

12. The method of claim 11 wherein said step of receiving a command includes receiving a number of repetitions of a reference frame to be performed in said FAST REVERSE state.

13. The method of claim 11 wherein in said FAST REVERSE state, after said number of repetitions of display of a reference frame, said application specific integrated circuit determines whether a number of reference frames previously decoded from a current video object unit exceeds a limit, and if so, skips over any further reference frames in the current video object unit and decodes and displays a new reference frame from a previous video object unit.

14. The method of claim 13 wherein said step of receiving a command includes receiving an indication of a limit on the number of reference frames to be decoded from each video object unit.

15. The method of claim 1 wherein in a REVERSE DECODE state said application specific integrated circuit responds by buffering decoded video prior to a currently displayed video frame.

16. The method of claim 15 wherein in said REVERSE DECODE state said application specific integrated circuit responds to said state by requesting delivery, from a host, of encoded digital video data needed to buffer video prior to a currently displayed video frame.

17. The method of claim 16 wherein in said REVERSE DECODE state said application specific integrated circuit identifies either a current or a current and previous MPEG-2 VOBU when requesting delivery of encoded digital video data.

18. The method of claim 16 wherein in said REVERSE DECODE state said application specific integrated circuit identifies either a current or a current and previous MPEG GOP when requesting delivery of encoded digital video data.

19. A single-chip application specific integrated circuit providing autonomous management of playback of digital video and audio, comprising
 a digital video decoder and output system,
 a central processing unit controlling said digital video decoder and output system, said central processing unit receiving a command to establish a current
 playback state for management of playback of digital video and audio by said digital video decoder and output system;
 responding to a video field synchronization signal and a current playback state, without any further external instruction, to determine whether to display digital video, whether to decode digital video for display, whether to repeat display of previously decoded digital video, and whether to skip over digital video prior to decoding digital video for output; and
 repeating said receiving and responding steps to transition between playback states to provide desired playback of said digital video and audio.

20. The apparatus of claim 19 wherein in a STOP state said central processing unit responds to said video field synchronization signal by not decoding or displaying any digital video.

21. The apparatus of claim 19 wherein in a PLAY state said central processing unit responds to said video field synchronization signal by decoding and displaying a new video field.

22. The apparatus of claim 19 wherein in a SLOW FORWARD state said central processing unit responds to said video field synchronization signal by repeatedly displaying previously decoded digital video for a number of repetitions, then decoding and displaying new video fields.

23. The apparatus of claim 22 wherein said step of receiving a command includes receiving a number of repetitions to be performed in said SLOW FORWARD state.

24. The apparatus of claim 19 wherein in a FAST FORWARD state said central processing unit responds to said video field synchronization signal by repeatedly displaying previously decoded digital video reference frames for a number of repetitions, then skipping over non-reference frames and decoding and displaying a new reference frame.

25. The apparatus of claim 24 wherein said step of receiving a command includes receiving a number of repetitions of a reference frame to be performed in said FAST FORWARD state.

26. The apparatus of claim 24 wherein in said FAST FORWARD state, after said number of repetitions of display of a reference frame, said central processing unit determines whether a number of reference frames previously decoded from a current video object unit exceeds a limit, and if so, skips over any further reference frames in the current video object unit and decodes and displays a new reference frame from a subsequent video object unit.

27. The apparatus of claim 26 wherein said step of receiving a command includes receiving an indication of a limit on the number of reference frames to be decoded from each video object unit.

28. The apparatus of claim 19 wherein in a PAUSE state said central processing unit responds to said video field synchronization signal by repeatedly displaying a previously decoded video frame.

29. The apparatus of claim 19 wherein in a FAST REVERSE state said central processing unit responds to said video field synchronization signal by repeatedly displaying previously decoded digital video reference frames for a number of repetitions, then skipping backwards over non-reference frames and decoding and displaying a new reference frame.

30. The apparatus of claim 29 wherein said step of receiving a command includes receiving a number of repetitions of a reference frame to be performed in said FAST REVERSE state.

31. The apparatus of claim 29 wherein in said FAST REVERSE state, after said number of repetitions of display of a reference frame, said central processing unit determines whether a number of reference frames previously decoded from a current video object unit exceeds a limit, and if so, skips over any further reference frames in the current video object unit and decodes and displays a new reference frame from a previous video object unit.

32. The apparatus of claim 31 wherein said step of receiving a command includes receiving an indication of a limit on the number of reference frames to be decoded from each video object unit.

33. The apparatus of claim 19 wherein in a REVERSE DECODE state said central processing unit responds by buffering decoded video prior to a currently displayed video frame.

34. The apparatus of claim 33 wherein in said REVERSE DECODE state said application specific integrated circuit responds to said state by requesting delivery, from a host, of encoded digital video data needed to buffer video prior to a currently displayed video frame.

35. The method of claim 34 wherein in said REVERSE DECODE state said application specific integrated circuit identifies either a current or a current and previous video object unit when requesting delivery of encoded digital video data.

36. The method of claim 34 wherein in said REVERSE DECODE state said application specific integrated circuit identifies either a current or a current and previous group of pictures when requesting delivery of encoded digital video data.

37. An audio/video component comprising the single-chip application specific integrated circuit of claim 19.

38. The audio/video component of claim 37, wherein the audio/video component is selected from the group consisting of a set-top box, a digital television receiver, a television, a personal computer, a satellite receiver, a computer, a digital video disc (DVD) player, a DVD recorder, a video cassette recorder and a camcorder.

39. A program product, comprising a hardware definition program that defines the single-chip application specific integrated circuit of claim 19; and a signal bearing media bearing the hardware definition program.

40. The program product of claim 39, wherein the signal bearing media includes at least one of a transmission type media and a recordable media.

* * * * *

UNITED STATES PATENT AND TRADEMARK OFFICE
CERTIFICATE OF CORRECTION

| | |
|---|---|
| PATENT NO. | : 6,654,539 B1 |
| APPLICATION NO. | : 09/281152 |
| DATED | : November 25, 2003 |
| INVENTOR(S) | : Duruöz et al. |

It is certified that error appears in the above-identified patent and that said Letters Patent is hereby corrected as shown below:

Column 1, line 14 reads "...naming. Cem Duruoz..." and should read -- ...naming Cem Duruoz... --.

Column 1, line 15 reads "...Cem Duruoz, Taner Ozelik and Gong-san Yu, and..." and should read -- ...Cem Duruoz, Taner Ozcelik and Gong-san Yu, and... --.

Column 2, line 38 reads "...from. the playback..." and should read -- ...from the playback... --.

Column 4, line 1 reads "The number of repetitions to be performed in the SLOW FORWARD state are delivered as part of..." and should read -- The number of repetitions to be performed in the SLOW FORWARD state is delivered as part of... --.

Column 4, line 35 reads "BRIEF DESCRIPTION OF THE DRAWING" and should read -- BRIEF DESCRIPTION OF THE DRAWINGS --.

Column 4, line 62 reads "...di0agram of the decade indeces stored in..." and should read -- ...diagram of the decode indices stored in... --.

Column 4, line 64 reads "FIG. 8 is block diagram..." and should read -- FIG. 8 is a block diagram... --.

Column 5, line 56 reads "...located off-chip)" and should read -- ...located off-chip.) --.

Column 6, lines 11-12 read "...nonresident code area 34 of instruction memory 14 which may contain non-resident code 36..." and should read -- ...nonresident code area 34 of instruction memory 14 which may contain nonresident code 36...--.

Column 6, lines 11-16 read "...command manager are non-resident routines stored as nonresident code 36." and should read -- ...command manager are nonresident routines stored as nonresident code 36."--.

Column 8, line 29 reads "...fields unique identify a..." and should read -- ...fields uniquely identify a... --.

Column 9, line 17 reads "A decode indeces..." and should read -- A decode indices... --.

Column 11, line 44 reads "...commands are interpreted; if any (step 122)." and should read -- ...commands are interpreted, if any (step 122). --.

UNITED STATES PATENT AND TRADEMARK OFFICE
CERTIFICATE OF CORRECTION

| | | |
|---|---|---|
| PATENT NO. | : 6,654,539 B1 | |
| APPLICATION NO. | : 09/281152 | |
| DATED | : November 25, 2003 | |
| INVENTOR(S) | : Duruöz et al. | |

It is certified that error appears in the above-identified patent and that said Letters Patent is hereby corrected as shown below:

Column 13, lines 60-61 read "...approach of steps 208 and 210 provide efficiencies in processing" and should read -- ...approach of steps 208 and 210 provides efficiencies in processing... --.

Column 15, line 54 reads "...determines whether the host as instructed the ASIC to disable..." and should read -- ...determines whether the host has instructed the ASIC to disable... --.

Column 16, line 59 reads "...illustrated in FIG. 15H-15I is called twice..." and should read -- ...illustrated in FIGS. 15H-15I is called twice... --.

Column 19, line 5 reads "...(fast reverse), FF (slow reverse) or SLF..." and should read -- ...(fast reverse), FF (fast forward) or SLF... --.

Column 22, line 59 reads "...the counter will also reached a "0" value..." and should read -- ...the counter will also reach a "0" value... --.

Column 23, line 12 reads "The process initiated in step 420, will commence after..." and should read -- The process initiated in step 420 will commence after... --.

Column 23, line 22 reads "...end of the VOBU is encountered, of if the number of reference frames..." and should read -- ...end of the VOBU is encountered, or if the number of reference frames... --.

Column 24, line 14 reads "...the state of the state machine in transitioned to the PLAY state." and should read -- ...the state of the state machine is transitioned to the PLAY state. --.

Column 27, line 62 reads "...the counter will also reached a "0" value..." and should read -- ...the counter will also reach a "0" value... --.

Column 28, line 17 reads "The process initiated in step 472, is described..." and should read -- The process initiated in step 472 is described... --.

Column 28, line 27 reads "...from a VOBU/GOP are displayed, of if the number of reference frames..." and should read -- ... from a VOBU/GOP are displayed, or if the number of reference frames... --.

Column 31, line 15 reads "...after the host as used the..." and should read -- ...after the host has used the... --.

UNITED STATES PATENT AND TRADEMARK OFFICE
CERTIFICATE OF CORRECTION

| | |
|---|---|
| PATENT NO. | : 6,654,539 B1 |
| APPLICATION NO. | : 09/281152 |
| DATED | : November 25, 2003 |
| INVENTOR(S) | : Duruöz et al. |

It is certified that error appears in the above-identified patent and that said Letters Patent is hereby corrected as shown below:

Column 31, line 18 reads "...place the ASIC in its RD state, and the host instructs the..." and should read -- ...place the ASIC in its RD state, the host instructs the... --.

Column 31, line 30 reads "...FF, FR, SLF or PLAY states, transitions to the RD state..." and should read -- ...FF, FR, SLF or PLAY state, transitions to the RD state... --.

Column 32, line 30 reads "...nonexclusive commend..." and should read -- ...nonexclusive command... --.

Column 33, line 7 reads "...indeces...." and should read -- ...indices... --.

Column 34, line 3 reads "...indeces..." and should read -- ...indices... --.

Column 34, line 66 reads "...above-reference patent..." and should read -- ...above-referenced patent... --.

Column 35, line 32 reads "...indeces..." and should read -- ...indices... --.

Column 38, line 60 reads "If the current frame not a reference frame,..." and should read -- If the current frame is not a reference frame,... --.

Column 39, line 10 reads "...in a new. VOBU/GOP, or if the..." and should read -- ...in a new VOBU/GOP, or if the... --.

Column 39, line 43 reads "...of references frames..." and should read -- ...of reference frames... --.

Column 40, line 26 reads "...is copied into the "second last reference frame decoded pointer in field 57..." and should read -- ...is copied into the "second last reference frame decoded" pointer in field 57... --.

Column 40, line 28 reads "...is inserted into the "last reference frame decoded pointer in field 47..." and should read -- ...is inserted into the "last reference frame decoded" pointer in field 47... --.

Column 40, line 64 reads "...that my have blur..." and should read -- ...that may have blur... --.

Column 40, line 66 reads "...singe..." and should read -- ...single... --.

UNITED STATES PATENT AND TRADEMARK OFFICE
CERTIFICATE OF CORRECTION

| | |
|---|---|
| PATENT NO. | : 6,654,539 B1 |
| APPLICATION NO. | : 09/281152 |
| DATED | : November 25, 2003 |
| INVENTOR(S) | : Duruöz et al. |

It is certified that error appears in the above-identified patent and that said Letters Patent is hereby corrected as shown below:

Column 41, line 53 reads "...three four or five..." and should read -- ...three, four or five... --.

Column 42, line 6 reads "...patents applications..." and should read -- ...patent applications... --.

Column 42, line 15 reads "...or scope of applicant's general inventive..." and should read -- ...or scope of applicants' general inventive... --.

In the Claims:
Columns 19-20, lines 58-8 should read:

-- ...video and audio, comprising a digital video decoder and output system, a central processing unit controlling said digital video decoder and output system, said central processing unit receiving a command to establish a current playback state for management of playback of digital video and audio by said digital video decoder and output system;

responding to a video field synchronization signal and a current playback state, without any further external instruction, to determine whether to display digital video, whether to decode digital video for display, whether to repeat display of previously decoded digital video, and whether to skip over digital video prior to decoding digital video for output; and repeating said receiving and responding steps to transition between playback states to provide desired playback of said digital video and audio.

In the Figures:

Figure 16B, step 538 reads "SLOW REVERSE SLATE" and should read -- SLOW REVERSE STATE --

UNITED STATES PATENT AND TRADEMARK OFFICE
CERTIFICATE OF CORRECTION

PATENT NO. : 6,654,539 B1
APPLICATION NO. : 09/281152
DATED : November 25, 2003
INVENTOR(S) : Duruöz et al.

It is certified that error appears in the above-identified patent and that said Letters Patent is hereby corrected as shown below:

Figure I6C, step 562 reads "IDENTIFIY A BUFFER: VOBU-ID/GOP-SA OF..." and should read -- IDENTIFY A BUFFER: VOBU-ID/GOP-SA OF... --

Figure 16D, step 606 reads "IDENTIFY A BUFFER: TR AND VOBU/GOP-SA OF IDENTIFIED BUFFER ONE PRIOR TO CURRENT EARIEST FRAME?" and should read -- IDENTIFY A BUFFER: TR AND VOBU/GOP-SA OF IDENTIFIED BUFFER ONE PRIOR TO CURRENT EARLIEST FRAME? --.

Signed and Sealed this

Fifth Day of June, 2007

JON W. DUDAS
*Director of the United States Patent and Trademark Office*